Aug. 6, 1946.　　R. W. PITMAN　　2,405,268
BUSINESS MACHINE
Filed Nov. 21, 1941　　25 Sheets-Sheet 1

INVENTOR
RICHARD W. PITMAN
BY
ATTORNEY

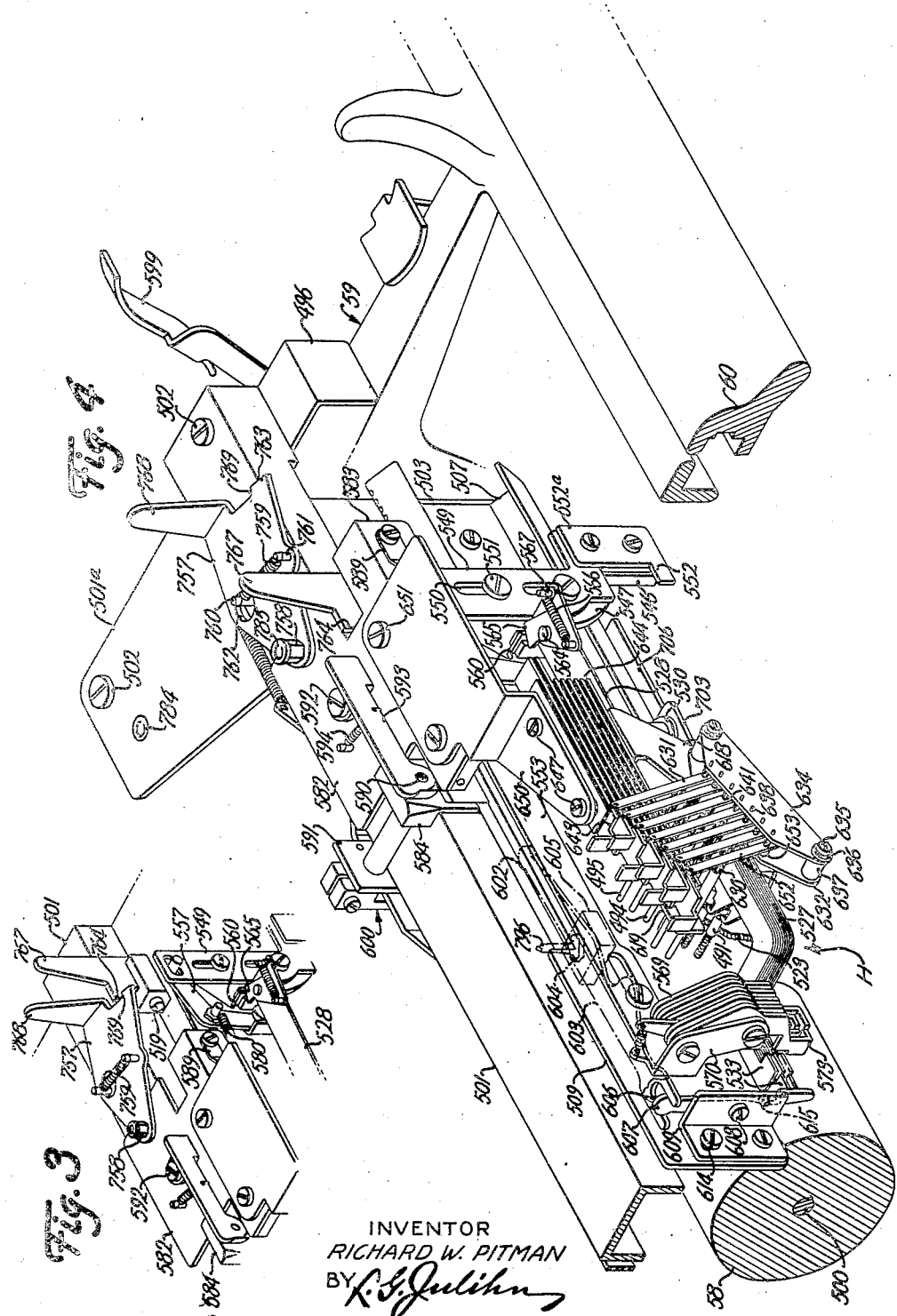

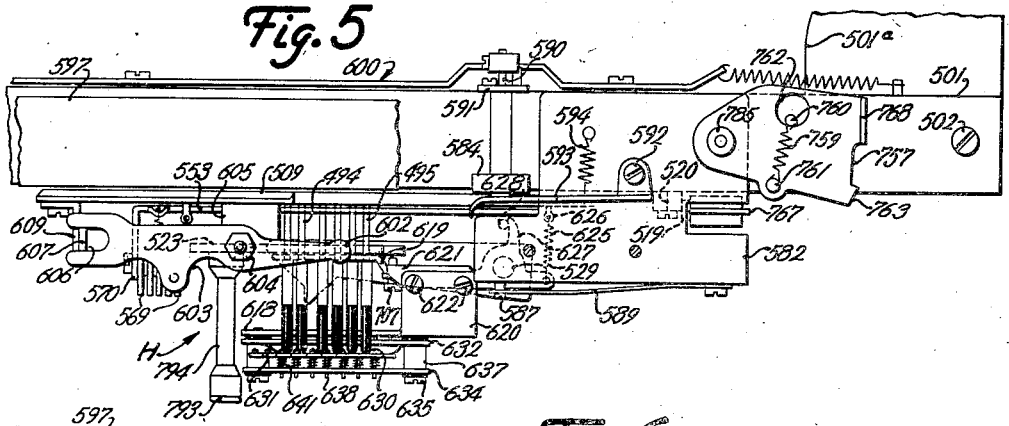

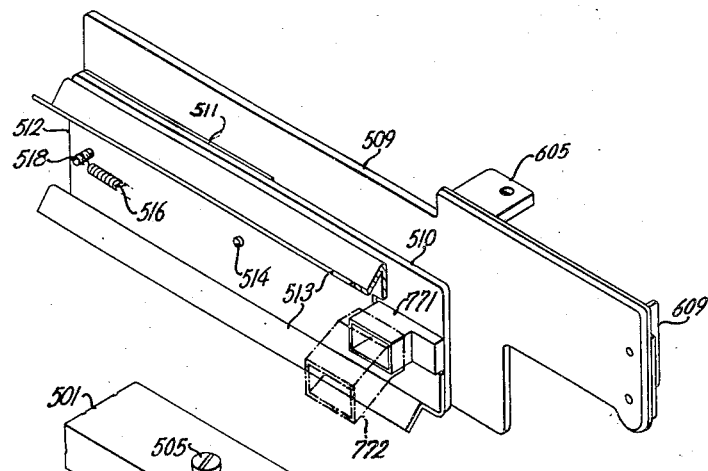
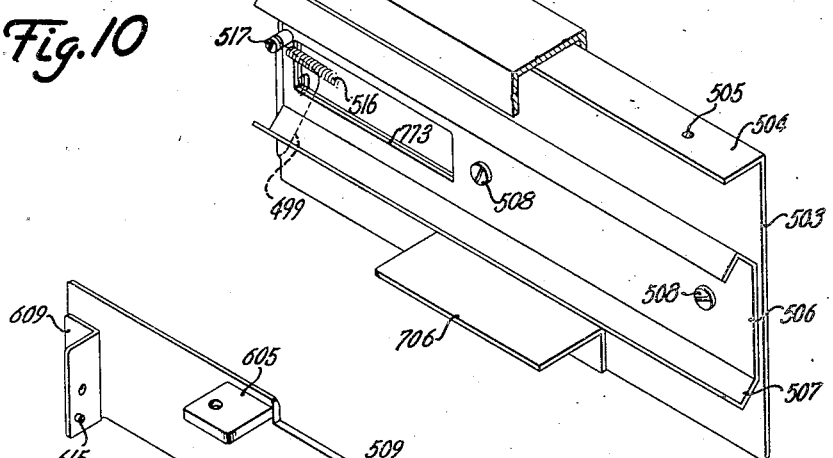
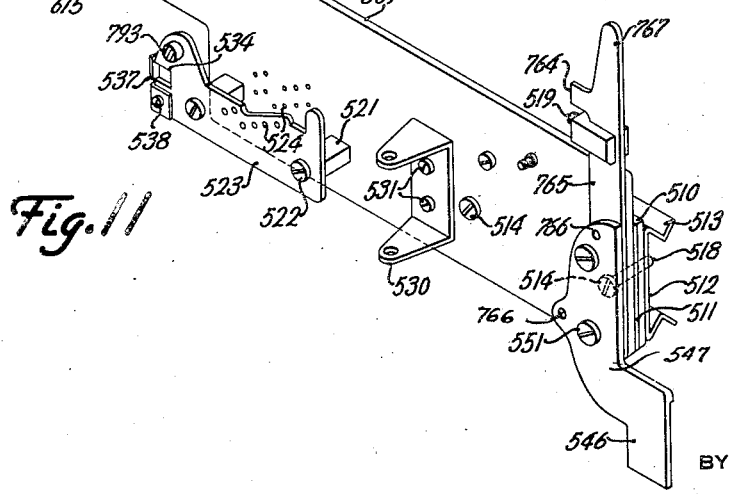

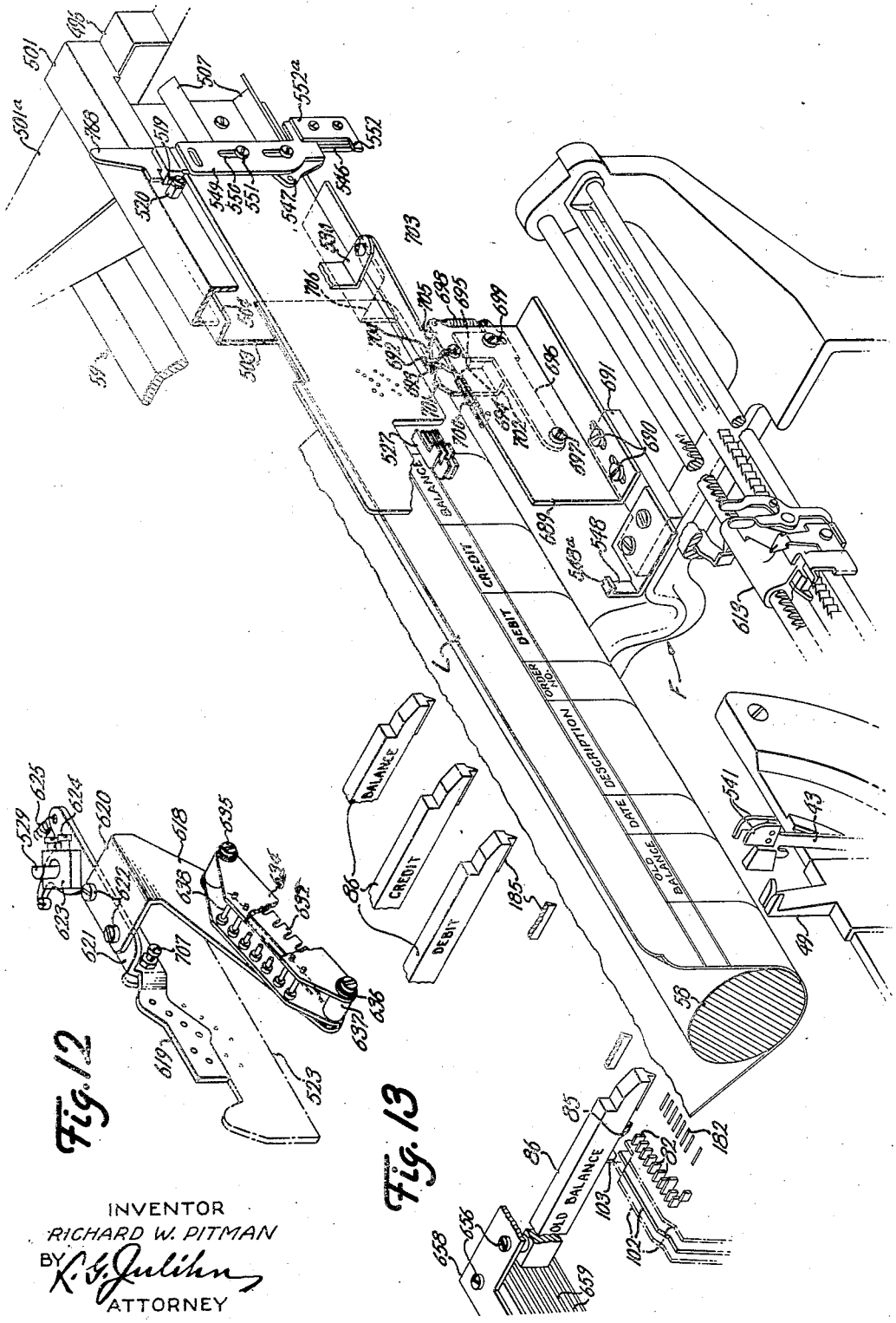

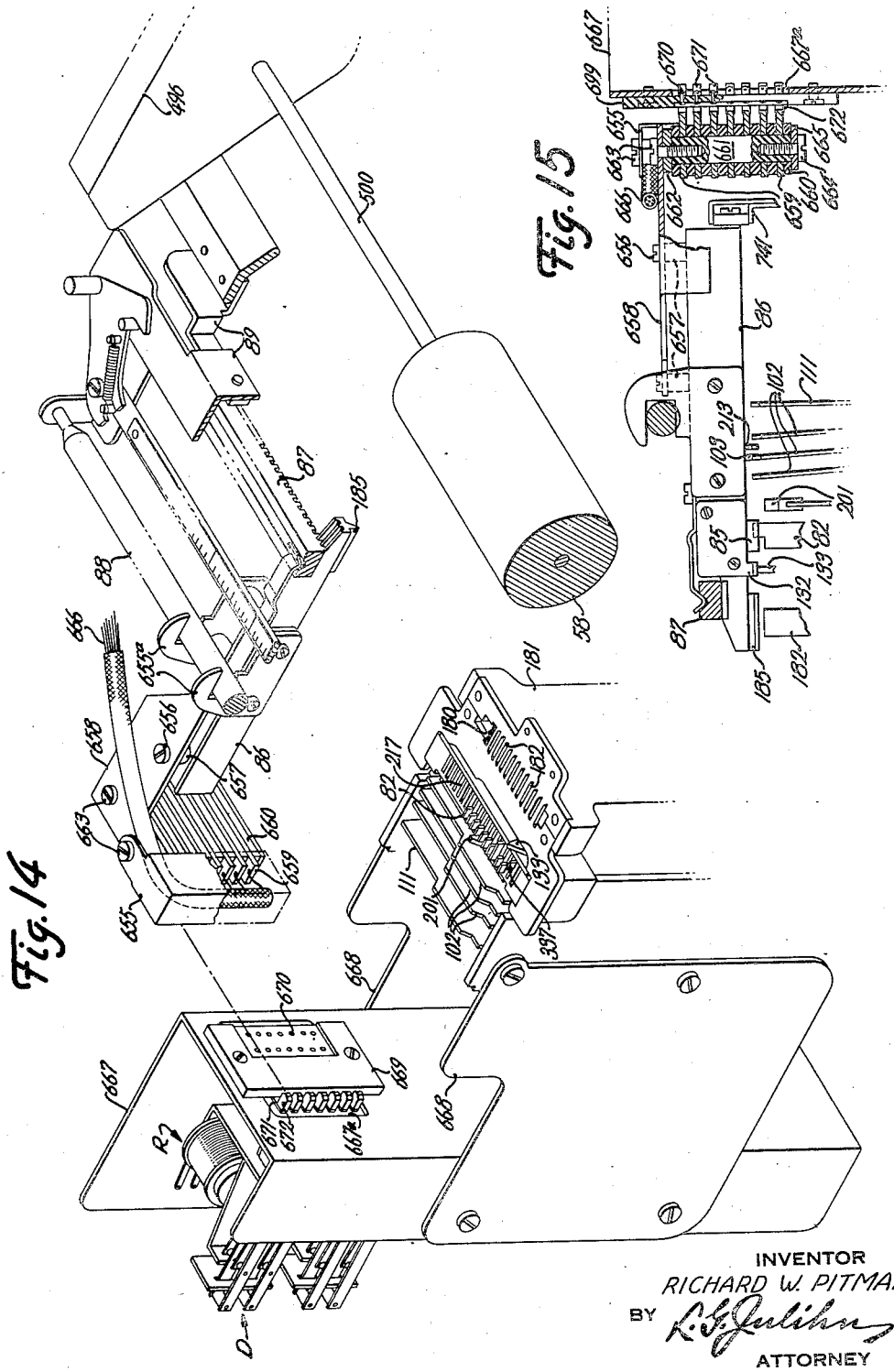

Aug. 6, 1946.   R. W. PITMAN   2,405,268
BUSINESS MACHINE
Filed Nov. 21, 1941   25 Sheets-Sheet 8
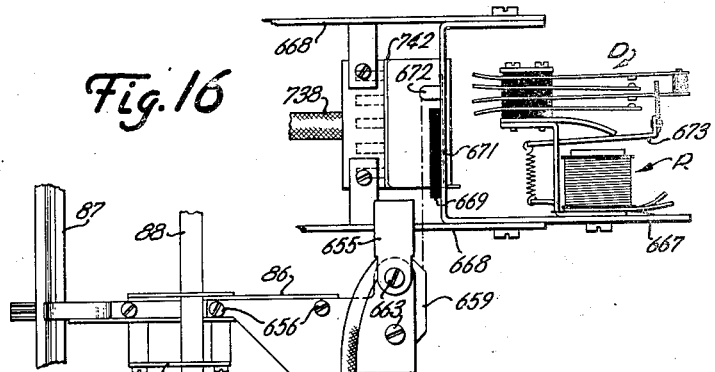
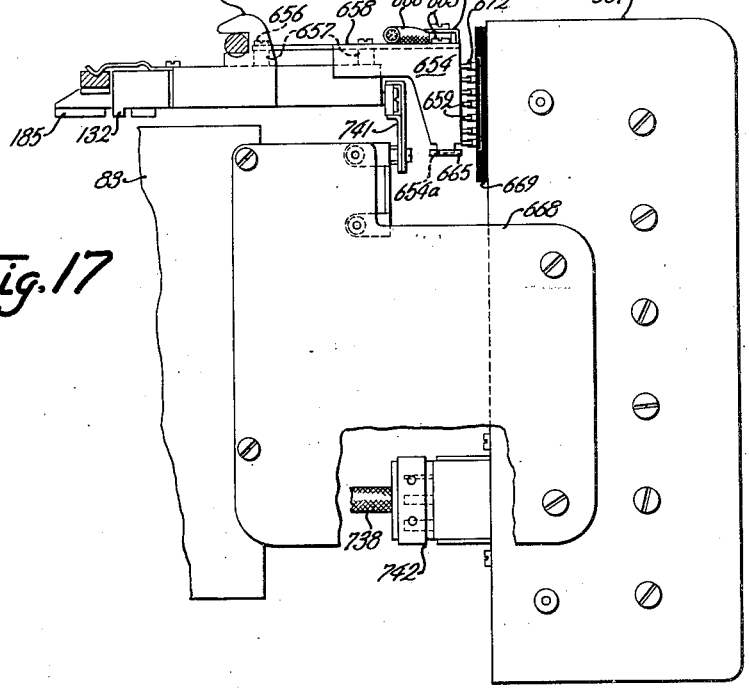
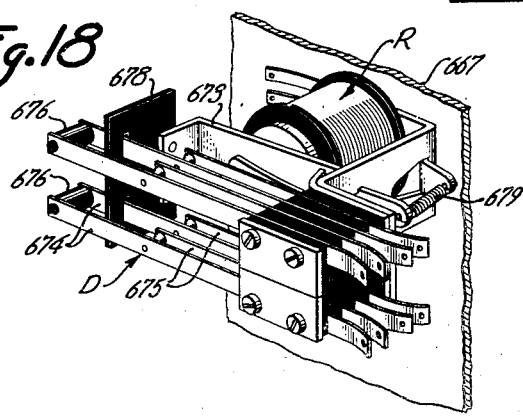
INVENTOR
RICHARD W. PITMAN
BY
ATTORNEY

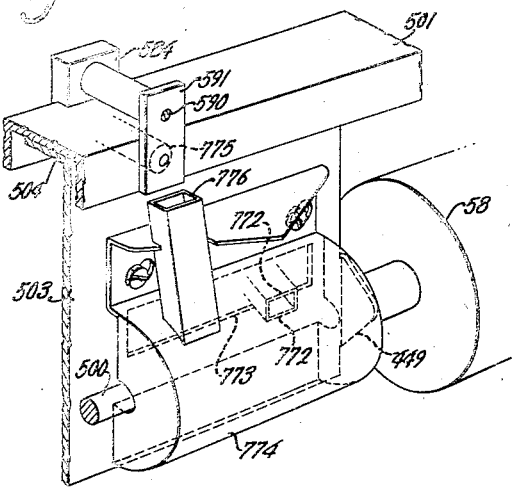
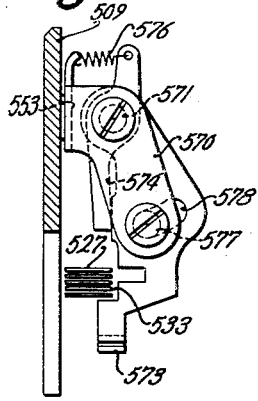
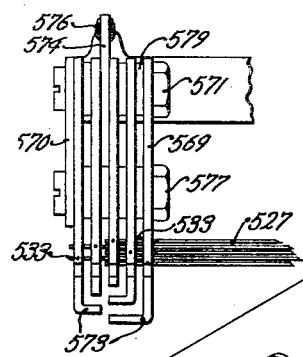
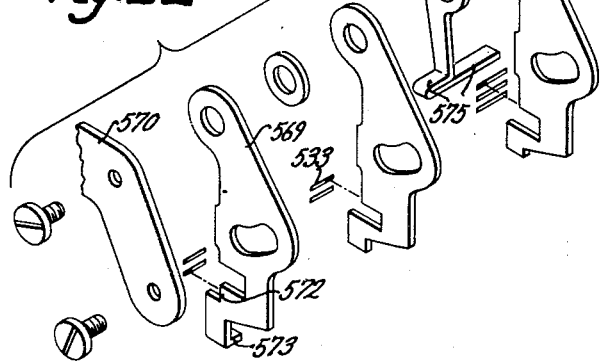
INVENTOR
RICHARD W. PITMAN

Aug. 6, 1946.　　　　R. W. PITMAN　　　　2,405,268
BUSINESS MACHINE
Filed Nov. 21, 1941　　　25 Sheets-Sheet 10
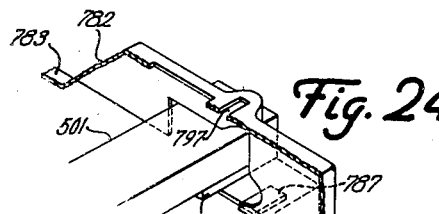
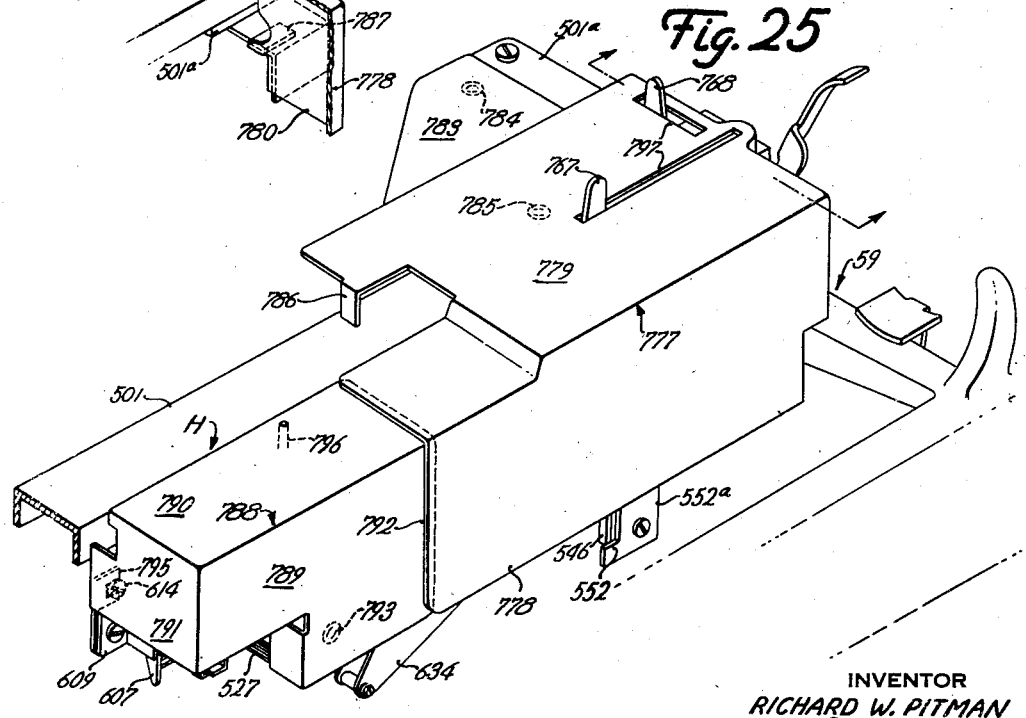
INVENTOR
RICHARD W. PITMAN
BY
ATTORNEY Aug. 6, 1946.    R. W. PITMAN    2,405,268
BUSINESS MACHINE
Filed Nov. 21, 1941    25 Sheets-Sheet 11
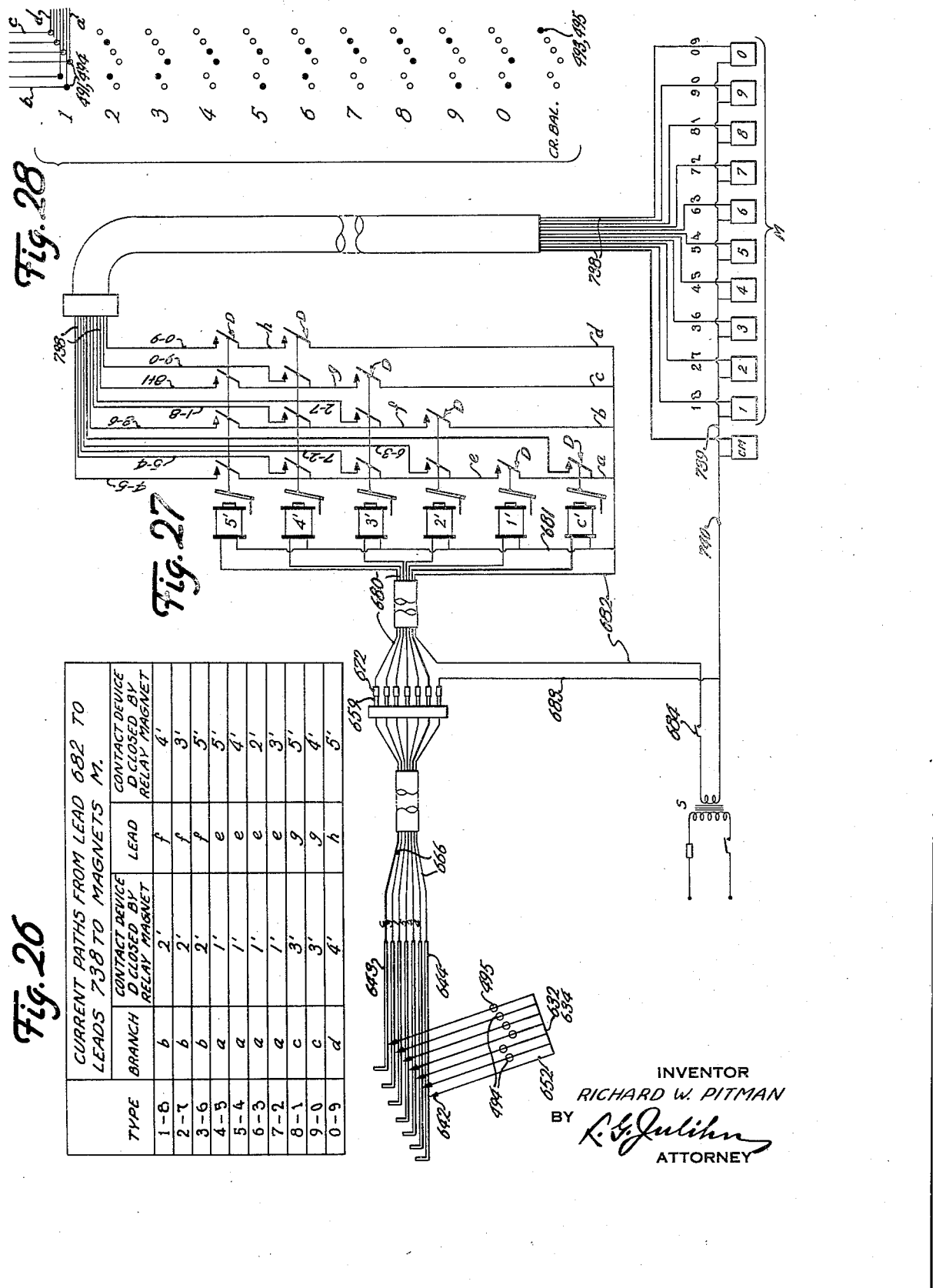
INVENTOR
RICHARD W. PITMAN
BY
ATTORNEY Aug. 6, 1946. R. W. PITMAN 2,405,268
BUSINESS MACHINE
Filed Nov. 21, 1941 25 Sheets-Sheet 12
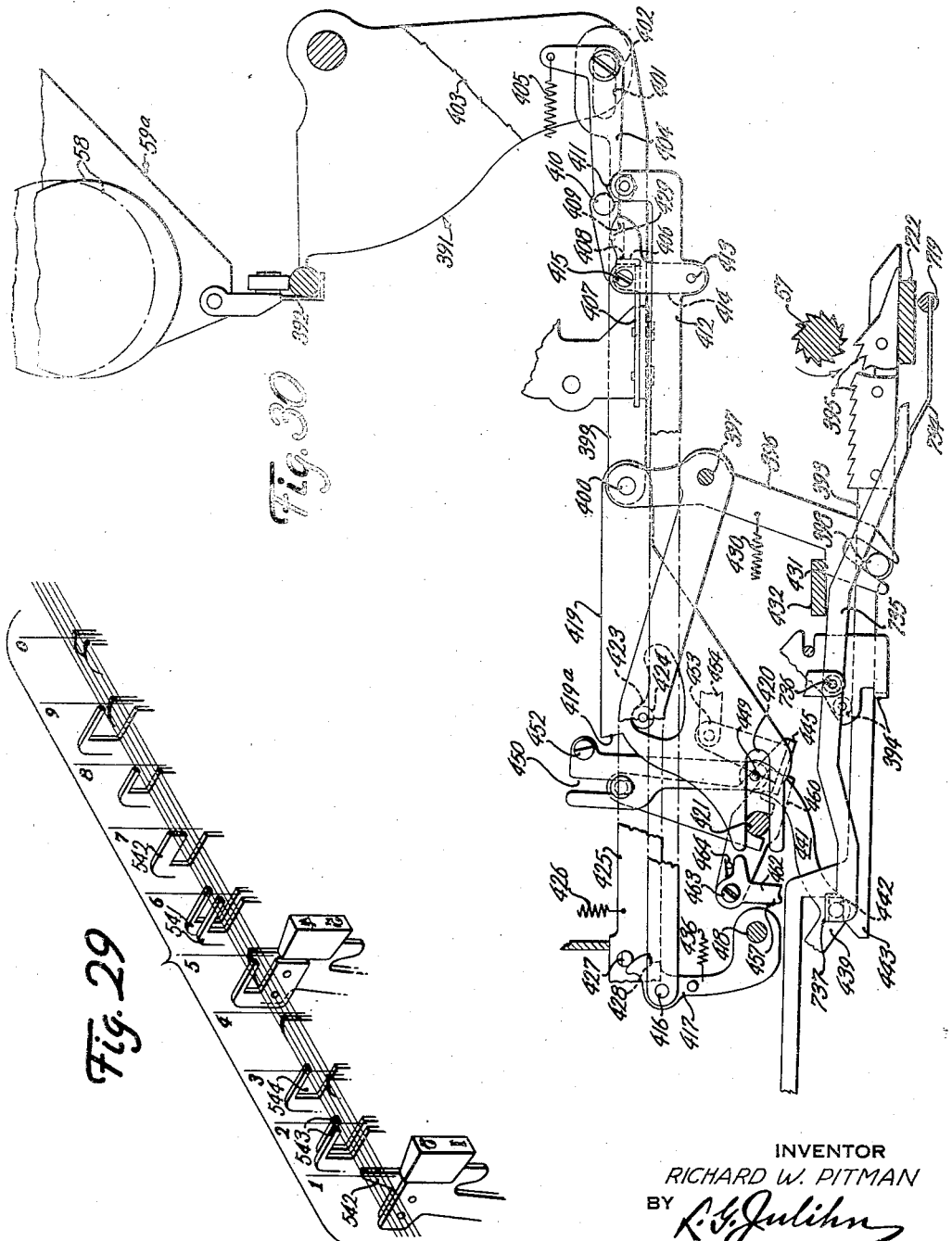
INVENTOR
RICHARD W. PITMAN
BY
ATTORNEY

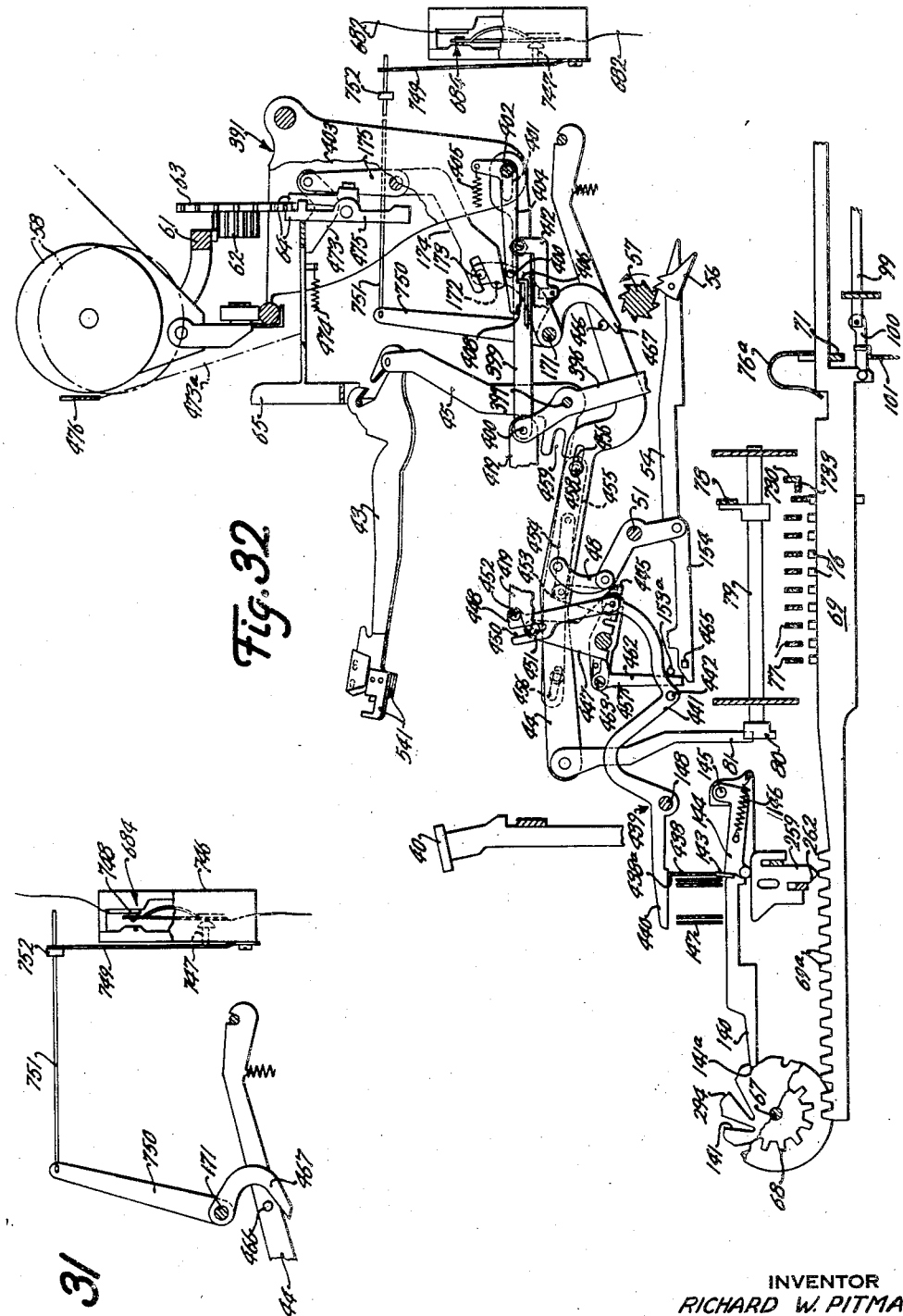

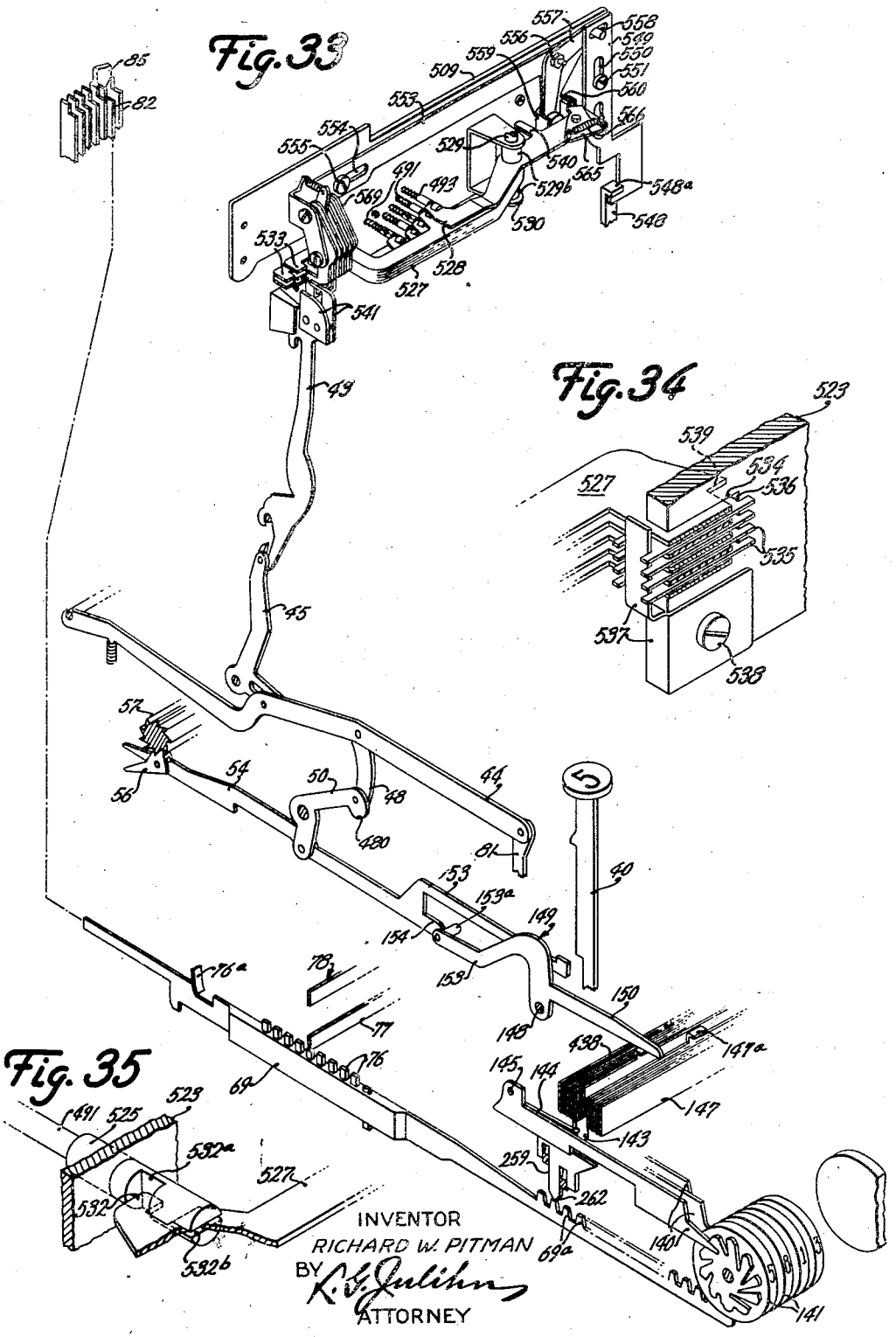

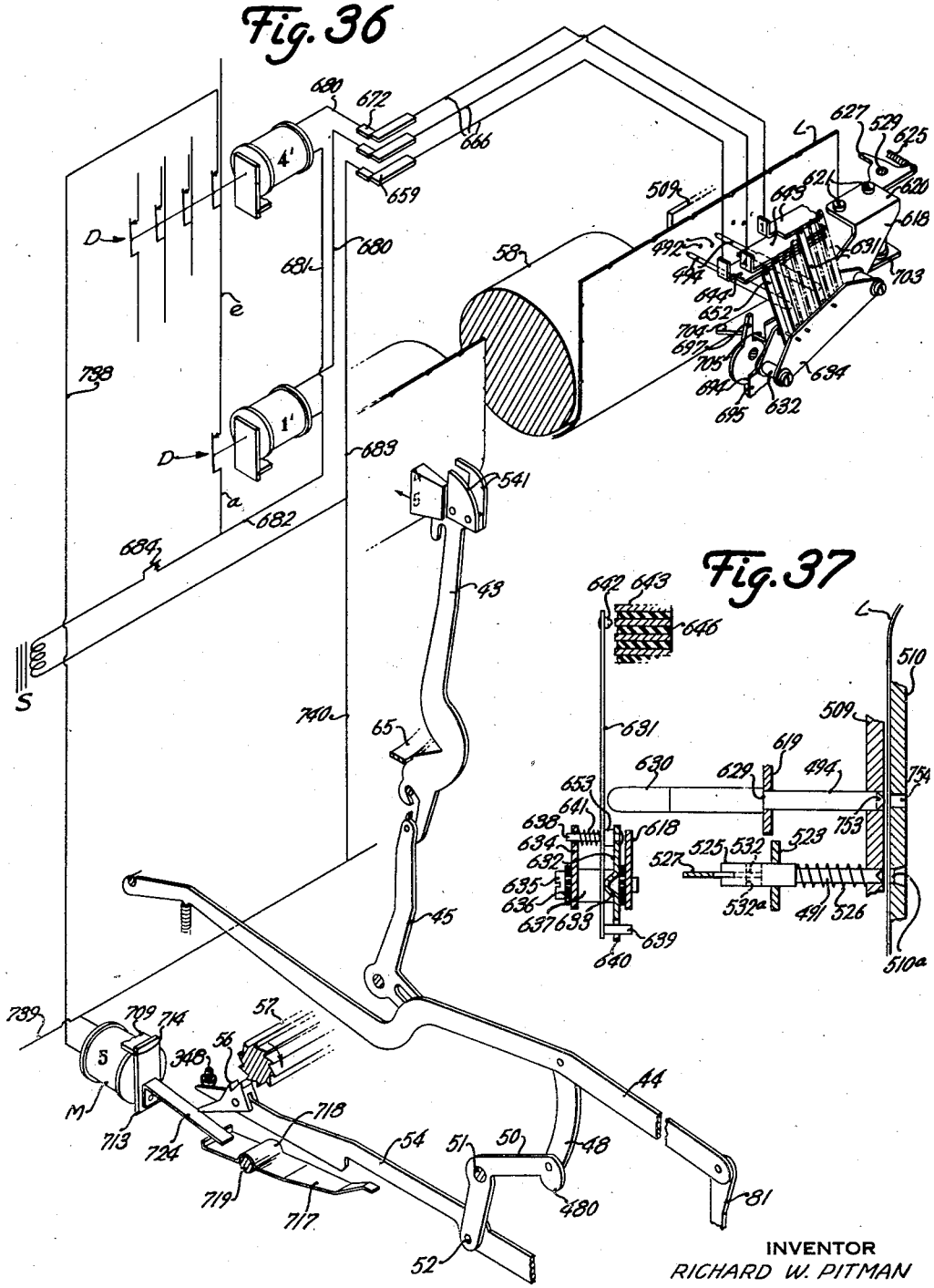

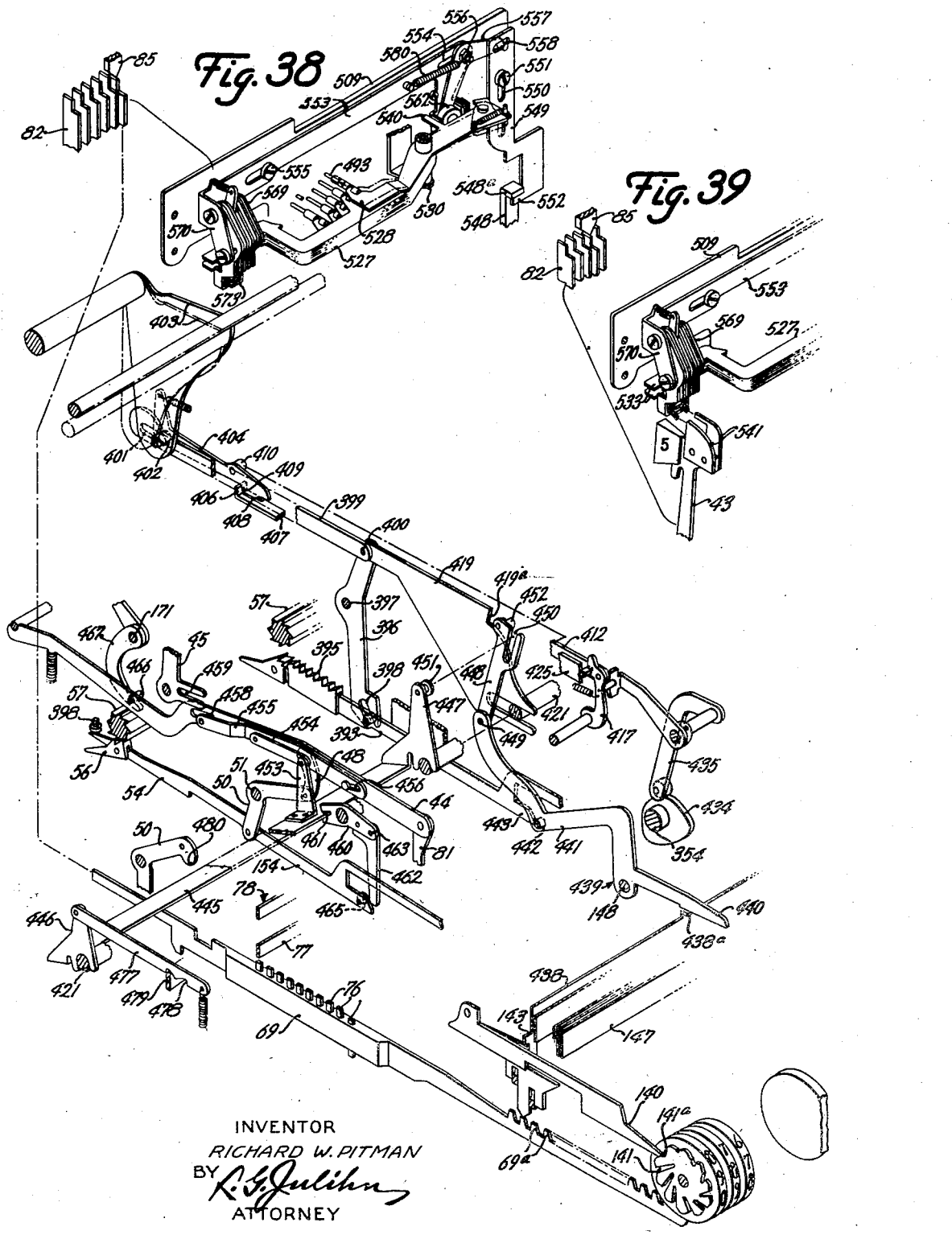

Aug. 6, 1946.   R. W. PITMAN   2,405,268
BUSINESS MACHINE
Filed Nov. 21, 1941   25 Sheets-Sheet 17
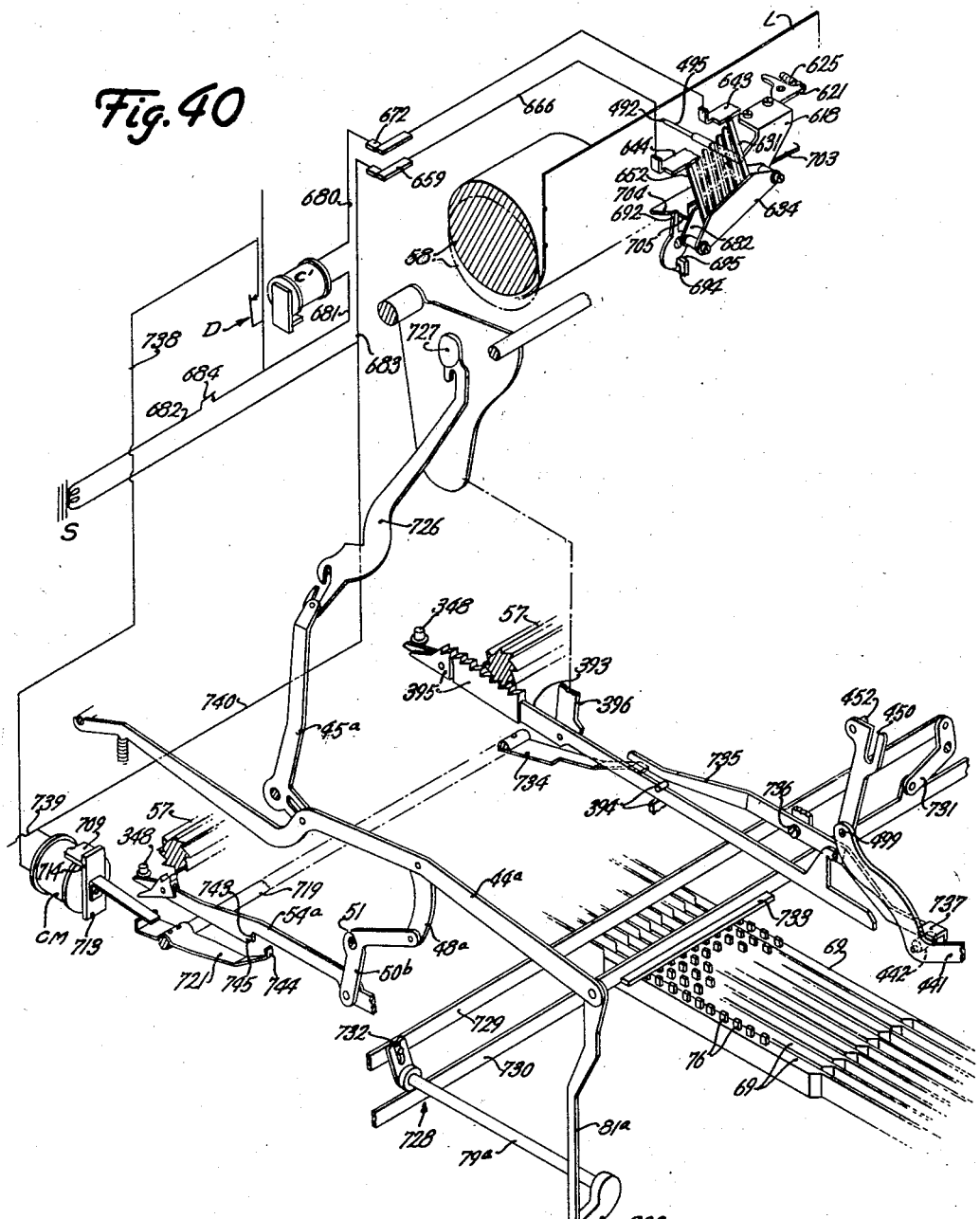

Aug. 6, 1946.    R. W. PITMAN    2,405,268
BUSINESS MACHINE
Filed Nov. 21, 1941    25 Sheets-Sheet 18
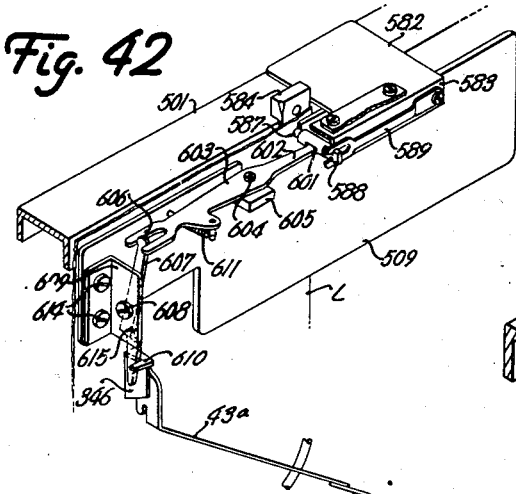
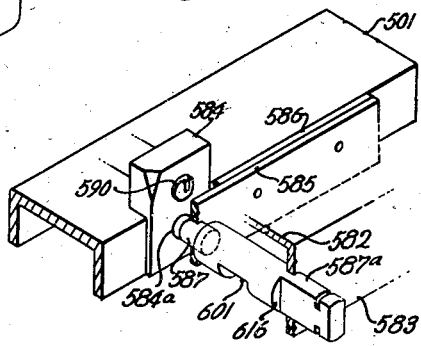
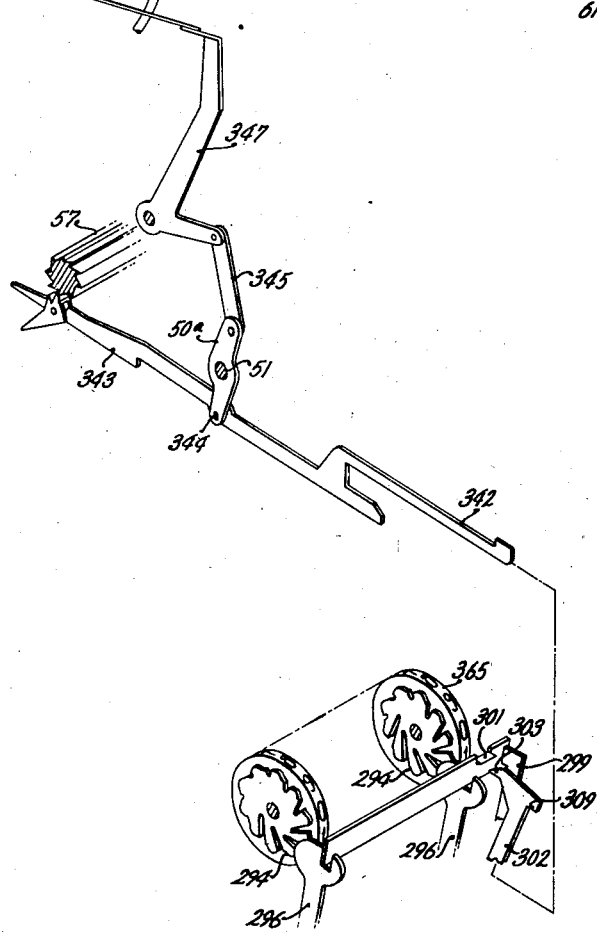
INVENTOR
RICHARD W. PITMAN
BY
ATTORNEY

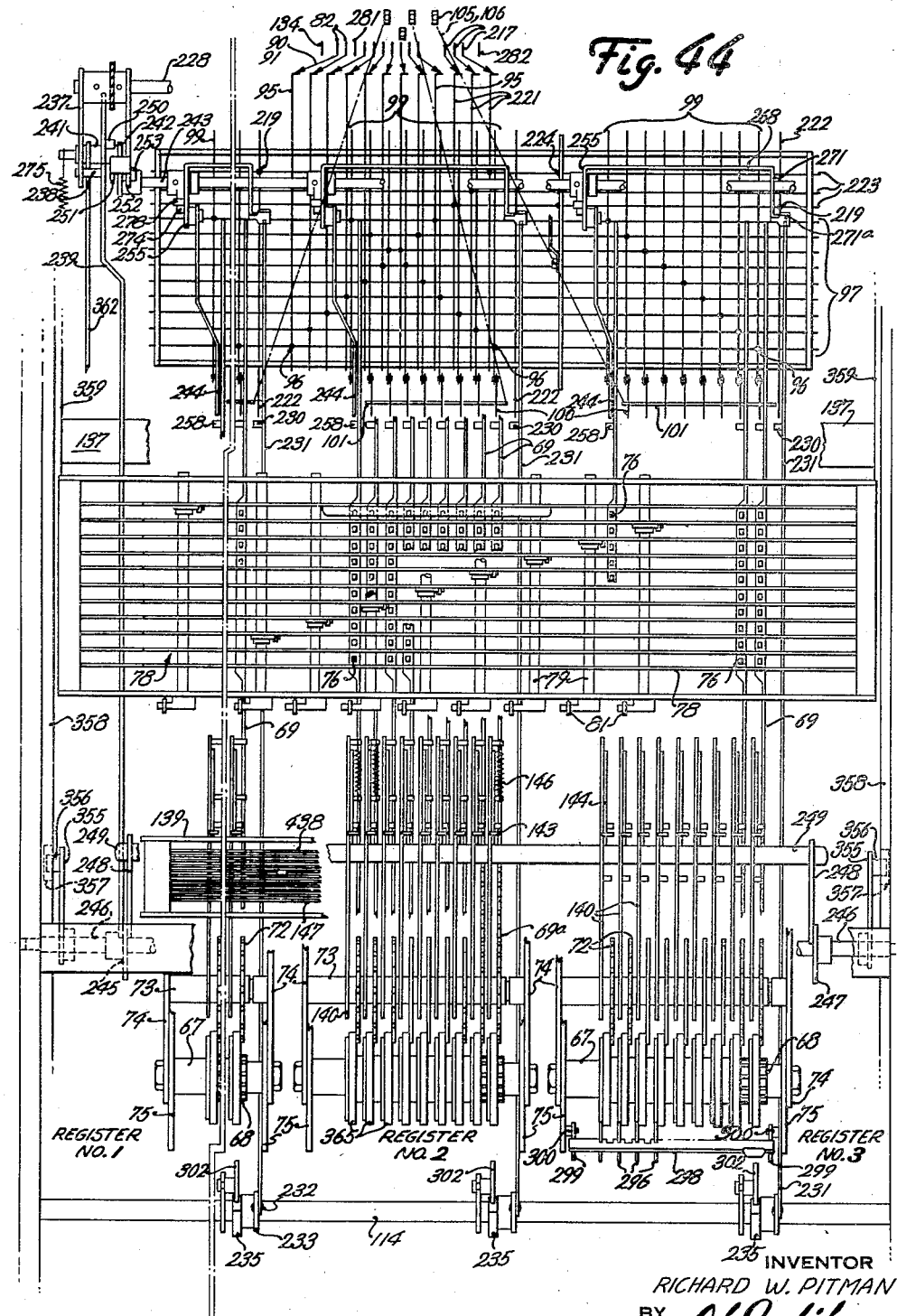

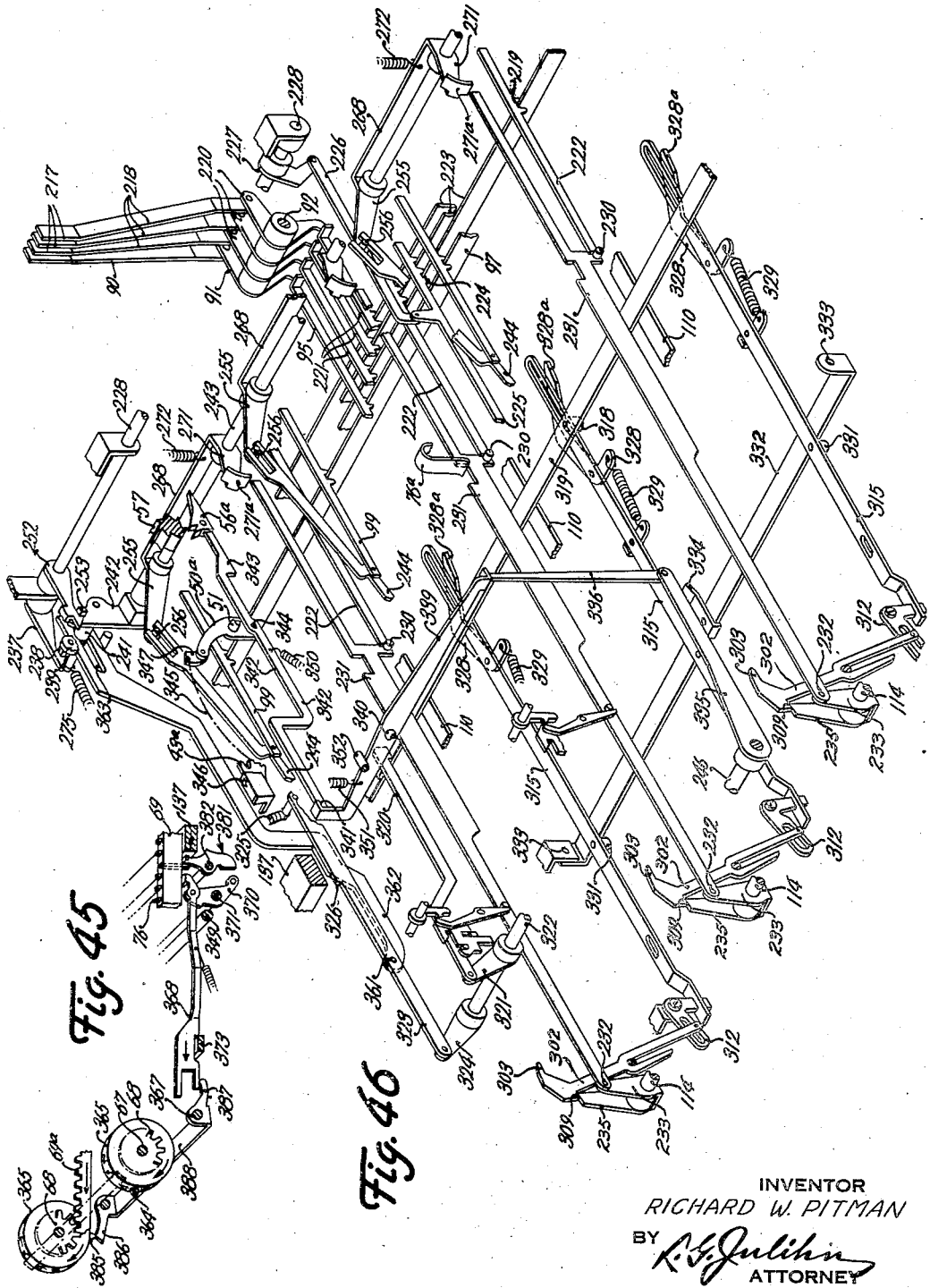

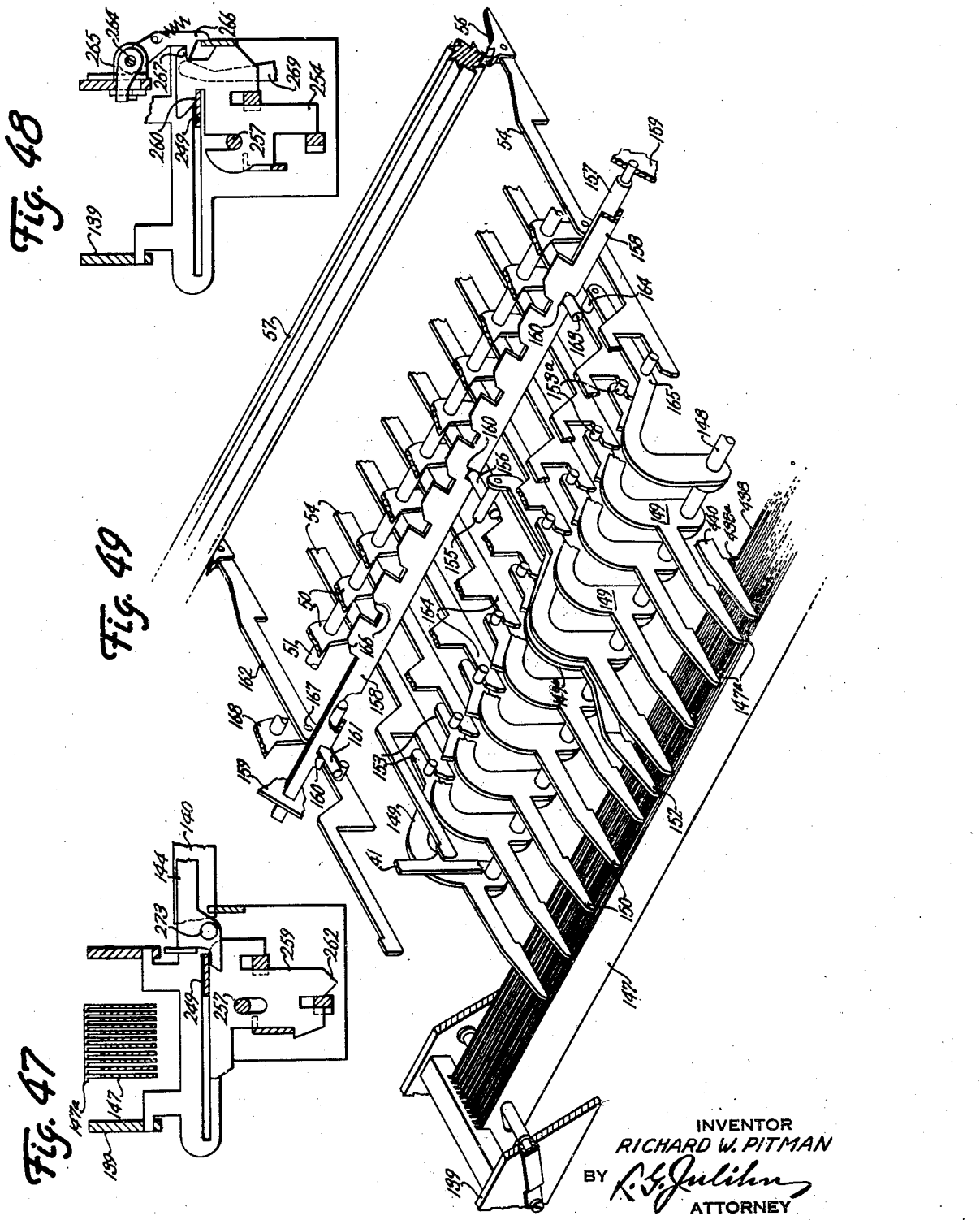

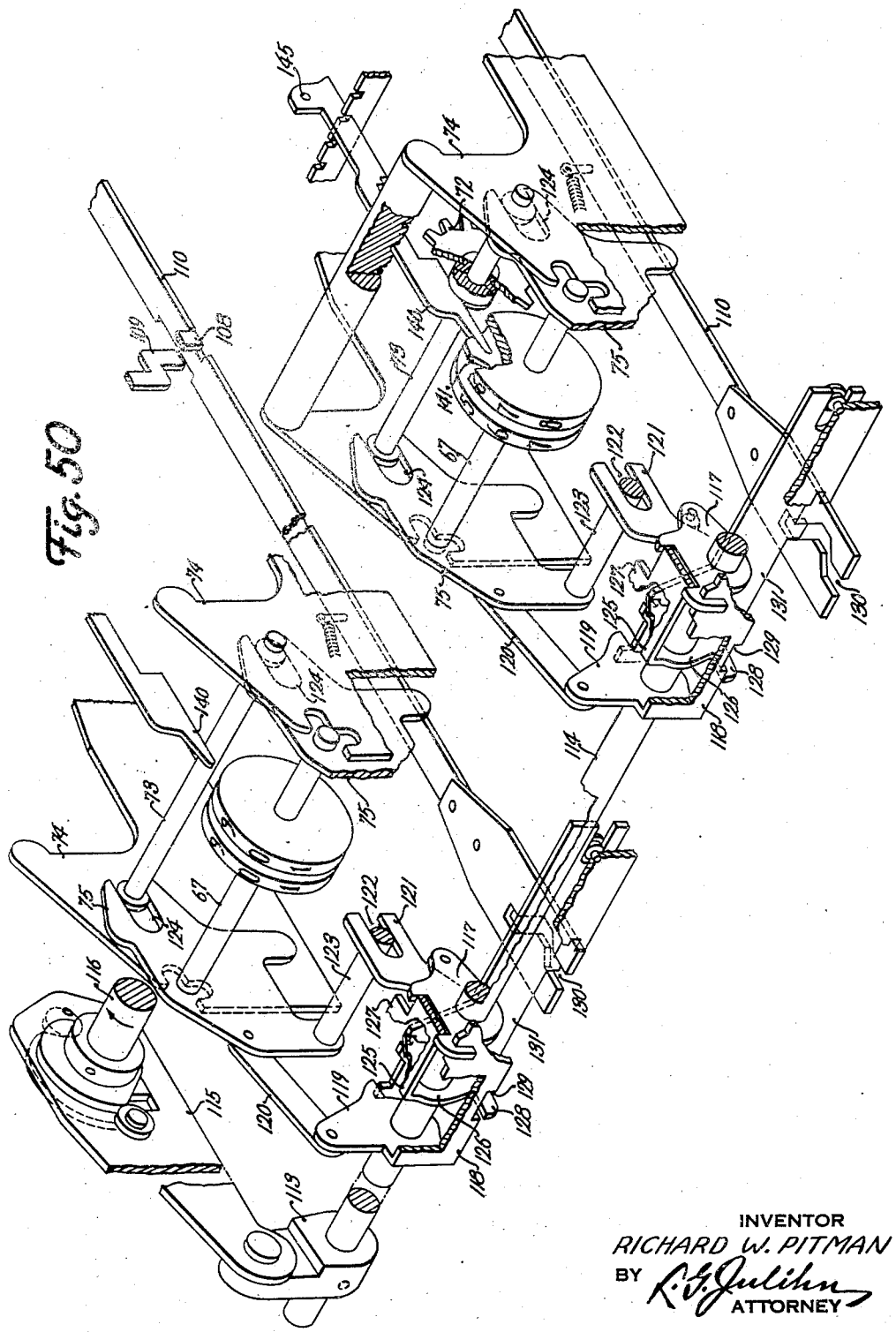

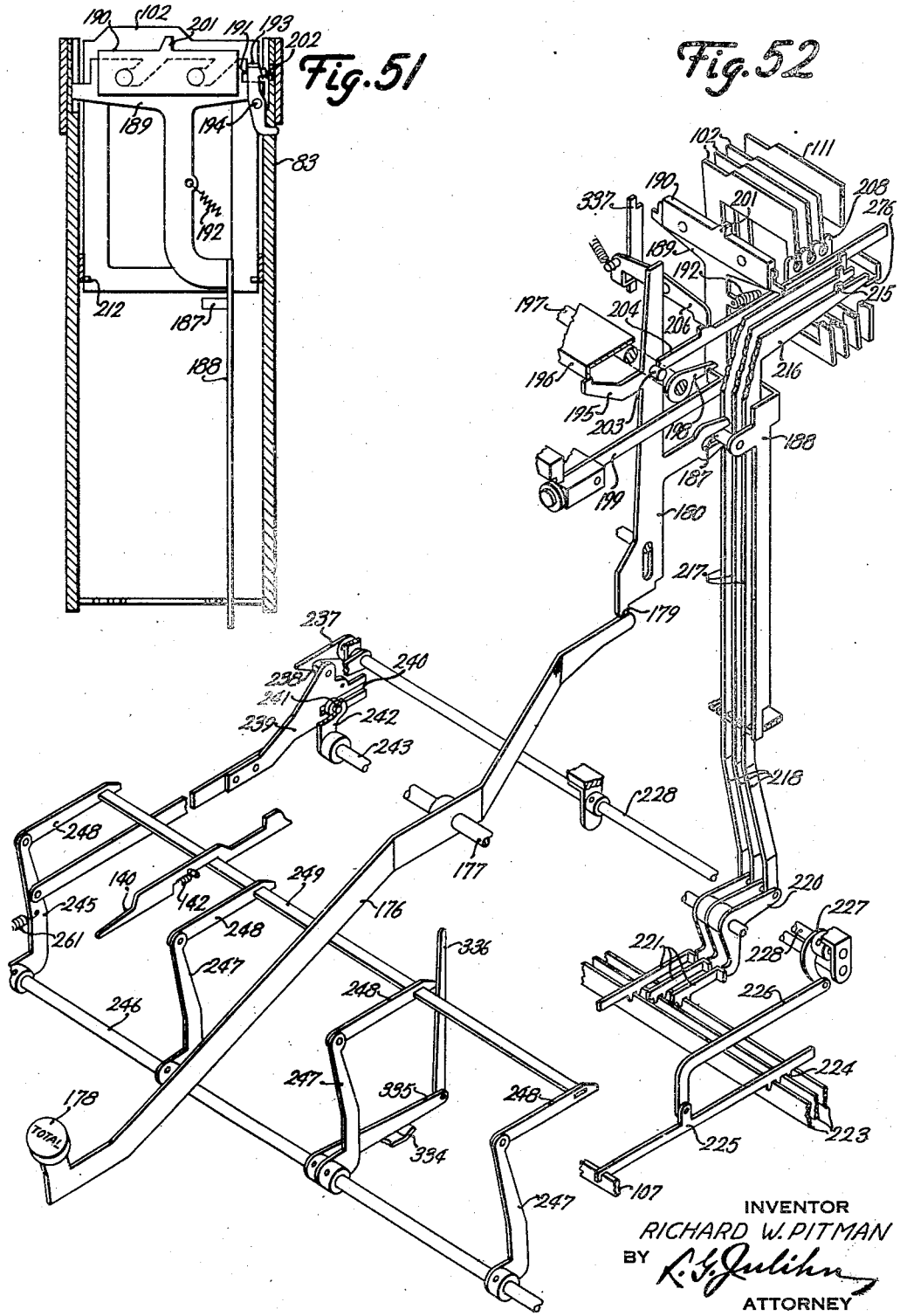

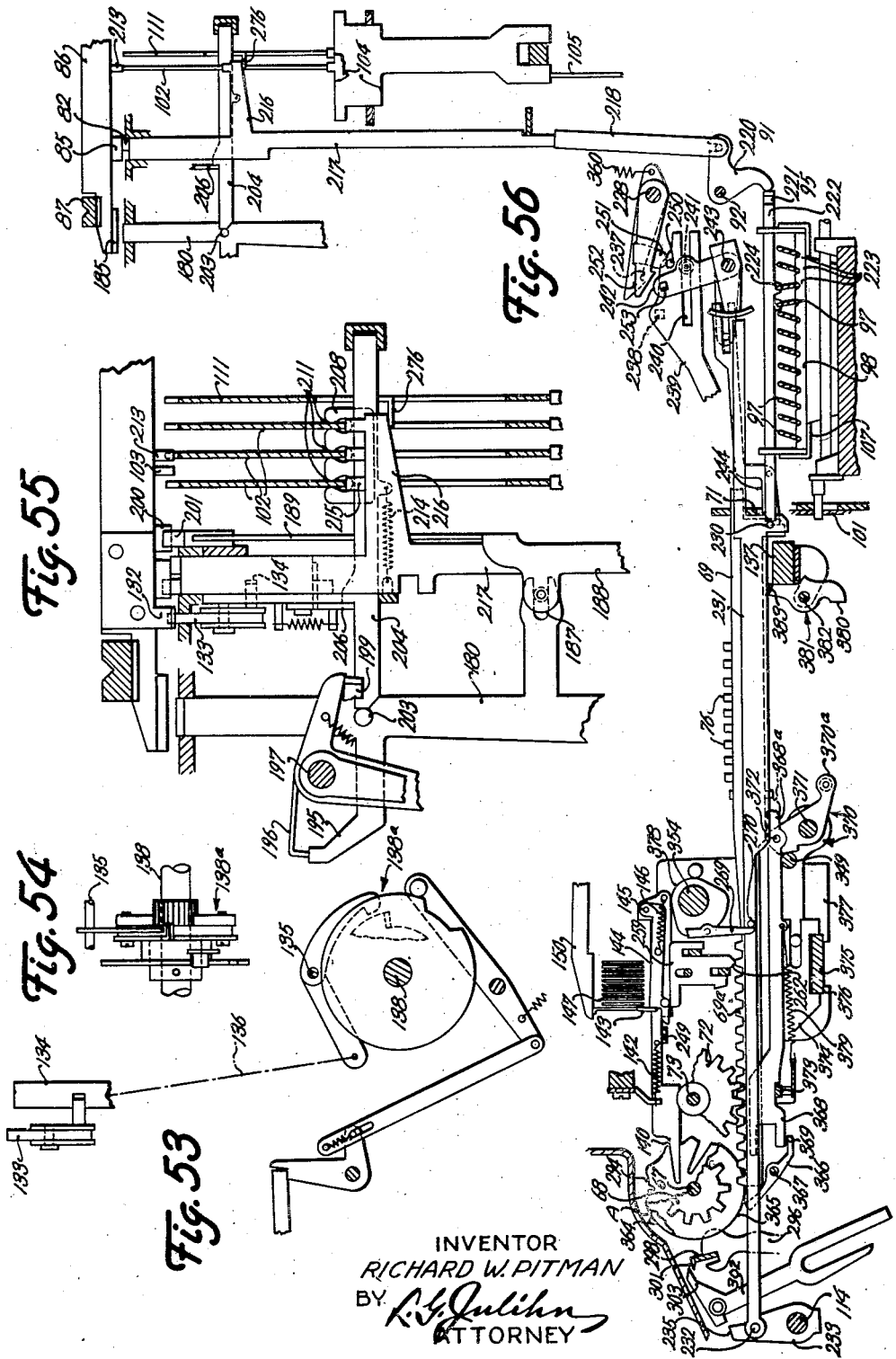

Aug. 6, 1946.  R. W. PITMAN  2,405,268
BUSINESS MACHINE
Filed Nov. 21, 1941  25 Sheets-Sheet 25
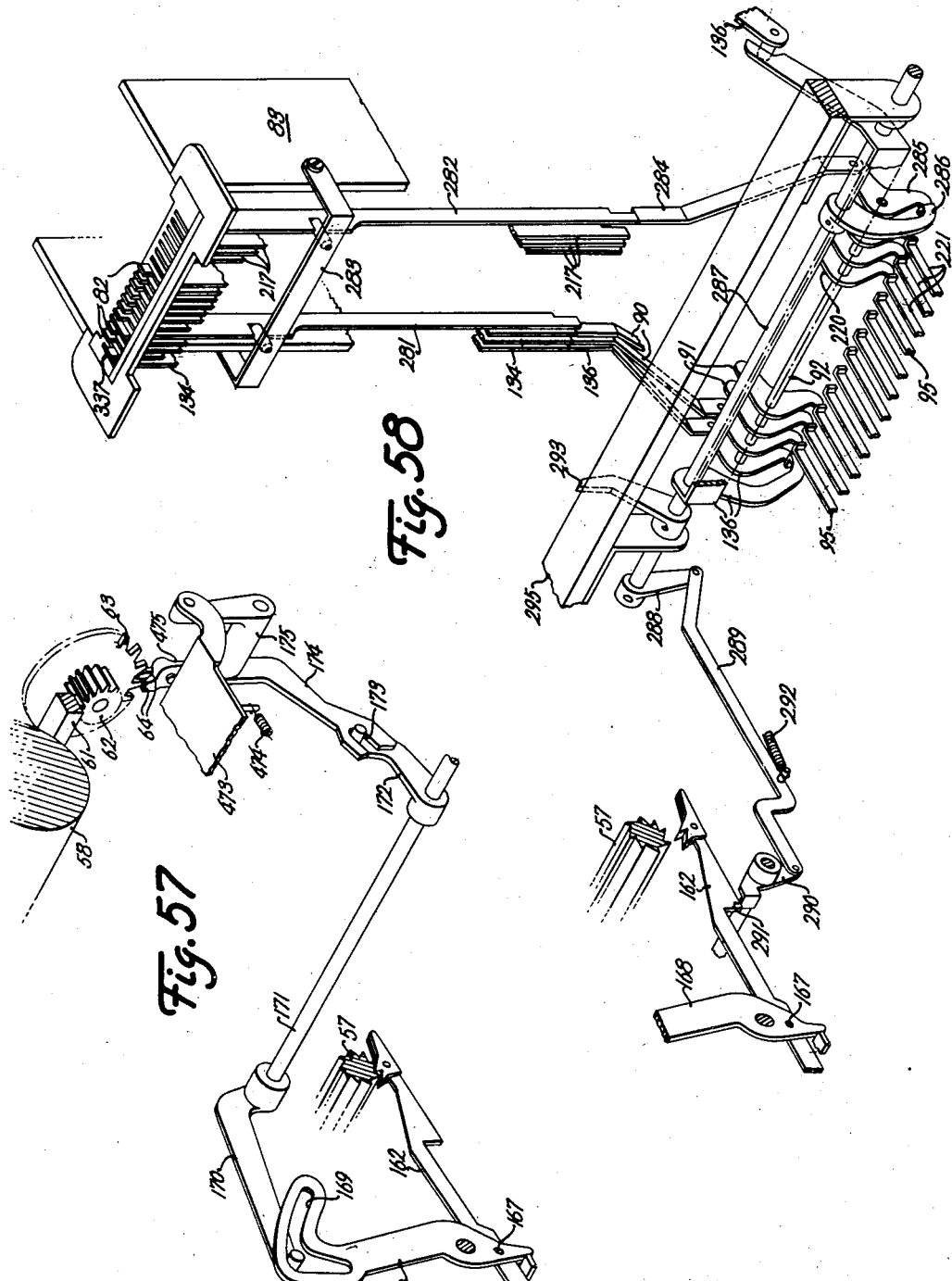
INVENTOR
RICHARD W. PITMAN
BY
ATTORNEY Patented Aug. 6, 1946

2,405,268

UNITED STATES PATENT OFFICE 2,405,268

BUSINESS MACHINE

Richard W. Pitman, West Hartford, Conn., assignor to Underwood Corporation, a corporation of Delaware Application November 21, 1941, Serial No. 419,889

16 Claims. (Cl. 235—60)

This invention relates to business machines usable for work such as computing and keeping a ledger record of progressive transactions and balances of an account.

The invention deals with recording means for recording a balance on a ledger sheet in a form which may be read or sensed by sensing means; it deals with sensing means; and it also deals with means cooperative with the sensing means for entering the balance in a register into which any transaction against the balance is also entered. The register therefore will contain a new balance which in turn may be recorded on the ledger sheet by said recording means and later picked up and reentered in the register in respect to further transactions.

These and other hereinafter-considered means are incorporated in a unitary machine and provide for automatically and reliably accomplishing work that heretofore was effected through mental and manual effort of the typist. Liability of error due to the human element is thus avoided, time and labor are saved, and other advantages are gained.

The transactions and balances may be typed on the ledger sheet. Descriptive matter involving alphabetical and other non-numerical characters may also be typed on the ledger sheet. A typewriter mechanism is therefore preferably used in order to provide for simple selective operation of the necessary types. Another advantage of using typewriter mechanism is that in accordance with its typing one character at a time, there may be simplification of the recording-means and the sensing-means in that these may also function for one character at a time in coordination with the step-by-step feeding movements of the typing carriage.

It is therefore one object of the invention to deal with a combined typewriting and computing machine.

By way of illustration, the invention is herein shown applied to a combined typewriting and computing machine of the Underwood-Hanson class. In this class of machine, the operations of numeral type actions of a typewriter are attended by the setting of index-pins in register-bars which are selectable in denominational order under control of the typing-carriage. The machine is subsequently cycled to move the register bars and register wheels to extents determined by the indexed pins. A machine of this class is exemplified in H. L. Pitman Patent No. 2,160,487, dated May 30, 1939, and H. L. Pitman Patent No. 2,192,365, dated March 5, 1940.

My copending application Serial No. 102,389, filed September 24, 1936, now Patent No. 2,278,118 also concerns a combined typewriting and computing machine adapted for automatically picking up and reentering old balances, and computing and recording new balances, and said copending application is therefore basic to the present disclosure which concerns novel and important features of improvement.

A present improvement lies in providing means for treating overdraft or negative balances as well as positive balances.

Another present improvement lies in providing means for operating the recording means automatically in accordance with a new balance in the register.

A new balance is recorded on the ledger sheet by codal representations in the form, preferably, of perforations made in the ledger sheet. Each numeral of a balance is represented by a distinctive perforation, in the ledger sheet, based on a combination scheme so that in any case the perforation will be within a small area of the sheet.

Another improvement lies in improving the combination scheme of perforations to the end that the areas of perforation for successive characters may be expanded to provide for spreading the individual perforations representing a character. This conduces to reliable operation of the sensing means.

Another improvement lies in arranging the perforating mechanism so as to dispose the perforations in the ledger sheet well to one side of the corresponding typing of the balances instead of having the typing and perforations interspersed vertically. One resulting advantage is that the punching and sensing means may be disposed so as not to obstruct visibility of the new balance on the ledger sheet while such new balance is being typed. Another advantage is that disposition of the punching and sensing mechanism relatively to other parts of the machine may be facilitated.

Another improvement lies in providing for indexing the ledger sheet in respect to an overdraft balance in order to distinguish the latter from a positive balance. Specifically, a new overdraft balance may be codally represented on the ledger sheet according to the complement of the true overdraft inasmuch as these codal representations are made on the ledger sheet under the control of the register wheels which stand at the complemental positions in the case of an overdraft.

However, the true overdraft may be typed on the ledger sheet in conjunction with entering the complemental codal representations on said sheet. This involves the use of a shift mechanism, preferably operable under control of the register, to determine automatically that the typing mechanism will be actuated according to the true overdraft instead of according to the complement. In reentering the overdraft balance in the register under control of the complemental perforations preparatory to striking another new balance, the true overdraft again may be typed on the ledger sheet under control of said perforations and shift mechanism. Therefore, in entering complemental codal representations on the ledger sheet, the aforementioned distinguishing representation is also made on the ledger sheet. This distinguishing representation may be in the form of an extra perforation disposed in conjunction with the perforations that represent the complement of the true overdraft.

Another feature of the invention is to have a punching device, for the extra perforation on the ledger sheet, operable automatically under control of the register if the latter stands at a complemental amount indicating an overdraft. The extra perforation may control the shift mechanism in order to determine retyping of the true overdraft when its complement is reentered in the register under control of the complemental ledger sheet perforations.

In punching the complement of the overdraft on the ledger sheet under control of the register, no punching is made on the ledger sheet for any insignificant "9" which may stand in any register wheel of higher denominational order than the wheel representing the first significant figure of the overdraft complement. But in reentering the overdraft in the register, it is the complement that is reentered, and this reentry must include the reentry of "9" in any wheel higher than the wheel in which the first significant figure of the overdraft complement is entered. Another feature of the invention lies in means whereby the extra perforation on the ledger sheet determines the entry of "9" into any such higher wheel.

It is to be noted that the register is cleared each time a registered new balance is recorded on the ledger sheet and that therefore before a subsequent computing of a new balance of a transaction against the recorded balance is made the register initially will be clear.

The ledger sheet is insertable in the machine to receive an entry comprising, say, the current balance, a new transaction, and the resulting new balance. For each last entry, a hole is punched in the sheet and subsequently serves for relocating the sheet in the machine so as to place the next entry a line space from the last previous entry. The locating hole also serves to locate the last entered codal representations in exact relation to the sensing means.

Another object of the invention is to provide improved means for punching the sheet locating hole. To this end there is provided means for punching the sheet-locating holes by power and there is further provision for doing this through the agency of a device that is operated by power for another function when an entry is made. In the present instance, a certain type on the typewriter is automatically caused to be actuated by power to print on the ledger sheet a symbol indicating the clearing of the register which occurs concurrently with the codal recording of the new balance. The present invention includes provision whereby the same means that work the clear-sign-type by power may also serve for power-punching the sheet locating holes. This may also involve provision for power-operating the clear-sign-type independently, that is, without operating the locating-hole punch.

The holes which constitute the balance-representing codal perforations may be circular and of small diameter, say, five hundredths of an inch. By reason of the preferred codal scheme, the holes may also be spaced very closely together in representing all the digits of a balance. In view of this, the invention also relates to sensing means so arranged as to conduce to exact cooperation thereof with the ledger sheet holes under step-by-step control of the typing carriage. The sensing means may be electrical in that the codal holes govern the opening and closing of contacts for controlling operating circuits for the balance-reentering means. Sensing pins are pressed against the ledger sheet and the latter may traverse the pins as the typing carriage moves step-by-step. Therefore the pins are moved to enter any holes presented to them by reason of the step-by-step movements of the ledger sheet. Conversely, any entered pin will be restored by the next step of movement of the ledger sheet in that the edge of a hole may cam the entered end of a pin out of the hole. Due to the small holes and the desired camming action thereof on the sensing pins, the in-and-out movements of the latter are small. Further, it is unfavorable to depend on making electrical contacts at the hole-entering ends of the pins. To avoid this, there may be provided circuit controlling contacts operable apart from the codal holes and these contacts may be amply moved by the small movements of the pins through use of motion-multiplying means, to operatively connect the pins and contacts. Such arrangement will function properly to make and break the contacts even though a sensing pin does not fully enter a ledger sheet hole as where the hole may happen to be partly clogged. It will also function in response to a mere indentation or embossment of the ledger sheet surface in case it may be desired to use such expedient in lieu of punching through the ledger sheet.

Parts of the hole-sensing means and the hole punching means are contained in a head mounted on the typing carriage. The head may move along with the typing carriage in its letter feed travel and it may also be arrested at predetermined punching and sensing zones of the carriage advance so that only the carriage and hence the ledger sheet advance step by step. This provides for step-by-step traverse of the sensing-pins and punches by the ledger sheet at said zones, and it also provides for limiting the occurrence of punching and sensing to said zones and excluding punching and sensing at other zones. Certain features of the invention relate to such sensing and punching head and for controlling same in respect to its movement or non-movement with the carriage.

The foregoing and other features, objects, and advantages of the invention will be understood from the following description and accompanying drawings of a preferred embodiment.

In said drawings:

Figure 3 is a perspective showing use of a lock-out device for the punching and sensing head.

Figure 4 is a perspective of the typing carriage and the punching and sensing mechanism.

Figures 5, 6 and 7 are respectively a top plan view, a front elevation, and a side elevation of the punching and sensing mechanism.

Figure 8 is a cross-sectional side view of a stack of contact bars of the sensing mechanism.

Figure 9 is a rear view perspective of foundation structure of the punching and sensing head.

Figure 10 is a front view perspective of supporting structure on the carriage for the head.

Figure 11 is a front view perspective of the foundation structure of Figure 9.

Figure 12 is a perspective of the sensing pin mounting.

Figure 13 is a perspective of the carriage and devices for stopping the punching and sensing head in punching and sensing positions.

Figure 14 is a perspective of column-unit mechanism on the carriage and mechanism traversed thereby for sensing operations.

Figure 15 is a cross-sectional side elevation of the column unit and the contact mechanism associated therewith for the sensing operations.

Figures 16 and 17 are respectively a top plan view and a side elevation of said column unit, contact mechanism and a relay box.

Figure 18 is a perspective of a relay unit.

Figure 19 is a rear view perspective of a receptacle for punching scrap.

Figures 20 and 21 are respectively a side elevation and a front elevation of mechanism for operatively connecting the punching levers and punch actuators when the machine is in upper case condition.

Figure 22 is a perspective of members of Figures 20, 21 separated for illustrating details.

Figure 23 represents a ledger sheet.

Figure 24 is a perspective of the right side portion of casing for the punching and sensing mechanism.

Figure 25 is a perspective of the complete casing for the punching and sensing mechanism.

Figure 26 is a table of electric circuit branches of the sensing mechanism.

Figure 27 is a circuit diagram.

Figure 28 represents the code and arrangement of punches or sensing pins.

Figure 29 is a perspective diagram of punch-operating strikers on the several numeral type bars.

Figure 30 is a side elevation of the case-shift mechanism.

Figure 31 is a fragmentary side view of a switch and connections cooperative with the letter-feed of the carriage.

Figure 32 is a side elevation of indexing and carriage feeding mechanism cooperative with a highest order computing wheel when the latter registers a negative-balance-manifesting figure.

Figure 33 is a perspective illustrating the operation for punching a representation of a positive digit, under control of a computing wheel.

Figure 34 is a perspective illustrating the spacing and support of punching levers.

Figure 35 is a perspective of the operative connection of a punching lever and punch.

Figure 36 is a perspective illustrating the operation of sensing a positive digit.

Figure 37 is a large-scale cross-sectional side elevation of details of the punch, sensing pin and contact devices.

Figure 38 is a perspective illustrating the operations, including case shifting, in regard to punching a negative balance.

Figure 39 is a perspective illustrating the operation for punching a negative balance digit, the machine being in upper case condition.

Figure 40 is a perspective illustrating the operation for sensing the extra hole that indicates a negative balance.

Figure 41 is a diagram of the upper and lower case numeral types.

Figure 42 is a perspective showing the operation for clear-sign printing and punching the ledger sheet with a locating hole.

Figure 43 is a perspective of the punch and die structure for the sheet locating hole.

Figure 44 is a plan view diagram of the computing mechanism.

Figure 45 is a perspective of a fugitive-one device.

Figure 46 is a perspective of the clear-sign printing mechanism and controls.

Figures 47 and 48 are cross-sectional side views of details of total-reading and type-selecting devices.

Figure 49 is a perspective of the type selecting mechanism.

Figure 50 is a perspective of state control mechanisms for the registers.

Figure 51 is a cross-sectional front elevation of a total-key-operable carriage stop.

Figure 52 is a perspective of mechanism cooperative with the total key for determining total-printing.

Figures 53 and 54 are respectively a side elevation diagram and a rear elevation diagram of cycling mechanism members.

Figure 55 is a cross-sectional side elevation of controls cooperative with a column unit on the carriage for total printing.

Figure 56 is a cross-sectional side elevation of the machine illustrating the operation for total reading, type selection and clear-sign printing.

Figures 57 and 58 are each a perspective showing details of the carriage spacing mechanism.

*Typewriter mechanism*

Figure 1:
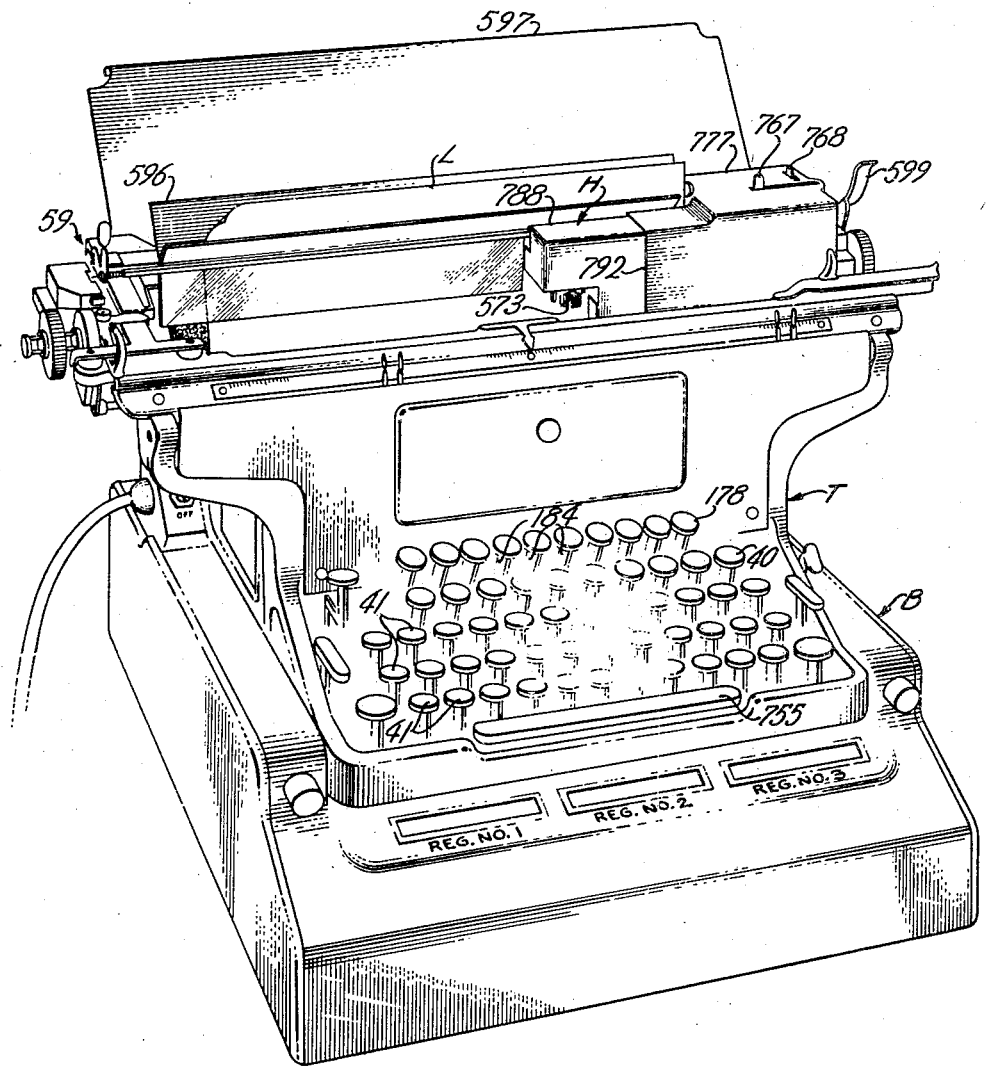
Figure 1 is a perspective of a combined typewriting and computing machine embodying the invention.
Figure 2:
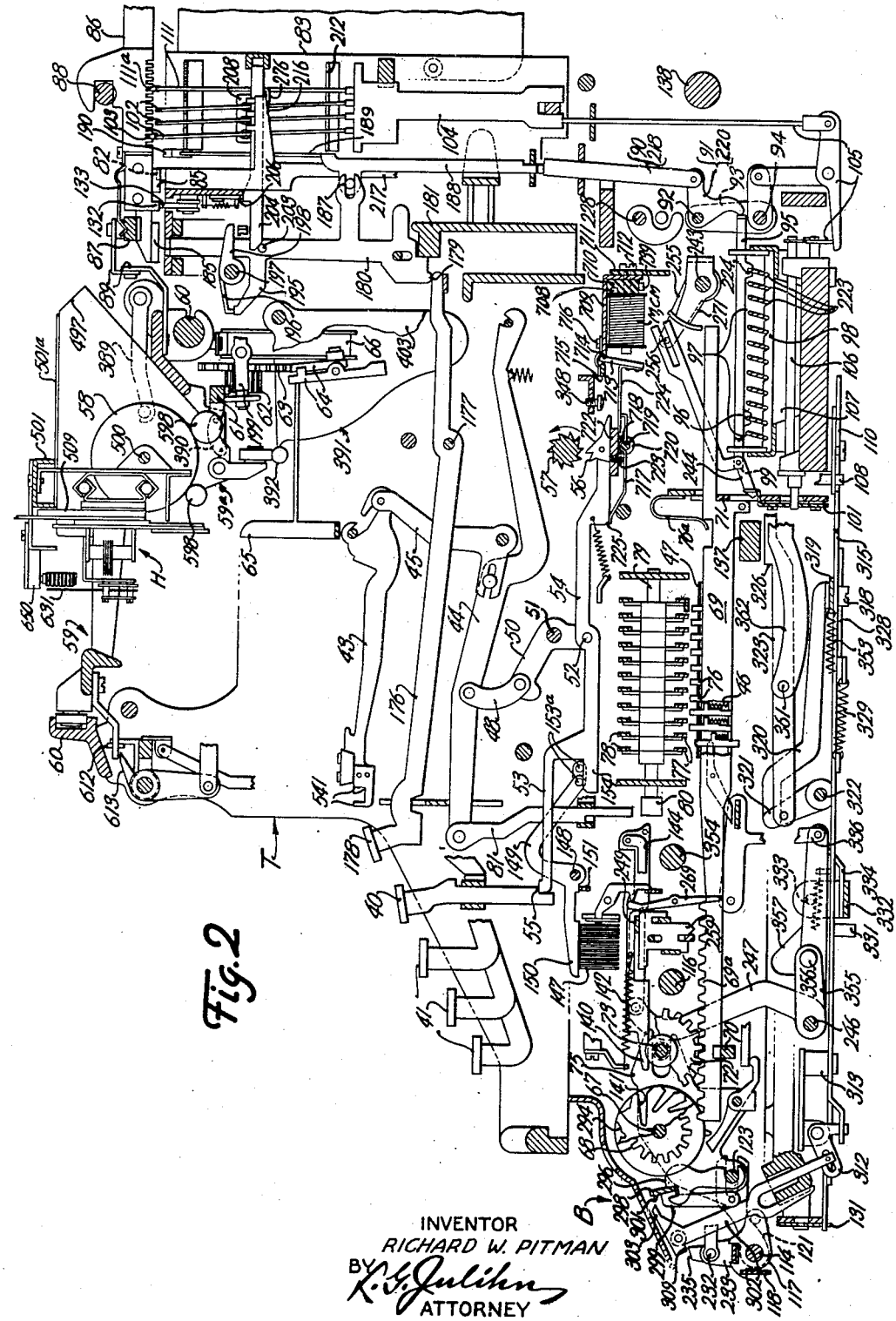
Figure 2 is a cross-sectional side elevation of said machine.

Each of numeral keys 40 in a typewriter T, Figures 1 and 2, is for a corresponding numeral type action comprising a type bar 43, an operating lever 44 and bell crank 45. A link 48 connects each lever 44 to a lever 50, the several levers 50 having a common fulcrum rod 51. Each lever 50 has pivoted thereto at 52 a draw link 54 having an arm 53 operatively connected as at 55 to a corresponding key 40. Depression of key 40 rocks draw link 54 about pivot 52 to engage pawl 56 of said link 54 with a continuously rotating power-driven toothed snatch roll 57 journaled in the typewriter framework. The rotating snatch roll 57 turns pawl 56 initially to a stop position on link 54 and then draws link 54 rearwardly to swing the corresponding type bar 43 upwardly and rearwardly to a type guide 49, Figure 13, to print against a platen 58 in a typing carriage 59 movable laterally upon front and rear rails 60 on the typewriter frame. A letter-feed carriage rack 61 engages a pinion 62 of an escapement wheel 63 cooperative with escapement dogs 64 controlled by a universal bar 65 actuatable by type bars 43. A spring motor 66 moves the carriage in letter-feed direction. The several numeral type actions are interspersed with the usual alphabet and other type actions represented by the keys 41.

Computing base

The computing base B, surmounted by typewriter T, Figures 1, 2, 44, contains laterally spaced registers or sets of computing pinions 68. Sets of actuators or register bars 69 for the computing pinions are slidable in front and rear combs 70, 71. Each set of register bars 69 has permanently meshed with its racks 69a a set of idlers 72 rotatable on a fixed shaft 73 held in plates 74, Figure 50, fixed to the framework. Each set of computing pinions 68 normally stands disengaged from its racks 69a and idlers 72. Each set of pinions 68 is mounted on an arbor 67 between side plates 75 of a frame with which the set of pinions is movable downwardly about shaft 73 to mesh directly with the racks 69a, for addition, or rearwardly to mesh with the idlers 72 for subtraction.

Each register bar 69 has digit pins 76 from "0" to "9." All the "0" pins, the first from the left of Figure 2, are normally depressed. Each register bar 69 is normally shouldered against rear comb 71 by spring 76a but is slightly advanceable to bring its pins under corresponding pin-setting bars 77 of pin-setting linkages 78. Each pin-setting linkage includes a rock shaft 79 having a crank arm 80 engageable by a pendant rod 81 pivoted to a corresponding numeral type action lever 44. Each pin 76 is urged upwardly by an individual spring 46. A common latch bar 47, on each register bar, retains any pin in depressed position and at depression of any other pin is moved by the latter to release the previously depressed pin so that the latter becomes restored by its spring 46; other details for this purpose may be as exemplified in aforesaid Patent No. 2,160,487.

Carriage control of register bars

Denominational jack rods 82 are slidable vertically in a housing 83 fixed to the back of the typewriter, Figures 2, 58. The upper ends of the jacks 82 are engageable by a tappet 85 on a column unit 86. There may be a column unit for each computing zone traversed by the carriage 59. The column units are adjustable along the carriage in a frame attached to a support 89 fixed to the carriage, and comprising a front rack 87 and a rear rack 88 to support and locate any column unit as shown in Figure 14. The column-unit-supporting means are substantially as shown in said Patent No. 2,160,487.

The lower ends of the jacks 82 abut connecting rods 90 pivoted to bell cranks 91 carried on a rod 92 between side arms 93 fixed on a rock shaft 94 journaled in the framework. The bell cranks 91 abut master racks 95 connected as at 96, to transverse blades 97 rockable about their lower edges on bars 98. The transverse blades 97 have connected thereto as at 96 sets of distributive racks 99 each of which, except the highest order rack 99, as will appear later, has pivoted thereto a coupler 100, Figure 32, there being a set of said racks 99 and couplers 100 for each set of register bars 69. Each set of couplers 100 is liftable by means of a plate 101, under control of the carriage 59, to connect its distributive racks 99 to a corresponding set of register bars 69. Corresponding to each set of couplers 100 there is a cam plate 102 movable edgewise vertically in the housing 83. The cam plates 102 are tiltable rearwardly as will be described later but are normally positioned so as to be selectively depressible by tappets 103 on column units 86 on the carriage.

By its depression, a cam plate 102 works through an intermediate plate 104, guided in housing 83, and through connections 105 to a crank shaft 106, to raise the corresponding coupler-lifting plate 101 and thereby raise the couplers 100 into operative connection with the corresponding set of register bars 69. Thus, any of the several sets of register bars is operatively connectable to the series of denominational jacks 82. In the present machine, there are nine computing pinions 68 and nine register bars 69 in a set so that each register has nine denominations. Correspondingly, there are nine of the denominational jacks 82 and nine corresponding transverse blades 97, the latter being indicated within the bracket 97 in Figures 2 and 44 to distinguish them from three other blades to be referred to later. The racks 95, 99 are slidably guided at their ends in a frame 107 fixed to the framework. Springs, not shown, hold racks 95, racks 99 and the blades 97 in their normal positions in which the blades 97 abut stops, not shown, in said frame 107. Said frame includes the blade supporting bars 98.

State control

Depression of a cam plate 102 to lift a coupler plate 101 also operates to lift a latch 108, partly shown, Figures 2 and 50, and thereby release a spring-pressed state controller bar 110 similar to the state controller in the said Patent No. 2,160,487, which also exemplifies connections for lifting the latch 108. Movement of the state controller bar 110 consequent to its release is forwardly and is limited by a secondary latch 109 to determine connection of the corresponding set of computing pinions 68 to the general operator mechanism in such way that during a cycle of the latter, said set of pinions is shifted for direct connection to the register racks 69a for addition. There is a state controller mechanism for each register. A column unit 86 may have an additional tappet 111a, to depress a corresponding cam plate 111 and thereby lift the secondary latch 109 to effect a further shift of the state controller bar 110. Further details, not shown, of such subtraction connections may be substantially as shown in H. L. Pitman Patent No. 2,091,717 dated August 31, 1937. This further shift of the bar 110 determines connection of the corresponding set of computing pinions 68 to the general operator mechanism in such way that said set of pinions is directly connected to the idlers 72 for subtraction, during a cycle of the general operator mechanism. Any set of computing pinions 68 is shiftable into engagement with racks 69a or idlers 72 by shifting its frame which includes side plates 75. A frame-shifting rock-shaft 114 is connected by an arm 113 and a cam-following link 115 to a cam shaft 116 connected by means (not shown) to the general-operator mechanism, so as to make a single complete revolution at each cycle. Said cam-shaft 116 is timed to rock said shaft 114 clockwise of Figure 50 for bringing the computing pinions into mesh, with either the racks 69a or idlers 72, before the general operator advances the register bars 69, and to rock said shaft 114 oppositely for unmeshing the computing pinions just before said general operator returns the register-bars.

Working connections between said pinion-shifting rock-shaft 114 and each one of the computing-pinion frames and controlling means for said connections may be substantially as shown in said Pitman Patent 2,192,365 and may be briefly described as follows.

A yoke, 118, Figures 2, 50, for subtraction connection, is loosely mounted on rock-shaft 114 for independent rotation of the latter and has at each end an arm 119 connected by link 120 to a side plate 75 of the computing-pinion frame. Another arm 121, for addition connection, is also loose on said rock-shaft 114 and has a slot 122 engaging a cross-rod 123 of said computing-pinion frame. Slots 124 in the sides of the computing-wheel frame, are slidably fitted to idler shaft 73. A coupler 125 having end ears 126 fitting rock-shaft 114 is splined to an arm 117 on shaft 114 for turning therewith, and for movement therealong from a normal neutral position to adding or subtracting position. In the adding position, a tongue 127 of coupler 125 registers with the adding arm 121, while another tongue 128 of said coupler is opposite a clearance notch 129 of the subtraction-yoke 118 and is thus disconnected from the latter. In the subtraction position of said coupler 125, the adding tongue 127 is withdrawn from the adding arm 121 and the tongue 128 moved from the clearance notch 129 is ready to actuate the subtraction yoke 118. At the neutral coupler-position, between the adding and subtraction positions, both tongues 127, 128, are clear, respectively, of the adding arm 121 and subtraction yoke 118.

State controller 110 has a cam-slot 130, coacting with a cam-following slide 131 articulated to said coupler 125 at 112 for shifting said coupler from neutral to an adding or subtracting position.

General operator

General operator mechanism is cycled by power and a cycle may be initiated automatically by the carriage as the latter leaves a computing zone. Each column unit 86, Figures 2, 14, 55, may have a cycling tooth 132 to engage a cycle trip lever 133, pivoted on the housing 83 and thus depress a jack 134 to rock a cycle-tripping shaft 135, to trip a clutch mechanism 138ª, by means of connections diagrammatically represented at 136, Figures 53, 54. The cycle initiating means and other details of the general operator mechanism are more fully shown in the said Patent No. 2,160,487. In the cycle a general operator cross bar 137 is reciprocated forward and back by means of a cycling shaft 138 and thereby reciprocates those register bars in which any digit pins 76, from "1" to "9", have been set.

Entering amounts

At power operation of the numeral type-actions, by means of snatch roll 57, under control of the numeral keys 40 for typing and computing an amount, the carriage 59 traverses, in letter-feed steps, a computing zone for which a corresponding column unit 86 will have been placed on the carriage. This unit 86 will have, besides the denomination-selecting tappet 85 for traversing the jacks 82, one or more register selecting tappets 103 which will have operated to depress a corresponding cam plate or plates 102 preparatory to traverse of the jacks 82 by their tappet 85. Each depressed cam plate 102 is effective, through the corresponding set of couplers 100, to connect a corresponding set of register bars 69 to said jacks 82. As the jacks 82 are depressed seriatim at the traverse by the carriage of the computing zone at operation of the numeral type actions, the type-actions operate through the rods 81 and pin-setting linkages 78 to depress corresponding digit-pins 76 in the register bars 69 that are advanced to indexing position under said linkages by the depression of the jacks 82. As the carriage leaves the computing zone following the typing and entering of the last figure of the amount, the cycling tooth 132 of the column unit 86 passes and thereby engages the cycle trip lever 133 to cause a cycle of the general operator mechanism to cycle the indexed register bars and thereby run the indexed amount into corresponding computing pinions 68. If the indexed amount is to be run into the computing wheels subtractively, the column unit 86 may have tappet 111ª to depress the subtraction cam plate 111. Carry-over devices hereinafter referred to may effect extra carry-over steps of the register-bars 69 beyond the advance of cross bar 137. The aforesaid H. L. Pitman Patent No. 2,192,365 shows means, not shown herein, whereby the set digit pins 76 become restored during the cycle.

Total reading and type selecting mechanism

For each set of computing pinions 68 there is provided a set of feelers 140 each in the form of an elongate endwise movable bar, Figures 2, 32, 44, 56. Each computing pinion 68 has fixed thereto a disk having slots 141 of different feeler-stopping depths representing the different digital or angular positions of said computing pinion. A spring 142 is connected to each feeler 140 for moving it to a stopped position, determined by one of the slots 141 in the disk, upon release of the set of feelers from restraining means as will be described later, all the feelers normally standing disengaged from their respective slotted disks as in Figure 2. A type selector tab 143 is bent laterally from an arm 144 pivoted to the feeler at 145. Each arm 144 is urged counterclockwise by a spring 146, anchored to the feeler, to a normal position in which the bottom edge of the tab 143 may abut the underlying edge of the feeler 140.

Above the selectors 143 associated with the several sets of feelers 140 is a set of ten transverse blades 147, Figures 2, 47, 48 and 49 corresponding to the "0" to "9" angular positions of the computing pinions, and guided in a frame 139 for up-and-down edgewise movement. An additional blade will be referred to later. By means which will later be described, each selector 143 is lifted by turning its arm 144 about the pivot 145. The lifting of a selector 143 lifts the blade 147 under which the selector is positioned by means of the computing pinion slot 141. A fulcrum rod 148, Figure 49, in the typewriter frame mounts levers 149, one for each of the type actions from "1" to "9." Arms 150 of said levers extend over the blades 147 and are spaced laterally by a guide comb 151. An additional lever 149⁰ serves both for the "0" type-action and the typewriter spacer action as will later appear and has an arm 152 engaged by the blade 147 corresponding to "0." Each of the blades 147 has an upwardly extending tab 147ª, whereby it may engage only the corresponding one of the levers 149, 149⁰. Rearwardly extending arms 153 of the levers 149 have each a lateral pin 153ª for engaging an arm 154 of the draw link 54 of the corresponding type-action. The other lever 149⁰ has a pin 155 for engaging a pin 156 fixed in a rock shaft 157 journaled and shiftable endwise in brackets 159 of the framework.

An angle bar 158 is slidably supported at its ends in brackets 159, Figure 49, for endwise shifts in opposite directions, and is notched as at 160 to engage the pins of the rock shaft 157 for connecting said rock shaft to shift endwise with said bar. The rock shaft 157 is shiftable for connecting either its pin 161 to a spacer draw link 162 or to connect its pin 163 to a pin 164 of a lever 165 for the "0" type-action draw link 54. Rock shaft 157 is normally in the Figure 49 position to connect it to the spacer draw link 162. Upon operation of any numeral type action from "1" to "9," lever 50 thereof engages a cam bevel 166 of bar 158 and thereby shifts said bar 158 and rock shaft 157 rightwardly to connect said rock shaft to the lever 165 for the "0" type action. The normal position, Figure 49, of rock shaft 157 obtains for spacing the typewriter carriage automatically from the highest denomination of a total-printing zone to the denomination in which the first significant figure of the total appears as where the total is of a less number of denominations than the number of denominations of the total-printing zone. The carriage-spacer draw link 162 is pivoted at 167, Figures 57, 58, to a lever 168 fulcrumed on rod 51. A cam 169 of lever 168 engages an arm 170 fixed to a rock shaft 171 journaled in the typewriter framework. An arm 172 fixed to rock shaft 171 has a pin-and-slot connection 173 to an arm 174 of a rocker frame 175 of the letter-feed escapement mechanism, further conventional details of which will be referred to later. It will be seen, now, that the escapement is actuated for a resulting letter-feed step of the carriage when spacer draw link 162 becomes connected to snatch roll 57. The automatic carriage spacing as effected by means of draw link 162 is substantially as set forth in the said H. L. Pitman Patent No. 2,192,365.

Total key controlled carriage tabulating

A total key lever 176, Figures 2, 52, has a fulcrum rod 177 in the typewriter frame and has a total key 178 at the typewriter keyboard. Said key lever engages, at 179, a vertical reed 180 guided in a fixture 181, on the typewriter frame, which similarly guides denominational tabulating stop reeds 182, Figure 14. A stop 185 on the column unit 86 may cooperate with any one of denominational reeds 182 that is lifted by means of a corresponding denominational tabulating key lever 184, Figure 1, similar to the total key lever 176 and fulcrumed on rod 177. The total key operated reed 180 is shorter than the reeds 182, Figure 14, so that it is not projectable into the path of the stop 185. Said reed 180 has a pin-and-slot connection 187 to a stem 188 guided in the housing 83, Figure 51. An upper transverse plate 189 on stem 188 is vertically guided in housing 83. A bar 190 is adapted to slide laterally on the plate 189. When the plate 189 is raised, by depression of the total key 178, a latching shoulder 191 thereof is drawn by a spring 192 over a spring-pressed latch 193 pivoted at 194 on the housing 83. Reed 180 has, similarly to the denominational reeds 182, an arm 195 to engage a universal bar 196 fixed to a rock shaft 197 on fixture 181. When said reed 180 is lifted, rock shaft 197 operates through an arm 198 thereupon to rock a lever 199, on fixture 181, to lift the letter-feed rack 61 from the escapement pinion 62 to release the carriage for consequent movement by the spring motor 66 in tabulating direction. The carriage tabulating movement is terminated when a tooth 200, Figure 55, on column unit 86 strikes a tooth 201 of the bar 190 and thereby moves said bar, together with the plate 189, leftwardly to release it from the latch 193 for consequent downward restoration by spring 192. At such restoration, reed 180 is also restored thereby permitting carriage rack 61 to reengage the escapement pinion 62 for finally settling the carriage in the tabulated-to position. The arrangement is such that said carriage is tabulated to the highest denomination place of the total printing zone said place corresponding to the highest order wheel of a register. By having the plate 189 latched in its upper position by the latch 193, it is unnecessary to keep the total key lever 176 manually depressed to retain said position. Should the bar 190 and its tooth 201 be in upwardly projected position at return of the carriage, an encounter of the column unit tooth 200 with the tooth 201 will move bar 190 rightwardly on plate 189. Thereby bar 190 will engage and rock the latch 193 to withdraw it from the shoulder 191 of the plate 189 so that the latter and the bar 190 are restored downwardly automatically by spring 192 thereby permitting the carriage-return movement to proceed. After such restoration of the plate 189, a latch spring 202 rocks the latch 193 counterclockwise again and restores the bar 190 leftwardly on plate 189.

The described total-key-controlled tabulating means are substantially as disclosed in the H. L. Pitman application, Serial No. 337,380, filed May 27, 1940, now Patent No. 2,372,681, dated April 3, 1945.

Mechanism responsive to the total key to enable carriage control of total printing At elevation of the total-key-operated reed 180, a stud 203 thereon, Figures 2, 52, 55, 56, engaging a cam-end of a rod 204, slidably guided in housing 83, thrusts said rod endwise rearwardly to a position in which it is caught by a spring-pressed latch 206 pivoted to housing 83. Said latch 206 retains rod 204 in said position even though reed 180 becomes restored downwardly, together with bar 190, consequently to the arrest of the carriage by the tooth 201 associated with said bar. A comb 208 is slidably mounted upon and is yieldably connected to rod 204. Comb 208 is articulated at 211 to each cam plate 102. Said cam plates are capable of rearward and forward tilting movement about their lower guide combs 212 in the housing 83, so that upon rearward movement of the thrust rod 204, the upper cam edges of the cam plates which are normally aligned with the positions for the register-selecting tappets 103 of the column unit 86 are shifted rearwardly to align said cam edges with positions provided for a total-taking-control tappet 213 in the column unit 86. One such tappet 213 may be located on the unit 86 corresponding to a total printing zone of the carriage to coact with that cam plate 102 which corresponds to the register from which a total is to be printed at that zone. Following the printing of the total the carriage trips the latch 206, as will be described later, for resulting forward movement of the rod 204 by a spring 214. This rocks the plates 102 forwardly to their normal, Figure 2, position.

When cam plates 102 have been shifted to the positions, Figures 55, 56, wherein one or another cam plate may coact with a corresponding total-taking-control tappet 213, the upper edges of openings of said cam plates 102 are positioned over tabs 215 extending from jacks 217. There is a corresponding jack 217 for each cam plate 102 and in the normal positions, Figure 2, of the cam plates 102, the latter are clear of said tabs 215. Thus, the total-key-effected shift of the cam plates 102 to the positions, Figure 55, connects the cam plates 102 operatively to said jacks 217. Said jacks 217 are vertically guided like and are to to the right of denominational jacks 82, Figures 44, 58. There are three of the jacks 217, one for each of the three registers. The jacks 217 are shorter than the denominational jacks 82 so that they are out of the path of the denomination-selecting tappet 85. Each jack 217 abuts a thrust rod 218 pivoted to a bell crank 220 fulcrumed on the rod 92, Figures 44, 46, 52, 56. Each bell crank 220 abuts a rack 221 that is slidably supported like the denominational master racks 95. The three racks 221 are articulated respectively to corresponding transverse blades 223 that are similar to the denominational blades 97. The blades 223 are connected as at 224 to a common rack 225 slidably supported in the frame 107. Said rack 225 is connected by a link 226 to an arm 227 fixed to a transverse rock shaft 228 journaled in the framework. Each blade 223 is also connected as at 219 to a corresponding rack 222 slidably supported in frame 107.

Each rack 222 has its forward end opposite a stud 230 of a bar 231 slidably guided in rear guide comb 71, Figure 56, there being one of said bars 231 for each register. Each bar 231 has pivotal connection at 232 to an arm 233 connected by a yoke to a latch pawl 235. The yoked arm 233 and pawl 235 are loosely fulcrumed on rock shaft 114. The pawls 235 and associated bars 231 relate to clear sign printing mechanism as will appear later.

Rock shaft 228 has fixed thereto a latch arm 237 normally engaging a square stud 238 on a link 239.

By means of a slot 240 therein, link 239 is slidably guided on a stud 241 on an arm 242 fixed to a transverse rock shaft 243. Link 239 is pivoted to a lever 245 fixed to a transverse rock shaft 246 journaled in the computing base framework. Said lever 245, and similarly formed arms 247 on shaft 246 are each connected by a link 248 to a transverse restoring bar 249 for the sets of feelers 140.

Associated with each set of total-reading feelers 140 there is a vertically movable pair of drop plates 254, Figures 47, 48. Interponent plates 259 are laterally spaced in accordance with the register bars 69 and are normally held in raised positions by a cross rod 257 supported by the drop plates 254 which in turn are held in raised position by the feeler restoring bar 249 which normally is under shoulders 260, Figure 48, of said drop plates 254. When the restoring bar 249, urged by a spring 261 acting on the lever 245, is moved forwardly through release at the latch arm 237, a selected pair of drop plates 254, may drop by gravity so that a V-shaped lower camming point 262 of each dropped interponent plate 259 settles between two adjacent rack teeth 69ª of a corresponding register bar 69.

*Confining total reading and type selection to a carriage-selected register*

For each register there is an individual rock shaft 264, Figure 48, journaled in brackets 265 on the frame 139. A pair of latch arms 266 is fixed to said rock shaft 264, said arms being spring pressed normally under shoulders 267 of a corresponding pair of the drop-plates 254. A lever 269 pivoted on the framework is engageable by a stud 270 of the bar 231 and in turn engages one of the latch arms 266. Forward displacement of said bar 231, effected under control of the carriage as hereinafter described, turns said lever 269 clockwise, Figure 56, and thereby withdraws the latch arms 266 from the drop plates 254. This permits said drop plates and the companion set of interponent plates 259 to drop by gravity. As the interponent plates 259 thus drop, the companion set of feelers is permitted to move forwardly, under the urge of the feeler springs 142, to engage in the feeler-stopping slots 141 of the corresponding set of computing pinions. Normally the feelers 140 are restrained by the normally raised interponent plates 259 in that rollers or studs 273 on the type selector arms 144 on said feelers are behind the raised interponent plates 259 as in Figure 47. When a set of feelers 140 and companion set of interponent plates 259 are thus released, the feeler restoring bar 249 will have been released and will have been moved forwardly through carriage-effected release at the latch 237, 239. At such forward displacement of the restoring bar 249, the other sets of interponent plates 259 and feelers 140 are restrained by means of their respective latch arms 266.

*Coupling the highest denomination register bar and corresponding denominational jack*

A coupler 244 pivoted on the highest-order distributive rack 99, Figures 44, 46, is controlled independently of coupler-raising plate 101. When latch arm 237 is retracted to release link 239, the resulting forward movement of feeler controlling bar 249 is in excess of the maximum movement of any feeler 140. According to said excess movement, a lateral stud 250 of link 239 engages a cam-arm 251 yoked to a latch arm 252, said arms 251, 252 being loose on rock shaft 228. Latch arm 252 is therefore rocked clockwise, Figure 56, through said excess movement and retracted from a square stud 253 on arm 242 fixed to the transverse rock shaft 243. For each register, rock shaft 243 has movable therewith in counterclockwise direction as will be explained presently, an arm 255 having a pin-and-slot connection 256 to an extension of the coupler 244. Thus, with the distributive rack 99, on which said coupler 244 is pivoted, having been advanced by means of its jack 82, and with the shaft 243 having been spring rocked counterclockwise consequent to retraction of the latch arm 252, said shaft will have operated to raise the coupler 244 against the highest denomination register bar 69 and thereby will have cammed the latter slightly forward by engaging a roll 258 on the side of the register bar. This slight advance of the register bar 69 raises the corresponding dropped interponent plate 259 by means of the camming point 262, as in Figures 33, 56. In turn, said interponent plate 259, with its upper horizontal edge under the roller 273 of the type selector arm 144, turns said arm 144 clockwise so that the selector 143 thereon, lifts the blade 147 under which it is positioned and thereby causes an operation of the corresponding type-action depending on the blade lifted being for a significant figure type-action, or causes an actuation of the typewriter spacer depending on the blade being for "0" and lifted as determined by a computing wheel standing at non-significant zero positions. It will be seen now, that advance of the highest-denomination register bar 69 and the resulting lifting of a blade 147 for effecting actuation of a type action, or of the carriage spacer can occur only after the feelers 140 and selectors 143 have been given time to complete their maximum movements for selecting a blade 147.

Coupler arm 255 is connected by a yoke 268 to an arm 271 having a flange 271ª concentric with rock shaft 243 on which said arms are loosely fulcrumed. A spring 272 urges arms 255, 271 counterclockwise, Figure 46, so that a lateral pin 278, Figure 44, in arm 255 abuts an arm 274 fixed to rock shaft 243. When shaft 243 is released by retraction of latch 252, it is rocked counterclockwise by a spring 275. Arms 255, 271 tend to follow counterclockwise the arms 274 under the urge of their spring 272. Therefore, if a bar 231 has been slightly advanced, the corresponding flange 271ª of arm 271 becomes positioned behind and blocks restoration of bar 231, as in Figure 56, for a purpose explained hereinafter. The flanges 271ª, corresponding to bars 231 that are not advanced, merely stop upon the upper edges of said bars 231 when shaft 243 is rocked counterclockwise, the respective springs 272 being therefore ineffective to move the flanges 271ª farther while the rock shaft spring 275 rocks shaft 243 to its full extent determined by abutment of arm 242 with a stop 277, Figure 46.

*Printing the total*

The carriage reaches the highest denomination of a total-printing zone and depresses the highest denomination jack 82 through having been caused to be tabulated to said zone or highest denomination by operation of the total key lever 176. Pursuant to the above-described operation of the carriage-spacer or of a numeral type-action caused by depression of the highest denomination jack 82, the carriage takes a letter-feed step and thereby engages and depresses the succeeding jack 82 to cause another operation of the carriage-spacer or of a type-action as determined by the feeler-read angular position of the computing pinion associated with said succeeding jack 82. It will be recalled that the carriage-spacer is worked automatically for all computing pinions that register insignificant zeros ahead of the first significant figure of a total, as where the total is of a lesser number of denominations than the number of denominations constituting the computing or total-printing zone. But for the first significant figure denomination, and for each succeeding denomination, a type-action is caused to be operated through the depression by the carriage of the jacks 82 corresponding to these denominations, it being understood that the carriage spaces at each operation of a type-action and thereby causes operation of another type-action. This briefly-described progress of the printing of the total is substantially as more fully set forth in the copending application, Serial No. 42,611, now Patent No. 2,258,714, dated Oct. 14, 1941, and in the Patent No. 2,192,365.

*Clearing the register from which the total is printed*

When a cam-plate 102 is depressed by the total-control tappet 213 of the column-unit 86, it is effective, in the same way as described in the above section on State control, to withdraw the corresponding latch 108 to release the spring-pressed state-controller bar 110. It will be remembered that the jacks 217 have become operatively connected at their tabs 215 to the cam plates 102 when the latter have been shifted rearwardly by operation of the total key lever 176. Each arm 216 of a jack 217 overlies a forwardly extending tongue 276, Figures 52, 55, 56, of the subtraction cam plate 111. Thus at depression of a cam plate 102 by the total-control tappet 213, the corresponding jack 217 is depressed and in turn depresses subtraction cam plate 111 to effect withdrawal of latch 109 whereupon the state controller bar 110 assumes its extreme forward position to determine subtractive connection of the computing pinions to the idlers 72 during a subsequent cycle of the general operator. Depression of cam-plate 102 by the tappet 213 also connects the corresponding set of register bars 69 to jacks 82 through couplers 100, 244. At operation of the type-actions for printing a total, the corresponding pin-setting linkages 78 are actuated to set those register pins 76 corresponding to the total standing in the computing pinions. Thus at said subsequent cycle of the general operator, the total will be cleared from the computing pinions so that all of said pinions of the set from which the total was printed should finally stand at zero.

The carriage automatically initiates the cycle in which the total is cleared. For this purpose the cycling tooth 132 on the column unit 86 passes over and rocks the cycle trip lever 133 in that carriage step which follows the printing of the last figure of the total.

*Automatic punctuation spacing*

The tens-of-cents digit and units-of-dollars digit of a typed amount, Figure 23, are separated by a punctuation space for which the carriage is automatically caused to take an extra letter-feed step. In the letter-feed step, in which the carriage leaves the units-of-dollars place of an amount column, it reaches the place corresponding to the punctuation space for which no type-bar is to be operated to print and for which, at automatic total printing, no computing-pinion is read. At such punctuation place, tappet 85 on the active column unit 86 will have depressed a punctuation jack 281, Figures 44, 58, disposed between the units-of-dollars and tens-of-cents jacks 82. Depression of said jack 281 depresses a secondary jack 282 through a cross bail 283 pivoted to housing 83. The secondary jack 282 does not extend into the path of tappet 85 and it is connected by a thrust rod 284 to a bell crank 285 mounted on fulcrum rod 92. Bell crank 285 when rocked by depression of jack 281 coacts with an arm 286 to rock a shaft 287 which, through another arm 288 and a link 289 connected to a lever 290, rocks the latter to lift spacer draw link 162 into engagement with snatch roll 57, to thereby actuate lever 168 and the escapement mechanism rocker frame 175 for a resulting letter-space step of the carriage which automatically brings the latter to the tens-of-cents place. It will be seen, therefore, that punctuation spacing is effected automatically at the automatic printing of a total, as read from the computing pinions 68.

At the power-driven rearward movement, at punctuation spacing, of draw link 162, a land 291 thereof initially engaged by lever 290 passes from the latter in order that said draw link 162 may become disengaged from the snatch roll 57, it being noted that said lever 290 remains rocked until the carriage passes from the punctuation space place and releases the punctuation jack train which thereupon becomes restored, by a spring 292 to normal position in which a stop arm 293 on rock shaft 287 abuts a cross bar 295.

Automatic clear sign printing

A sign, preferably a star, may be printed adjacent the total printed on the work sheet to signify that the indexing and cycling operations attending the automatic total-printing have resulted in clearing the register from which the total was printed.

The computing pinion discs that have the total-reading-feeler-receiving slots 141 may have peripheral notches 294, Figures 2, 42, for receiving individually-spring-pressed detent arms 296 fulcrumed on cross-rod 123 of the computing pinion frame. The notches 294 corresponding to the "0" positions of the several computing wheels are somewhat deeper than any of the other notches. A bar 298 having side arms 299 pivoted to plates 75 of said frame at 300, is pring-pressed against said detent arms 296. There is a set of detent arms 296 and a bar 298 for each of the registers. If a register is all clear, all of its detent arms 296 will be in the deeper or "0" detent notches and this will permit the corresponding spring-pressed bar 298 to assume a position, Figure 2, in which a spur 301 thereof is out of the path of downward endwise movement of a sensing bar 302 suitably guided for such movement. But if any one of the computing pinions is not in the "0" position, the correspondingly positioned detent notch, of less depth, will position its detent arm 296 to keep the bar 298 with its spur 301 in the path of a spur 303 of the sensing bar 302. The previously mentioned latch pawl 235 normally is under a shoulder 309 of the sensing bar 302. Thus even if all the computing pinions of any totalizer stand at "0," the sensing bar 302 cannot move downwardly unless said pawl 235 has been first retracted. Retraction of the pawl 235 occurs, as in Figure 56, through forward movement of the bar 231 effected by depression by the carriage of that jack 217 that corresponds to the register from which the total is printed. It will be remembered that each jack 217 is operable by a cam plate 102 and in turn operates through the thrust rod 218, bell crank 220, rack 221, and rack 222 to move said bar 231 to retract said latch pawl 235.

Each sensing bar 302 is connected by a bell crank 312, Figure 46, to a draw bar 315 slidably supported at a stud in bracket 313 and slidably fitting a headed stud 318 in a transverse bar 319 which overlies the several draw bars 315. Said transverse bar 319 may lie slidably upon the several state control bars 110 and serves to restore the latter during a cycle of the general operator. Bar 319 is connected at each end by a link 320 to an arm 321 of a rock shaft 322. A link 323 is connected to an arm 324 of said rock shaft and is urged counterclockwise, Figure 46, by a spring 325 and bears normally against the bottom of the general operator cross bar 137. Said link 323 has a hook 326 which is normally forward of said general operator cross bar 137. After the reciprocatable general operator cross bar 137 has moved forwardly beyond said hook 326, the latter will become placed by the spring 325 in the return path of said cross bar 137. Therefore, said cross bar 137 during the end portion of its return stroke engages and moves said link 323 rearwardly and thereby rocks the shaft 322 and moves the transverse bar 319 rearwardly for restoring the state control bars 110. At the ending of the rearward stroke of the general operator cross bar 137, the link 323 automatically becomes disengaged therefrom by means, not shown, and consequently the transverse bar 319 and the rock shaft 322 become restored by a suitable spring, not shown.

Each draw bar 315 has pivoted thereto a lever 328 urged clockwise, Figure 46, by a spring 329, so that an oblique arm 328ª thereof bears laterally against the head of the stud 318. Each draw bar 315 is thus yieldably connected to the transverse bar 319 and therefore rearward movement of the latter will move rearwardly any draw bar 315 which is free to so move depending on clear condition of the corresponding register and retraction of the corresponding latch pawl 235. If any draw bar 315 is not free to move rearwardly, its oblique arm 328ª is cammed aside by the stud 318 at the rearward movement of the transverse bar 319 and the stud 318 merely moves idly in the draw bar slot 317. At restoration of the transverse bar 319 forwardly the spring 329 returns the oblique arm 328ª.

Each draw bar 315 has a stud 331 to engage a transverse bar 332 pivoted at its ends at 333. An arm 334 of bar 332 engages an arm 335 fulcrumed loosely on rock shaft 246, Figure 46. A thrust rod 336 is pivoted to said arm 335 and engages a transverse lever 339 fulcrumed at 340. Said lever 339 engages as at 341 the forward arm 342 of a lever whose rear arm forms a draw link 343 having a toothed pawl 56ª for engaging the power-rotated snatch roll 57. Said draw link 343 is pivoted at 344 to a lever 50ª fulcrumed on the fulcrum rod 51. Said lever 50ª is operatively connected to a type bar 43ª having a star-printing type 346. Said type bar 43ª is generally similar to the previously described type bars 43 and may be connected to the lever 50ª by a link 345 and a bell crank 347 similar to bell crank 45.

Operation of type bar 43ª results automatically as follows. In the carriage step which occurs with the printing of the last figure of a total, the cycling tooth 132 on the column unit 86 rocks the cycle trip lever 133 to initiate a cycle of the general operator and its cross bar 137. During the forward stroke of the cross bar 137, the computing pinions from which the total was printed will be rotated subtractively, to zero positions, the total having been indexed by setting the index pins 76 during the total printing. At the start of the cycle the shaft 94 is caused to be rocked clockwise, by means shown in the said Patent No. 2,160,487, from its Figure 2 position and this disables the carriage control of the thrust rods 218, corresponding racks 221 and the bars 231 that control the pawls 235. But at this time the flange 271ª is still behind the forwardly positioned bar 231 that corresponds to the totalizer from which the total was printed so that said bar 231 is not restored by its spring 76ª. This leaves the pawl 235 retracted from the sensing bar 302 pending rearward movement of the draw bar 315, which rearward movement occurs, as above described, when the general operator cross bar 137 in a final portion of its return stroke picks up and moves the hooked link 323. The computing pinions, from which the total was printed, having been restored to zero positions during the forward stroke of the cross bar 137, are disengaged from the idlers 72 to stand in the Figure 2 position, together with their detent arms 296 and bar 298. Thus, assuming that in the Figures 2, 42 positions all computing pinions have been restored to zero, the bar 298 will be clear of the sensing bar 302. Therefore, bar 302 is free to move downwardly, the pawl 235 having been retracted, and hence the draw bar 315 is free to be moved rearwardly by means of the transverse bar 319 to rock the bar 332, lift the rod 336, rock the lever 339 and thus connect the draw link 343 to actuate the star-printing type bar 43ª. A knock-off 348, such as is also provided for each of the snatch roll operated type actions, is encountered by the draw link 343 to disengage the latter from snatch roll 57 just before type bar 43ª reaches the platen to print the star after the last printed figure of the total. The star-printing type action, including the draw link 343, becomes restored automatically by a spring 350. At about this time also the cycle is completed and the hooked link 323 becomes released from the general-operator cross bar 137 whereupon the draw bar 315 and the thereby operated parts, including the sensing bar 302 and the transverse lever 339 become restored. A spring 351 restores lever 339 to abut a stop 352 in the framework. A spring 353, Figure 2, may be connected to bar 319 for restoring the latter, and also the actuated bar 315 by means of the operative connection at stud 318 and bight of lever 328.

*Restoration of total taking mechanism during a cycle*

Rock shaft 246 to which feeler restoring bar 249 is connected has fixed thereto arms 355, Figures 2, 44, having rolls 356 engageable by cams 357 in the side racks 358 to which the general-operator cross bar 137 is connected by plates 359. Each rack 358 has a gear connection, not shown, to a cross shaft 354 whereby the latter constrains both racks 358 to move in unison. At the initial part of the forward stroke of said cross bar 137 and its racks 358, the cams 357 rock said shaft 246 clockwise of Figure 2 and thereby move the feeler restoring bar 249, its link 239, Figure 52 and the operated feelers 140 rearwardly whereupon said link 239 becomes latched again in its normal position by the latch arm 237 fixed to the rock shaft 228. The previously mentioned rocking of shaft 94 and the attending disablement of racks 221 leaves the rock shaft 228 and its latch arm 237 free to relatch said link 239 under the urge of a spring 360, Figure 56. Said rock shaft 228 and its latch arm 237 are also free to relatch in that the carriage tappet may leave the cam-plate 102 in the carriage step which initiates the cycle. Rock shaft 243 is restored by means of the hooked link 323 which therefore has pivoted thereto at 361, Figure 46, a link 362 having a slot 363 fitting stud 241 in arm 242 of said rock shaft 243. The forward end of said slot 363 is normally forward of the stud 241 so that shaft 243 is free to rock counterclockwise when released from the latch arm 252. But at rearward movement of the link 362 with the hooked link 323, said rock shaft 243 is rocked clockwise to become restored to the latch arm 252. The restoration of shaft 243 restores the operated yoked arms 255, 271 and flange 271ª, so that said flange becomes restored from behind the bar 231 which in turn becomes restored by its spring 76ª, thus putting the pawl 235 back to normal position to be ready to oppose, as subsequent conditions may require, downward movement of the sensing bar 302.

As the carriage leaves the total-printing zone following the printing of the last figure of the total, the denomination-selecting tappet 85 depresses a jack 337, Figure 52, operatively connected to latch 206 and therefore said latch 206 is rocked to release rod 204 for resulting spring-urged forward restoration of the latter together with cam-plates 102.

*Tens transfer mechanism*

Tens transfer mechanism, Figure 56, may be of the kind set forth in H. L. Pitman Patent No. 2,078,274, dated April 27, 1937, and briefly described is as follows:

Each computing pinion which may carry over to or borrow from the computing pinion of next higher order has a transfer tooth 364, Figure 56, on the periphery of a dial 365 fixed to said pinion.

A computing wheel is shown broken away at its dial as at A to distinguish from the computing wheel of next higher order. A lever 366 on a fulcrum rod 367 supported by plates 75 of the computing pinion frame engages a stop rod 368 as at 369. A lever 370 on a fixed fulcrum rod 371 is pivoted to said stop rod at 372. A transverse latch bar 373, one for each register, is slidably guided at its ends in plates 74 for edgewise movement. Side plates 374 slidably supported adjacent plates 74 link said latch bar to a cross rod 375 common to the several registers, said cross rod being supported at its ends as at 376 by a pair of slides 377 operatively connected to companion cams 378 on the general operator cross shaft 354. At the beginning of the machine cycle, cams 378 move slides 377, the several latch bars 373, stop rods 368 and levers 370 to shift the stop rod ends 368ª into positions, indicated by the dotted outline, Figure 56, so that said ends abut the indexed digit pins 76 at the end of the indexed advance of the register bars to prevent overthrow of the latter. Said stop rod ends 368ª are normally in the full-line positions to clear the normally set zero pins 76 to permit the slight advance of the register bars to index-receiving positions. As a computing pinion 68 of lower order passes its transfer point, its transfer tooth 364 passes and rocks the corresponding lever 366 to raise and thereby release the companion stop rod 368 from the latch bar 373. The released stop rod 368, urged by its spring 379, moves leftwardly of Figure 56 and rocks its lever 370 counterclockwise until stopped by cross rod 349. Arm 370ª of said lever 370 is thereby positioned toward arm 380 of a lever 381 associated with the register bar of next higher order and fulcrumed on a rod 382 reciprocatable with the general operator cross bar 137. At the final period of the advance of cross bar 137 said arm 370ª, thus positioned, engages and rocks said lever 381 counterclockwise whereby a finger 383 of said lever 381, engaging the depressed digit pin 76 of said next higher order register bar 69, advances the latter an extra step beyond the advance of the general operator cross bar 137; this effects an extra or transfer step of rotation of the corresponding computing wheel. The extra step may also occur immediately after said final period of advance of cross bar 137 and its levers 381, if lever 370 has become rocked counterclockwise during or after said final period, as for example, when a transfer step of a computing pinion induces a transfer step of one or more higher pinions. Before the completion of the cycle, the cams 378 act to restore the transfer trains to their normal Figure 56 position.

*Fugitive-one mechanism*

When the computing wheels of a register are rotated subtractively to negative-total or overdraft positions, the units or lowest order wheel is to be rotated subtractively an extra step so that its angular position will be the nines complement of the true overdraft digit, instead of the tens complement, in order to utilize the numeral type-actions for printing the true overdraft by means of upper-case digit types hereinafter explained.

When a set of computing wheels passes from a clear condition, or from a positive-total condition, to overdraft or negative-total condition, the wheels pass the transfer points and consequently cause an operation of their respective transfer trains so that at least the highest order wheel stands at "9" and thereby manifests the overdraft condition.

At the rotation of said highest-order wheel to the "9" position consonantly with the registry of the overdraft, a transfer tooth 385 thereon, Figure 45, engages and rocks an arm 386 and thereby rocks another arm 387 which is contiguous to a stop rod 368 provided for the register bar of lowest order of the register. This releases said stop rod 368 from the latch bar 373 for resulting movement thereof and its lever 370 to transfer-determining position. Said lever 370 therefore controls a lever 381 provided for the units order register bar 69 to advance the latter an extra step and thereby rotate the units order computing wheel an extra step subtractively. Arms 326, 387 are connected by a yoke 388 to rock jointly on rod 397. The released stop rod 368, for the units-order register bar, and its companion lever 370 become restored by means of the cams 378, along with the released stop rods 368 and levers 370 for the other orders.

Case shift mechanism

Platen 58 is in a platen frame 59ᵃ case shiftably supported and connected to the main carriage frame by links 389, 390, Figure 2. A shiftrail frame 391 is operatively connected at 392 to said platen frame and is rockable from the normal lower-case position, Figures 2, 30, to the upper-case position, Figures 32, 38.

A draw-link 393 is liftable about fulcrum supports 394 to engage rack teeth 395 of said draw-link with roll 57 for resulting endwise movement of said link permitted by said fulcrum supports. A lever 396 having a fixed fulcrum at 397 has a pin-and-slot connection 398 to draw-link 393. A link 399 pivoted to lever 396 at 400 has a slot 401 for lost-motion connection to a stud 402 on the right-hand side plate 403 of shift rail frame 391. A latch arm 404 is also pivoted on said stud 402 and is urged counterclockwise by a spring 405. A catch 406 on a fixed bracket 407 underlies latch arm 404 to cooperate with a front shoulder 408 of latch arm 404 to lock shift-rail-frame 391 in lower-case position, as in Figure 30. A rear shoulder 409 of said latch arm 404 may engage catch 406 to lock shift-rail-frame 391 in upper-case position, Figures 32, 38. In lower-case condition a stud 410 on latch arm 404 is forwardly of and in the path of a cam stud 411 on a link 412 pivoted at 413 to a bell-crank 414 fulcrumed at 415 on bracket 407. Link 412 is pivoted at 416 to an arm 417 movable about a fixed axis 418.

A plate 419 has a slot 420 for slidable support on a cross rod 421 and is pivoted at 400 to lever 396. A cam edge 423 in said plate may override a roller 424 on a lever 425 fulcrumed at 397 and having a camming and latching stud 427 for engaging arm 417.

When draw link 393 is lifted into engagement with snatch roll 57, it is moved by the latter endwise to rock lever 396 counterclockwise and correspondingly move link 399 and plate 419 leftwardly of Figure 30. The initial portion of the leftward movement of plate 419 depresses lever 425 by means of cam edge 423 to bring stud 427 under a latch shoulder 428 of arm 417 and at the same time, shift said arm 417 counterclockwise of Figure 30 to shift link 412 leftwardly. As said link 412 is shifted leftwardly, its cam stud 411 engages stud 410 to lift latch arm 404 from catch 406 preparatory to case-shift movement of the shift-rail-frame 391, by further movement of link 399, lever 396 and draw-link 393 under the drive of the snatch roll 57. When the case-shift movement of shift-rail-frame 391 is completed, lever 425 remains depressed in that its stud 427 remains caught by shoulder 428. Therefore, arm 417 remains displaced leftwardly, together with link 412, so that an arm 429 of bell-crank 414 is in retracted position below stud 410 of latch arm 404 to permit the latter to drop and engage its shoulder 409 with catch 406, said stud 410 being, at the completion of the case-shift, over said arm 429. In the initial portion of the leftward stroke of link 399, there is no movement of the shift-rail-frame 391 because of the lost-motion clearance provided between the rear end of slot 401 and stud 402. Consonantly with completion of the case-shift movement of shift-rail-frame 391, draw link 393 becomes disconnected from snatch roll 57 by encountering its knock-off 348; it follows that draw link 393, lever 396, link 399 and plate 419 become restored by spring 430 to normal positions determined by abutment of lever 396 at 431 with a fixed stop 432, the restoration of link 399 being permitted by its slot 401.

A cam 434, Figure 38, fixed to shaft 354 of the general operator mechanism actuates a follower lever 435 to move and thereby release arm 417 from stud 427 of lever 425, the latter thereby becoming restored by a spring 426. The restoration of lever 425 permits arm 417, link 412, and bell crank 414, to be restored by a spring 436, the general operator cam being formed and timed to permit this restoration. By said restoration, arm 429 of bell crank 419 displaces the case-shifted latch arm 404 upwardly to release its shoulder 409 from catch 406 thereby permitting the shift-rail-frame 391 and platen frame 59ᵃ to become restored to lower-case position by gravity.

Negative total or credit balance printing

The automatic total printing hereinbefore described relates to positive totals.

When the highest order wheel of the register stands at "9" and, therefore, manifests a negative-total or credit balance condition, it presents a slot or stop 141ᵃ, Figures 32, 38, for engagement by the companion feeler 140. When, in such case, the set of feelers 140 becomes engaged with the set of computing wheels as a result of operation of the total key 178, preparatory to printing a credit-balance, the stop 141ᵃ positions the highest order feeler 140 so that its selector tab 143 is under a blade 438 grouped with the blades 147. The carriage having become positioned, through operation of the total key 178, at the place corresponding to the highest order wheel, the corresponding register bar 69 will have become slightly advanced to lift said blade 438, by means of said tab 143 and correspondingly interponent plate 259.

A lever 439 fulcrumed on rod 148 has an arm 440 over tab 438ᵃ of blade 438 and also has an arm 441 having a stud 442 for engaging an arm 443 of case-shift draw-link 393. The lifting of blade 438 operates through lever 439 to depress arm 443 to lift case shift draw-link 393, about fulcrum supports 394, into engagement with snatch roll 57. The resulting operation of the case-shift mechanism brings platen 58 to upper-case position, and this position becomes sustained by means of latch arm 404, to determine use of the upper-case numeral types each numeral type bar 43 having, according to its value, a lower-case numeral type 444 and an upper-case type 444a which is the nines complement of the lower-case type as in Figure 41. The upper-case type characters are slanted backwardly to distinguish their imprints from the imprints made by the lower-case characters upon the ledger sheet.

A cross bar 445 has upstanding end arms 446, 447 attached to cross rod 421, see also Figure 30. A coupler-rod 448 is pivoted at 449 to arm 441 of lever 439 and has a slot 450, slidably fitting a headed stud 451 of cross bar arm 447. In Figure 38, said stud 451 and coupler rod 448 are shown laterally separated for clearness of illustration, but actually stud 451 is always articulated with rod 448 at slot 450. When lever 439 is moved by lift of blade 438 to connect case-shift draw-link 393 to snatch roll 57, rod 448 is lowered to interpose a stud 452 on said rod in the path of an edge 419a of plate 419. This enables plate 419 in its case-shift-attending forward movement to move arm 447 and thereby shift cross bar 445 upwardly about the axis of rod 421.

An upstanding arm 453 fixed to cross bar 445 is connected by a link 454 to a coupler-bar 455 slidably supported at 456 on lever 44 of the "9–0" type action. Said coupler bar 455 has a stud 458 normally engaging in slot 459 of bell-crank 45 of said "9–0" type action. By the upward shift of cross bar 445, coupler bar 455 is shifted forwardly to withdraw stud 458 from slot 459 thereby disconnecting bell-crank 45 and, therefore, the "9–0" type bar 43 from the companion operating lever 44.

An arm 460 on rod 421 is connected to cross bar 445 at 461. A thrust-rod 462 has a pivot 463 on arm 460 and may stop against arm 460 at 464. In the normal position of the "9–0" draw link 54, a stud 465 on its arm 154 underlies the lower end of thrust-rod 462. Therefore, when cross bar 445 is lifted at the case-shift operation as effected under control of the highest computing-wheel standing at "9" preparatory to credit-balance total printing, it will not only disconnect the "9–0" type bar 43 from the companion lever 44 but will also depress thrust rod 462 and, therefore, depress arm 154 of the "9–0" draw link 54 to connect the latter to snatch roll 57. It results that said lever 44 is power-operated without printing. This operation of "9–0" lever 44 actuates, through rod 81, a corresponding pin-setting linkage 78 to set the "9" digit pin 76 in the highest order register bar 69. In its descent, thrust rod 462 bears against pin 153a of adjacent lever 149, Figure 32, and therefore turns about pivot 463, counter to a spring 457, to determine substantially vertical movement of the lower end of said rod. In the power-stroke of draw-link 54 its stud 465 leaves rod 462 but encounters said rod at the return stroke of the draw-link following the disconnection of the latter from the snatch roll 57 by knock off 348, said rod 462 remaining depressed until cross bar 445 is restored later. Therefore, rod 462 yields by turning about its pivot 463 as it is encountered by the returning stud 465.

A stud 466 in said "9–0" lever 44 engages a cam-arm 467 on rock shaft 171 whose arm 172 has connection to rocker frame 175 which is pivotally connected to and supports a frame 473, see also Figure 57, which includes the universal bar 65, engageable by the usual heels of the several type bars 43. Reciprocation of universal bar frame 473, by means of the type bars 43 and a return spring 474, is accompanied by actuation of a rocker 475 carrying escapement dogs 64 to effect letter feed of the carriage. The reciprocation of frame 473 also works through a conventional connection diagrammatically represented at 473a, Figure 32, to vibrate the usual inking ribbon 476. At the reciprocation of universal bar frame 473 and its supporting frame 175, the shaft 171 is rocked and may operate a ribbon-feed mechanism, not shown.

When the "9–0" type action lever 44 is operated without printing, it works through cam-arm 467, rock shaft 171, frame 175 and universal bar frame 473 to effect actuation of the escapement dog rocker 475 for a letter-feed step of the carriage. Stud 466 and cam-arm 467 may be relatively arranged so that their time of cooperation, corresponds to the time of cooperation of any type bar heel with universal bar 65. The fixed escapement dog 64 may be arranged to permit substantially no movement of the carriage when said dog engages the escapement wheel 63. It will be seen now that at the operation and return of said "9–0" lever 44, without printing, as a result of the highest wheel standing at "9" and the carriage being at the place corresponding to said highest wheel, the carriage becomes letter-spaced to the place corresponding to the wheel of next lower denomination. If said next lower wheel stands also at "9," the corresponding feeler 140 will be positioned by the "9" representing slot 141 of said latter wheel and, therefore, the "9" blade 147 will be lifted to connect the "9–0" draw link 54 to snatch roll 57 for a resulting reoperation of "9–0" type action lever 44 at which a "9" pin will be set in the register bar 69 corresponding to said next lower denomination. Thus, the "9–0" type action lever 44 is reoperated, without printing, for every computing wheel, after the highest wheel, that stands at "9" and therefore, represents an insignificant figure ahead of the first significant figure of the negative total.

The cross bar 445 is maintained in its normal and upwardly shifted positions by a detent device comprising a bar 477 pivoted to cross bar arm 446 and having two detent notches 478 cooperative with a fixed detent 479, bar 477 being spring-urged to settle one or another of said detent notches against said detent as in Figure 38 which represents cross-bar 445 in its lifted position.

At the first operation of "9–0" lever the companion lever 50 shifts bar 158 and rock shaft 157, Figure 49, to connect operatively the "0–9" type action, instead of the spacer draw link 162, to the "0" blade 147.

When the carriage reaches the place corresponding to the computing wheel representing the first significant figure (any figure from "0" to "8") of the negative-total, the corresponding type-action will be selected and operated. By such operation of a first significant figure type-action, a nose 480 of the corresponding lever 50 engages and depresses the lifted cross bar 445 to normal position gaged by detent 477, 478. By such restoration of cross bar 445, the coupler bar 455 on the "9–0" type action lever 44 becomes shifted on said lever to reengage its stud 458 in slot 459 of the bell crank 45 thereby reconnecting the "9–0" type bar 43 to its lever 44, to enable it to print any upper case "0" that may occur after the first significant figure of the true negative-total.

The printing of the true negative-total now proceeds digit-by-digit, the significant-figure type-actions being selected and operated under control of the computing wheels and carriage in the same manner as described with reference to positive total-printing, it being noted that the case-shift mechanism remains operated so that the printing is done by means of the upper-case-types 444ª.

In the letter-feed step of the carriage which attends the printing of the last digit of the negative-total, the cycling tooth 132 of the column unit 86 actuates cycle trip lever 133 to initiate a cycle of the general operator mechanism in the computing base. The operation of the type-actions for printing the significant-figures of the negative-total was attended by setting of corresponding index pins 76 in the register bars for the wheels standing at the significant figures positions of the negative total. Although the true negative total is printed, the nines complement thereof is set up in the index pins 76 of the register bars and includes the setting of the insignificant "9's" in these register bars corresponding to the computing wheels standing at insignificant "9" position. Therefore, during said cycle, the significant figure computing wheels, from which the negative-total was printed, and the wheel or wheels standing at insignificant "9" are rotated substractively to zero or clear positions. During said cycle, the cam 434 and follower-lever 435, Figure 38, cooperate to displace arm 417 for resulting release of the case-shift latch arm 404 from catch 406 and consequent restoration of the platen to lower-case position. During said cycle and following restoration of the platen to lower-case position and clearing of the computing wheels, the star-printing type bar 43ª, Figures 42, 46, becomes automatically operated, to print a clear-sign star after the automatically printed true negative-total, as hereinbefore described in the section entitled "Automatic clear sign printing." During said cycle, the set index pins become restored; the cycle also effects restorations as described in the section entitled "Restoration of total taking mechanism during a cycle."

The ledger sheet, L, Figures 13, 23, is the record of an account. The balance of the account changes from time to time according to debits and credits which may be recorded also upon the ledger sheet. For computing and recording a latest or new balance, the ledger sheet is first inserted in the machine. Then the machine is operated according to an initial amount or the last previous balance to enter the same into a clear register, which in the present instance, is the middle or No. 2 register, Figures 1 and 44. This last previous balance is entered in the No. 2 register by operating the numeral type actions and having the carriage traverse the zone corresponding to the left-hand or Old balance column of the ledger sheet. By this operation of the numeral type actions, the last previous balance may also be typed in the Old balance column. It will be understood, however, that this operation of the machine is primarily for entering the last previous balance in the register and that the attendant typing of such balance may be regarded as incidental except that it serves for typing the initial amount or balance which starts a fresh ledger sheet upon which no preceding record has been made. If the ledger sheet shows the last previous balance, in the Balance column, then the machine will be operable automatically to enter such last balance in the clear No. 2 register. Thereafter, the machine will be operated for entering the debit or credit in the No. 2 register while the carriage traverses the zone corresponding to the debit or credit column of the ledger sheet. The No. 2 register will now contain the new balance, which may be either positive or negative. The machine is then operated, according to this new balance in the No. 2 register, to record this new balance in the Balance column while the carriage traverses the corresponding zone. The new balance may be subtracted from the No. 2 register so that the latter is finally left clear again. Having recorded thereon the latest new balance, the ledger sheet may be withdrawn from the machine.

There will now be described provisions for operating the machine automatically, first, for entering in the register a last previous balance; secondly, for taking from the register the new balance, that results from a debit or credit transaction and, thirdly, for recording such new balance in the Balance column of the ledger sheet.

The new balance taken from the register is recorded on the ledger sheet in the form of codal representations. Later these codal representations are taken as representing the last balance and may be read or sensed by a sensing mechanism to determine and control automatic operation of the machine for entering such balance in the register preparatory to obtaining a further new balance which in turn is codally represented on the ledger sheet.

The codal representations are preferably perforations 490 made in the ledger sheet by operating for each digit two of a complement of five punches 491 arrayed as in Figures 4, 6, 28. In Figure 28, representing the punching and sensing code, the particular two punches 491 and sensing pins, for each digit "0" to "9," are indicated by the shaded punches.

The five punches 491 are spaced horizontally and vertically on the center lines $a$ and $b$ in the staggered array seen in Figure 28. The horizontal spacing of line $b$ is such that the second and third lines from the left are one and one-half letter spaces or .15 of an inch apart, the horizontal spacing otherwise being one-tenth of an inch which is the letter space unit of the carriage in the present machine. The vertical spacing of lines $a$ is such that two perforations that are closest to one another in an amount-representing line of perforations will not overlap but will be distinctly separated. In the present instance the vertical spacing is .0325 of an inch and the hole-diameter is .05 of an inch. By this scheme of arraying the punches in echelon, the punches are amply spread to the extent of four-and-one-half letter spaces and any two holes representing any digit will be spaced horizontally sufficiently from any two holes representing the next adjacent digit on the work sheet, even though the respective four-and-a-half letter-space fields overlap and the representations of the several digits are interspersed.

A line of perforations 490, Figure 23, represents the angular positions of the computing wheels which contain the significant figures of a new balance; in the present machine, it is only the significant figures of the new balance that are represented by perforations 490. If a new balance is negative and hence a credit-balance, said angular positions of the computing wheels represent the nines complement of the true overdraft as hereinbefore explained. Therefore a line of perforations 490, Figure 23, representing a negative new balance represents the nines complement of the true overdraft and is distinguished as such by punching an extra or credit-balance hole 492 by means of an extra or credit-balance punch 493. Said extra punch is grouped with the complement of five punches 491 by being disposed on the horizontal and vertical center lines c, d, Figure 28, which are distant from the other center lines a, b.

For sensing the perforations there is provided a sensing-pin group comprising five pins 494 corresponding to the five punches 491 and an extra or credit-balance pin 495 corresponding to the extra punch 493, Figure 28. The sensing-pin group is arrayed similarly to but is disposed one-third of an inch, two single-line-space units, above the punch group, Figure 6. Therefore if a line of perforations has been made on a ledger sheet in the machine by the punches to represent a new balance, a replacement of the ledger sheet which advances the latter two single-line-space units will bring said line of perforations on a level with the group of sensing pins.

The new balance-representing line of perforations is disposed, Figure 23, on the ledger sheet to the right of and above the new balance as typed in the Balance column. This disposes the perforations in an individual column to the right of the Balance typing column of the work sheet as distinguished from having the lines of balance-perforations and balance-typing interspersed vertically in one column. The new balance typing zone is, of course, within the length of the platen 58 but the portion of the work sheet that includes the companion perforations may extend beyond the right hand end of the platen to facilitate disposition of the mechanisms. Therefore a right hand side member 496 of the platen frame 59ª is spaced more than is usual beyond the right hand end of the platen 58. Said side member 496, a left hand side member 497 and an intermediate plate 498, adjustable for bearing alignment on a supporting ear 499, journal an axle 500 to which the platen 58 is fixed.

The punches 491, 493 and sensing pins 494, 495 are contained in a head or sub-carriage H that is mounted on and is case-shiftable with the platen frame 59ª. Said head is also movable laterally on the platen frame.

When the carriage traverses, by letter feed steps, the zone corresponding to the first or Old balance column of the ledger sheet the head H is held stationary, as will be explained later, in order that the line of perforations on the ledger sheet may traverse the group of sensing pins and effect, step-by-step, sensing of the perforations. Similarly, when the carriage traverses the zone corresponding to the new balance column of the ledger sheet the head H is also held stationary to effect step-by-step traverse of the perforation column of the sheet past the punches so that punching is effected step-by-step.

By means which will be referred to later, the ledger sheet is properly located in the carriage relatively to the punches and sensing pins.

*Punching and sensing head structure*

A cross bar 501 of inverted-channel cross section and right and left end-base-plates 501ª fixed thereto are secured by screws 502 to platen frame side-members 496, 497, Figures 4, 5, 6, 7, 13, 24. A depending plate 503 includes the aforementioned ear 499 and has a flange 504 secured by screws 505 to cross bar 501. A plate 506 including V-shaped outer trackways 507 is secured to plate 503 by screws 508.

The punching and sensing head H includes a foundation plate 509. A die plate 510 having die holes 510ª, Figure 37, for punches 491, 492 is spaced from and behind foundation plate 509 by a spacer plate 511, Figure 9. A plate 512 including V-shaped trackways 513 is secured, together with die plate 510 and spacer plate 511, to the back of foundation plate 509 by screws 514. Rollers 515, Figure 7, are disposed between the inner trackways 513 and outer trackways 507, and hence the punching and sensing head comprising the foundation plate 509 and its attachments is movable laterally relatively to the platen frame 59ª. A tensile spring 516, connected between a stud 517 of plate 506 and a stud 518 on screw 514 of the punching and sensing head urges said head leftwardly relatively to said platen frame as viewed from the front of the machine. A stop 519 on said head engages a stop 520 on the platen frame to limit the leftward movement of said head relatively to said platen frame. Spaced forwardly from the foundation plate 509 by bosses 521 of the latter, Figure 11, and secured to said bosses by screws 522 there is a guide plate 523 for the forward ends of the punches 491, 493, said guide plate and foundation plate having punch-guiding holes 524 in which the punches are slidable. Die plate 510 has die holes, for the punches. The punches are normally retracted within the foundation plate 509 so that the ledger sheet may be freely inserted within the gap formed between the die plate 510 and the foundation plate by the spacer plate 511.

Each punch 491, 493, Figure 37, is a stem of a forward portion 525 which is enlarged in diameter relatively to said stem. A helical spring 526, on each punching stem, reacts against the foundation plate 509 and the shoulder of the enlarged punch portion 525 for retracting the punch from the paper and into the foundation plate.

Five punch operating levers 527, for the five punches 491, and a lever 528, for the credit-balance punch 493, are individually operable about a common vertical fulcrum shaft 529 turnable independently in ears 530 of a bracket fixed to foundation plate 509 by screws 531. The enlarged portion 525 of each punch has a side notch 532ª in which a tongue 532 of the companion lever 527 or 528 is fitted, Figure 35, for operatively connecting said lever and punch. Each lever 527 or 528 also fits an end slot 532ᵇ of its punch for support by the latter and for keeping the punch from turning. Lever-separating spacers 529ª and outer spacers 529ᵇ cooperate with bracket ears 530 to locate the punch levers vertically along the fulcrum shaft 529.

The five levers 527 extend horizontally leftwardly from the fulcrum shaft 529 to present an array of forwardly extending tongues 533, one on each lever.

Viewed from the front of the machine, the two tongues 533 corresponding to the first two punches 491 from the left, as in Figures 4, 33, are offset to the left of and are in staggered relation to the other three tongues 533 which correspond to the last three punches 491, at the right. The levers 527, 528 may be flat and have the same vertical spacing as the punches. The two outer levers 527 bear respectively against upper and lower edges of a notch 534 of plate 523, Figure 34, and a spacing shim 535 is placed between each two adjacent levers 527, to support and space the levers vertically near tongues 533. The spacing shims are notched at their ends for edgewise retention, as at 536, by plate 523 and by a clip 537 secured by a screw 538 to plate 523. Each lever 527 has a shoulder 539 to stop against plate 523 and limit outward movement of the lever under the influence of the punch retracting spring 526. The extra punch lever 528 has a stop 540, Figure 33, against foundation plate 599, to limit the retraction of said lever by its punch spring.

A certain two of the five punch lever tongues 533 are struck by means of each numeral type bar 43 depending on which two of the punches 491 are to be operated according to the punching code represented by the shaded punches, Figure 28. If the two tongues to be struck by a type bar are laterally offset, two tongue-striker plates, such as 541, Figures 29, 33, are secured to opposite sides of the type bar. But if the two tongues that are to be struck are either at the right or at the left of the Figure 33 array, only one tongue striker plate, such as 542, Figure 29, will be secured, respectively, to the right side or to the left side of the type bar. In Figure 29 the shaded squares 543 represent the tongue-striking portions of the striker plates. Some of the striker plates have cutouts 544 for clearing the tongues 533 that are not to be struck. The striker plates 541, 542 may be secured to the type bars as by riveting. It will be observed that it is feasible, by means of the punching levers 527, to have two punches that represent a digit widely separated in comparison with the space occupied laterally by the striker plates 541 on the corresponding type bar 43.

Because of the described disposition of the punches 491, 493, levers 527, 528 and striker plates 541, 542, a line of perforations will be above the corresponding balance as typed in the Balance column. The first balance may be typed sufficiently below the top of the sheet so that the corresponding first line of perforations and first sheet locating hole 581, hereinafter described, will be within the sheet as in Figure 23. Thus, some of the perforations may be at or above the level of the printed column headings.

*Punching operation when a balance is positive*

Consider now that the carriage has traveled leftwardly while typing in the Old balance column, and in the Debit or Credit column on the ledger sheet so that finally a new balance is in the No. 2 register and that it is of positive value. Consider also that the total key 178 has been operated preparatory to recording the new balance in the ledger sheet Balance column and that therefore the carriage has been tabulated leftwardly into the Balance column, and is at the position corresponding to the highest computing wheel in said register. The punching and sensing head H with its stop 519 bearing against the carriage stop 520 and coupled to the carriage by spring 516 has traveled leftwardly in unison with the travel of the carriage to said highest denomination position. By the leftward movement of the punching and sensing head with the carriage to said position the array of tongues 533 of the punching levers 527 has been brought, as in Figure 33, into the striking field of the tongue strikers 541, 542 of the numeral type bars 43. It may be noted here that said tongues 533 do not reach said striking field during the travel of the carriage to the position corresponding to the lowest denomination of the work sheet Credit column; that is, until the carriage has passed said latter position and has come to the highest denomination position for the new balance typing column, the operation of any numeral type action cannot be attended by operation of the punching levers 527.

It will be remembered that by reaching the highest denomination of a total printing field through operation of the total key 178 the total-printing mechanism will have been brought into play so that if the total is positive and the highest denomination computing wheel registers a significant figure a corresponding numeral type action will be actuated automatically to print said significant figure. It will also be remembered that if the total is positive and the highest denomination wheel stands at insignificant "0" the carriage spacing mechanism will be operated automatically to step the carriage to the next denomination. In the present instance the zone of travel of the carriage for the Balance column of the ledger sheet is a total-printing zone. Therefore beginning with the highest denomination a numeral type bar will be operated or the carriage will be spaced automatically.

At the instant that the punching and sensing head reaches the highest denomination position for the Balance column along with the carriage, stop edge 546, Figure 13, of a stop plate 547 attached to the punching and sensing head H encounters the right hand side of a fixed stop 548 on the framework of the machine. Stop edge 546 and stop 548 are arranged to serve either in lower case or upper case condition, it being noted that stop edge 546 is case shiftable with the platen frame 59ᵃ. Head H is arrested by means of stops 546, 548 and thereby, considering lower case operations, the punch lever tongues 533 are kept in the striking field of the type-bar strikers 541, 542 while the carriage proceeds, along with the ledger sheet L, from the highest denomination of the Balance zone to all succeeding denominations of that zone. If the carriage merely spaces automatically through higher denominations, because of insignificant zeros in the corresponding computing wheels, no type-bars are operated and therefore no punching is effected for the insignificant figures. When the carriage reaches the position corresponding to the computing wheel that registers the first significant figure of the balance, the corresponding type-bar 43 is automatically operated and operates corresponding punch levers 527 to punch the ledger sheet with the two holes representing the first significant figure, as in Figure 33. The attendant letter-feed step of the carriage brings the carriage to the next position which may correspond to a computing wheel registering a second significant figure for which a corresponding type-bar will be operated automatically and will operate corresponding punch levers 527 to punch the sheet with two holes representing the second significant figure. In this way codal representations of the significant figures registered in the computing wheels are punched one-by-one automatically to sensably record the balance in the perforation column on the ledger sheet. Since the type-bars are operated to punch the balance, they may also type the balance, as in the present instance, if a type record as well as a perforated sensable record is required.

*Punching operation when a balance is negative*

Consider again that the carriage has been tabulated to the position, in the Balance zone, corresponding to the highest computing wheel of the No. 2 register, by operation of the total key 178 after making an entry in the Debit or Credit column. Consider further that said highest wheel stands at "9" indicating that the registered balance is not positive but negative in value and is, moreover, the nines complement of the true negative balance. In that case, said highest wheel and the positioning of said carriage at said highest denomination determine, by means of feeler 140 and blade 438, operation of the case shift mechanism so that although the type bars 43 will be selected and operated according to the registered nines complement, nevertheless the true negative balance will be printed by means of the upper case types 444ª of said type bars as explained in the foregoing section entitled "Negative total or credit balance printing." At such operation of said type bars, their respective punch striker plates 541, 542 will also serve, as will be shown, to operate the punches 491 to punch the nines complement of the registered negative total on the ledger sheet. In order to make manifest on the ledger sheet itself that a line of perforations 490 represents a negative balance and, moreover, represents the nines complement of such negative balance, the extra punch 493 is operated to punch the extra hole 492, Figure 23. The case shift operation, which results from the highest wheel standing at "9," may be used as the medium to effect the operation of the extra punch 493, and to this end the following means are provided.

A rod 549, Figures 4, 6, 7, 13, 33 and 38, has slots 550 slidably fitting headed studs 551 on plate 547 and presents a shoulder 552 under and vertically opposed by a lug 548ª on stop 548 as at Figure 33 when the carriage is positioned in the Balance zone at the place corresponding to the highest computing wheel of the No. 2 register. As shown in Figures 4, 6, and 13, shoulder 552 may be on a plate 552ª vertically adjustable on rod 549. A horizontal bar 553 has slots 554 slidably fitting studs 555, 556 on foundation plate 509. A bell crank 557 fulcrumed on stud 556 has a pin-and-slot connection 558 to rod 549. Said bar 553 presents laterally spaced ears 559, 560. A block 561, Figure 6, on ear 560 has a roller 562 bearing against foundation plate 509. Bell crank 557 presents a roller 563 between ear 559 and block 561. Extra punch lever 528 has a pivot-stud 564, Figure 4, for a by-pass cam 565 urged counterclockwise about said stud by a spring 566, said cam normally stopping against a stud 567 on lever 528.

When the carriage is at the highest computing wheel place in the Balance zone and the case-shift operation occurs because the highest wheel registers "9," the rod 549, being opposed by fixed stop lug 548ª, does not partake of the case-shift movement of the foundation plate 509 and its attachments which include bar 553 and bell crank 557. The bell crank 557 partakes of the case-shift movement and by reacting against the arrested rod 549 at the pin-and-slot connection 558 is rocked clockwise about stud 556 to the Figure 38 position to move bar 553 leftwardly. Thereby ear 560, Figure 4, of bar 553 overrides cam 565 to rock lever 528 clockwise and thereby actuate the extra punch 493 to perforate the extra or negative balance hole 492 in the ledger sheet. The leftward shift of bar 553 relatively to foundation plate 509 thus derived from the case-shift operation brings ear 560, which has overridden cam 565, beyond said cam so that lever 528 and its punch 493 become restored by spring 526 of said punch immediately after the extra hole 492 has been punched in the ledger sheet.

The case-shifted position of the parts is sustained by means of the case shift-latch arm 404 until total printing of the negative Balance is completed when said latch arm 404 will be tripped as will be referred to later. Correspondingly, bar 553 will be sustained in its leftwardly shifted position, Figures 38, 39, on the case shifted foundation plate 509 until said total printing is completed. By the case-shift of foundation plate 509 of the punching and sensing head, the punch levers 527 are displaced upwardly and therefore their tongues 533 are above and out of reach of the striker plates 541, 542 of type-bars 43. But the leftward shift of bar 553 places a group of interponent-levers 569 between the displaced punch levers 527 and the strikers 541, 542 of type-bars 43, as in Figure 39. Bar 553 has a forwardly bent arm 570, see also Figures 20, 21, 22, presenting a transverse fulcrum stud 571 for interponent levers 569, each formed at its rear as exemplified at 572, Figure 22, to engage only the tongue 533 of a corresponding punch lever 527. Levers 569 are further differentially formed to present an array of lands 573 corresponding to the array of lever tongues 533. Said lands 573 are within the range of the type bar striker plates 541, 542, while said tongues 533 themselves are above and out of said range because of the case-shift. A lever 574 fulcrumed on stud 571 and disposed between two of the interponent levers 569 has lateral extensions 575 and is urged counterclockwise, Figure 20, by a spring 576 for restoring the interponent levers 569. A stud 577 on arm 570 passes through and abuts the rear ends of slots 578 in levers 569 to limit the counterclockwise restoration of any lever 569. Spacers 579 separate the interponent levers 569.

As described in the section entitled "Negative total or credit balance printing," the case-shift is attended by disconnection of the type bar 43 and the operating lever 44 of the "9–0" type-action, and by the automatic operation of said operating lever 44 without printing and, as will be apparent, without punching. Such operation of said lever 44 sets the "9" pin 76 of the highest register bar 69 for the No. 2 register; it also operates the carriage-escapement by means of cam arm 467 so that the carriage steps from the place corresponding to the highest computing wheel to the next lower place. Such operation of lever 44 also shifts bar 158 and rock shaft 157 to connect operatively the "0" blade 147 to the "0–9" type-action so that where any computing wheel, after the highest wheel of the No. 2 register, stands at "0," the "0–9" type action will be operated to print its upper case "9" and punch a representation of "0" on the ledger sheet for the denomination corresponding to said wheel.

At said next lower place, the corresponding wheel may also register "9," in respect to the negative total, in which case its total-reading finger 140 will have selected the blade 147 for the "9–0" type action, and the cariage at said next denomination will have cooperated to move said blade 147 to effect power-operation of the "9–0" lever 44, but without printing or punching, since said lever 44 is still disconnected from its type bar 43.

All wheels ahead of the wheel that registers the first significant figure of a negative balance stand at "9" and, therefore, the carriage will be stepped automatically by means of the "9–0" type action lever 44, disconnected from its type bar 43, for each non-significant figure denomination. At each such non-significant figure denomination, the "9" digit pin 76 is set in the corresponding register bar by means of the "9-0" type action lever 44.

When the carriage reaches the place corresponding to the computing wheel standing for the first significant figure, of the negative balance (any figure from "0" to "8"), the corresponding type-action will be selected and power-operated. It will also be remembered that operation of any type-action from "0" to "8" causes lever 44 and type bar 43 of the "9-0" type action to become reconnected.

Any wheel following the wheel that represents the first significant figure of the negative total may determine, in cooperation with the carriage at the corresponding denomination, an operation of the corresponding digit type-action to print by means of the upper case type; this includes the "9-0" type action since the type bar 43 of the latter has become reconnected to its lever 44.

The operation of printing the significant figures of a negative balance proceeds automatically, digit-by-digit, and is attended by operation of the appropriate punches 491 with the result that the true negative balance is printed, by means of the upper case types 444ª, and the nines complement of the true negative balance is punched through operation of the interponent levers 569 by the striker plates 541, 542 as exemplified in Figure 39. The operation of the type actions for printing the significant figures of the true negative balance also effects settings of the pins 76, corresponding to the complement, in the register bars 69 associated with the significant figure wheels; it will be remembered that a "9" pin has also been set in the register bar of each wheel preceding the first significant figure wheel in the case of a negative balance.

*Cycling operation after printing and punching the balance*

In the carriage step which attends the operation of the type-action to print and punch the last or units digit of the Balance, the cycling tooth 132 of the column unit 86 for the Balance column operates the cycle trip lever 133 to initiate a cycle of the general operator mechanism. The prior operation of the total key 178 and resulting tabulation of the carriage to the highest computing wheel place for the Balance column will have predetermined that the wheels of the No. 2 register will be rotated subtractively to extents determined by the pins 76 that were set during the preceding Balance printing and punching operations of the type-actions and the carriage spacing operation of the "9-0" type action lever 44. Thus, the cycle operates to clear the No. 2 register following printing and punching.

The automatic initiation of a cycle and clearing of the register occurs irrespective of whether the registered Balance is positive or negative.

During this cycle and following the subtractive rotation of the wheels to "0" or cleared positions, the star-printing type action 43ª—50ª is caused to be automatically connected to the power-driven snatch roll 57 and thereby is operated to print the star after the last figure of the Balance as described in the section entitled "Automatic clear sign printing." This star-printing operation also occurs irrespective of whether the Balance is positive or negative.

If the cycle is one that attends the printing and punching of a Balance that is negative, the cam 434 and follower lever 435 cooperate to trip the upper-case-shift-sustaining latch arm 404 and thereby effect restoration of the machine to lower case condition. In this restoration, the platen frame 59ª and its punching and sensing head H drop to lower-case position. The drop is accompanied by rightward restoration of bar 553 and counterclockwise restoration of bell crank 557 to normal positions, Figure 33, by a spring 580 attached to said bar and anchored to stud 556. In the rightward restoration of bar 553, its ear 560 passes and idly turns cam 565 about its pivot 564 on extra punch lever 528, said ear finally releasing said cam to permit the latter to reassume its normal position on the lever under the influence of its spring 566. The rightward restoration of bar 553 is accompanied by rightward shift of its interponent levers 569 to normal positions, Figure 33, thereby leaving the tongues 533 of punch levers 527, which have also dropped back to normal or lower case position, engageable directly by the strikers 541, 542 of typebars 43 again.

*Provisions for relocating ledger sheet*

After a new balance has been typed and punched on the ledger sheet, the latter may be removed from the machine until such future time when another new balance is to be computed and recorded on said same sheet. But before the ledger sheet is removed from the machine, a relocating hole 581 will have been punched at the right margin of the sheet, Figure 23, to serve for positioning the sheet in the machine for receiving said future new balance.

A plate 582, Figures 4, 5, 6, 7, 42, 43, secured to the top of cross bar 501 presents a flange 583 spaced forwardly from the front wall of said cross bar 501. A block 584 is fixed to said cross bar. A stripper bar 585 is separated, Figure 43, from the front of block 584 by a spacer plate 586 to define a sheet-margin receiving gap. Plate 586 and stripper bar 585 are secured to the front wall of bar 501. A punch 587 has its punching end normally retracted within the stripper bar 585 and has its opposite end 587ª, which is of rotation-preventing cross section, slidably fitting a corresponding guide hole in flange 583. Said punch end 587ª projects forwardly from flange 583 for articulation as at 588 with a punch-retracting leaf spring 589 fixed at one end to flange 583. Block 584 has a die hole 584ª for punch 587.

At a distance of the line-space-unit of the ledger sheet above punch 587, there is disposed a sheet-locating pin 590. Said pin is slidably disposed in block 584 and a rear plate 591 fixed to bar 501. Normally pin 590 projects slightly beyond the front face of the block 584.

Pivoted to plate 582 at 592 is a finger 593 urged by a spring 594 to engage and yieldably retain the ledger sheet L upon pin 590 which fits hole 581 in the ledger sheet. Said hole results from operation of punch 587 and has been advanced to said pin 590 upon replacing the ledger sheet in the machine. A gaging stop 595, Figures 6, 7, 13, having supporting attachment to plate 593 is abutted by the right-hand edge of the sheet and cooperates with pin 590 to square the sheet and locate it laterally in the carriage. The ledger sheet is front inserted and its insertion is directed by a throat comprising front and rear plates 596, 597, see also Figure 1, having supporting connection to bar 501 to present said throat above and substantially tangent to the platen at the printing line. Lower feed rolls 598 are cast off from the platen by means of a feed-roll release lever 599 preparatory to the front insertion of the sheet and are restored to clamp the sheet against the platen after its location has been gaged by means of pin 590 and side stop 595.

The carriage is returned to its starting position after typing and punching the balance. During such return, there is coincidental line space rotation of the platen which advances the ledger sheet. To permit said ledger sheet advance, the locating pin 590 is automatically retracted by means of an operative connection 600, partly shown, to the line space mechanism.

The sheet locating mechanism thus far described in this section is substantially as set forth in my copending application Serial No. 361,673, filed October 18, 1940, now Patent No. 2,304,277, dated Dec. 8, 1942, to which reference may be had for further details.

Consider again that the carriage has taken the letter feed step attending the typing and punching of the last digit of the Balance. By such step, punch 587 has moved, along with the carriage, to reach and engage, as in Figure 42, by means of a notch 601 of the punch, a nose 602 of a punch-operating lever 603 having a vertical pivot 604 on a tab 605 fixed to foundation plate 509. Said lever is articulated as at 606 to a vertical lever 607 having a pivot 608 on a bracket 609 fixed to foundation plate 509 by screws 614. Consider also that said carriage step has initiated a cycle and that the star-printing type-bar 43ª is operated during the cycle to print a star as hereinbefore explained in the section entitled "Automatic clear sign printing." A striker 610 fixed to and projecting laterally from the star type-bar head strikes the front edge of a depending arm of lever 607 and thereby rocks the latter clockwise, Figure 42, during the final portion of the printing stroke of star type bar 43ª, to rock lever 603 counter-clockwise to push punch 587 through the ledger sheet to produce the sheet-locating hole 581 which represents the position of the new balance with which the operation of star-printing is identified. At the usual restoration of the star-printing type bar 43ª following its printing stroke, spring 589 retracts punch 587 from the paper and restores it to its normal position. A spring 611 anchored to foundation plate 509 and attached to lever 603 may cooperate to restore the punching train. The limit of restoration of lever 603 may be gaged by stopping lever 607 against a stud 615 on bracket 609. The restoration of punch 587 by spring 589 may be limited by stopping its shoulder 616 against flange 583.

It will be noted that unless the carriage is in star-printing position for the balance column, punch 587 will not be engaged by lever 603 and therefore will not be operatively connected to the star-printing type bar 43ª. Therefore, operation of the star-printing type bar for any other column than the balance column cannot result in operation of punch 587.

The operation of star-printing type bar 43ª actuates the carriage escapement. By the resulting letter-feed step the carriage reaches and actuates a carriage-return-initiating control 612, Figure 2, to automatically cause a power mechanism, not shown, to return the carriage to its starting position gaged by a margin stop 613, Figure 13, where it is automatically disengaged from the power mechanism. The carriage return may also be initiated manually by operation of a carriage return key, not shown, after the star type-bar 43ª has been operated. The carriage return features referred to may be substantially as exemplified in H. L. Pitman Patent No. 1,624,068, dated April 12, 1927. With the return of the carriage, the feed rolls 598 may be cast off to release the ledger sheet and the latter may be withdrawn from the machine.

During the initial portion of the carriage-return movement, the carriage alone returns while the punching and sensing head H remains stationary against stop 548 under the influence of the punching-and-sensing-head spring 516. However, as soon as stop 520 of the returning carriage encounters stop 519 of the stationary punching-and-sensing head, the latter is returned along with the carriage for the remainder of the carriage-return movement which brings both the carriage and the punching-and-sensing head to the fully returned Figure 4 position.

In a similar way, the carriage is also returned after recording and punching a positive balance in the balance column on the ledger sheet.

Consider, now, a later time when a later new balance is to be computed and recorded on the ledger sheet. The sheet is, therefore, front inserted in the machine again and placed with its last-made hole 581 over sheet locating pin 590 and with its edge against stop 595 thereby positioning the sheet laterally in the machine and with the last-made line of perforations 490, and including possibly 492, advanced above the punching line so that said perforations may traverse the group of sensing pins 494, 495. With the sheet thus located in the carriage, the feed rolls 598 are restored, said rolls having been cast off preparatory to front inserting the sheet.

By now operating the appropriate denominational tabulating key 184, Figure 1, the carriage is advanced to the position, for the old balance column, corresponding to the highest computing wheel of the No. 2 register. In setting up the machine, a column unit 86, Figures 13, 14, 15, 16, 17, for the old balance column has been disposed on the carriage so that its tabulating stop 135 cooperates with the tabulating reed 182, operated by said tabulating key to position the carriage for said highest wheel position. Said column unit includes a tappet 103 for depressing the cam plate 102 for the No. 2 register, said cam plate being at this time in its forward item-entering position as distinguished from its rearwardly tilted total-printing position. The depression of said cam plate connects the corresponding set of register bars 69 to the denominational jacks 82 and also determines that at a subsequent cycle of the machine, the register will be operated additively. Said old balance column unit 86 also includes a tappet 85 for traversing said denomination jacks 82, and it also includes a cycle-initiating tooth 132.

The punching and sensing head H, with the group of sensing pins 494, 495 mounted thereon as will be described presently, moves laterally in unison with the movement of the carriage to the highest wheel position for the Old balance column. The ledger sheet, of course, also moves laterally in unison with this carriage movement.

The line of perforations that is to be presently sensed may include the extra hole 492 to signify that said line represent a negative balance. By inserting and properly positioning the ledger sheet in the machine, said extra hole 492 will become positioned in line with the extra sensing pin 495, but, as will also be described presently, the extra pin will be held back from sensing said extra hole, and the other sensing pins will also be held back, until the carriage reaches said highest wheel position for the Old balance column.

Sensing pin and contact mechanism

A vertical plate 618 and a vertical plate 619, Figures 5, 6, 7, 12, 36, 40, spaced rearwardly therefrom include, respectively, horizontal upper plates 620 and 621 which overlap and are fixed together by screws 622. Plate 621 and its hub 623 are fixed to vertical shaft 529 by set-screws 624. Horizontal plate 621 is above the upper one of the bracket ears 530 in which said shaft 529 is journaled. Shaft 529 and its attached plates 618, 619 form a unit which is urged counter-clockwise by a spring 625 anchored at 626 to foundation plate 509 and attached to an ear of plate 621. A stop 627 of plate 621 abuts a stop 628 on upper bracket ear 530 to limit the counterclockwise turning of said unit by spring 625.

Each of the sensing pins 494, 495 is supported and guided, see also Figure 37, for endwise movement in aligned holes provided in plate 619 and foundation plate 509.

The sensing pins have each a shoulder 629 engaging plate 619 to block rearward or ledger-sheet-sensing movement of pins 494, 495 while said plate 619 is normally positioned forwardly as determined by spring 625 and stops 627, 628. Each sensing pin includes a forward end 630 of insulator material for engaging a companion contact finger 631. A transverse plate 632 having a fulcrum ridge 633 on which fingers 631 bear, and a plate 634 in front of fingers 631 are fixed to plate 618 by screws 635 but are electrically insulated from plate 618 and spaced apart by insulator bushings 636 and spacers 637. Each finger has a hole to fit movably over a companion stud 638 fixed in plate 632. Each finger 631 also has a stud 639 loosely fitting a companion slot 640 in plate 632. Each stud 638 carries a spring 641 which, reacting against plate 634, urges the companion finger 631 clockwise about fulcrum ridge 633. Studs 638, 639 and slots 640 cooperate to space the fingers laterally in accordance with the spacing of the sensing pins 494, 495 in a direction paralleling the fulcrum ridge 633 which is slanted in respect to the inclination of the array of said sensing pins.

The upper end of each finger has a contact 642, Figure 37, opposite a corresponding front contact edge of one of a series of horizontal contact bars 643. Said contact bars 643, a common contact bar 644, a bottom clamping bar 645, and spacing bars 646 of insulator material form a vertical stack, Figure 8. Screws 647 passing through insulator sleeves 648 in the stack and threaded into the bottom clamping bar 645, fix the stack and upper spacers 649 to a supporting plate 650 fixed by screws 651 upon plate 582. The common contact bar 644 is engageable by an extra finger 652 with which are associated studs 638, 639 and spring 641, like the other fingers 631.

When plate 619 is in its forward position, as determined by stops 627, 628 and spring 625, the spring-pressed fingers 631 may bear against their sensing pins 494, 495, or against collars 653, but do not reach and contact their respective contact bars 643, and the sensing pins are stopped, at their shoulders 629 by said plate 619, from reaching the ledger sheet. There is no sensing pin for the common finger 652 but the latter may be merely stopped by collar 653 on its stud 638 to keep it from contacting the common contact bar 644, when said plate 619 is in said forward position.

The column unit 86, Figures 13, 14, 15, 16, 17, on the carriage, for the Old balance column of the ledger sheet, has fixed thereto by screws 656 and underlying spacers 657 a plate 658 from which depends a stack of contact bars 659, corresponding to the contact bars 643, 644. Said contact bars 659 and insulator spacer bars 660 are assembled upon insulator studs 661, Figure 15, depending from and fixed to plate 658 and an underlying clamp plate 662 by screws 663. Lower screws 664, threaded into said studs 661, and a lower clamp plate 665 cooperate to clamp the bars 659, 660 together. The several finger-engageable contact bars 643, 644 are electrically connected by wires 666 to the corresponding contact bars 659 of the column unit. The several wires 666 are cabled and permit the column unit 86 to be shifted laterally for location upon the carriage. A box 655 encloses the connected terminals of bars 659 and wires 666 and may be secured in place by screw 663. Plate 658 has a depending side 654 articulated at 654ª with clamp plate 665. The Old balance contact unit 86 may have widely spaced plates 655ª for engaging rack 88, Figure 14.

A relay box 667 is attached by cheek plates 668 to housing 83. An insulator plate 669 fixed to the front of box 667 has fixed to its back at 670 a series of resilient conductor strips 671 each presenting a contact lug 672 engageable by the rear edge of the corresponding one of the contact bars 659 on column unit 86. An opening 667ª in box 667 is for clearing said strips 671 and conductor wires leading therefrom. Each column unit 86 has a roller for engaging a track 741, which may be fixed to cheek plates 668 as in Figure 17, to support said unit while the carriage traverses the corresponding zone.

Relay mechanism

Individual to each of the sensing pins 494, 495 there is a relay unit R, Figure 18, mounted in box 667. Each relay unit includes an electromagnet, an armature 673 and a one, two, three or four-pole normally open contact device D. Each pole of a contact device includes a movable contact blade 674 closable upon a substantially stationary contact blade 675. In the Figure 27 circuit diagram, c' is the relay magnet corresponding to the credit-balance sensing pin 495, and 1', 2', 3', 4' and 5', Figure 27, are the relay magnets corresponding respectively to the five sensing pins 494. In Figure 28 the reference numerals 1'—5', for the relay magnets, are joined by lead lines to corresponding sensing pin locations to identify each sensing pin and its corresponding relay magnet. Magnets c' and 1' each control a one-pole contact device; magnets 2' and 3' control, respectively, a two-pole contact device and a three-pole contact device; magnets 4' and 5' each control a four-pole contact device.

In the four-pole contact device, Figure 18, the four movable blades 674 are coupled in pairs by insulators 676 and the pairs in turn are coupled to armature 673 by an insulator plate 678. Upon attraction of armature 673 by energization of its magnet the four blades 674 are moved as a unit to close upon their respective stationary contact blades 675. Upon deenergization of the magnet a spring 679 retracts the armature 673 to open the contact devices.

For the one, two or three-pole contact device only the requisite number of contact blades 674, 675 need be provided, the relay-unit being otherwise like the four-pole unit. The relay units being known articles of commerce need not be described further.

Each relay magnet has one of its two coil terminals connected by a lead 680, Figure 27, to a corresponding contact strip 671, Figures 14, 15, which presents the contact lug 672. The other terminals of the several relay magnets have a common connection 681 to a lead 682 from one side of a current source S. The other side of the current source S is connected by a lead 683 to the lowermost contact strip 671, 672 which is engageable by the lowermost contact bar 659 on the column unit 86.

When any one of the sensing pins 494, 495 is permitted, as will be described presently, to enter a corresponding perforation in the ledger sheet 499, the corresponding one of the fingers 631 will engage its contact bar 643. At this time, the common finger 652 will also be in engagement with the common contact bar 644. Therefore, the relay magnet corresponding to the hole-entering pin will be energized through the circuit comprising lead 683 from current source S, the lowermost contact strip 671, 672, the associate contact bar 659, lead 666, common contact bar 644, common finger 652, finger-mounting plates 632, 634, finger 631 of the active sensing pin 494, 495, associate contact bar 643, associate lead 666, associate contact bar 659, associate contact strip 671, 672, lead 680, the relay magnet coil corresponding to the active sensing pin, connection 681 and lead 682, including a normally closed switch 684, hereinafter described, to the other side of the current source S.

*Means for arresting the punching and sensing head and permitting the functioning of the sensing mechanism*

A vertical plate 689, Figures 7, 13, 36, 40, is laterally adjustable at its attachment at 690 to a support 691 fixed to the typewriter frame F. A stop 692 pivoted at 693 to plate 689 is normally positioned by its latch shoulder 694 stopping against a latching corner 695 of an arm 696 pivoted at 697 to plate 689. A spring 698 anchored to plate 689 supports arm 696. Plate 689 and arm 696 have a stud-and-slot connection 699 to retain said arm facewise and to limit the pivotal movements of said arm. A spring 700 anchored to plate 689 is attached to stop 692 to pull normally on a line through the center of stop pivot 693 when said stop is in normal position. A cam tongue 701 and connecting yoke 702 are integral with arm 696. To the shaft 529 to which are fixed plates 618, 619 which support the sensing pins 494, 495 and contact fingers 631, 652 there is also fixed an arm 703 extending leftwardly to present a cam-edge 704 and a stop-edge 705.

When the carriage is advanced, as by operation of the tabulating key, from the fully returned position, Figure 13, to the highest wheel position for the Old Balance column, the punching and sensing head H advances in unison since it is coupled to the carriage by means of spring 516 and stops 519, 520. As the carriage and its punching and sensing head H settle at said highest wheel position, the cam edge 704 of arm 703 will have encountered stop 692 and will thereby have caused said arm 703 and hence the plates 618, 619 which support the sensing pins and contact fingers 631, 652 to turn clockwise, Figure 5, with shaft 529. This turning of plate 619 is to retract it rearwardly from shoulders 629 of the sensing pins 494, 495 so that each sensing pin becomes free to feel the ledger sheet to enter and thereby sense a perforation 490, 492, if one be present, under the urge of spring 641 of the corresponding contact finger 631. Plate 523 stops a screw-stop 707, Figure 5, in plate 619 to limit said turning of the latter. Said contact finger 631 moves into contact with its contact bar 643 if its sensing pin enters a ledger sheet perforation. Conversely, if no perforation is present opposite any sensing pin, the latter merely bears against the face of the ledger sheet, when said plate 619 is retracted rearwardly and the corresponding contact finger is, of course, prevented from contacting its contact bar 643. The rearward retraction of plate 619 also retracts collar 653 from the common finger 652 thereby causing the latter in any case to immediately contact the common contact bar 644 under the urge of the spring 641.

When the carriage and the punching-and-sensing head are at the highest wheel position for the Old Balance column, the stop edge 705 of arm 703 will have just reached stop 692 thereby determining that the punching-and-sensing head H, and its sensing pins 494, 495, will be arrested and held stationary laterally by said stop 692 during advance of the carriage through the Old Balance column zone. Stop 692 is long enough vertically to be capable of engaging lever 703 in either lower case or upper case position of said lever which partakes of the case shifts of platen frame 59ª. When head H is thus arrested, the line of perforations 490 of the ledger sheet may traverse the stationary group of sensing pins 494, 495 to enable the latter to sense the ledger sheet step-by-step at the Old Balance column as will be described presently.

When the last or units denomination of the Old balance column has been sensed, further advance movement of the carriage immediately will cause a bar 706 attached to plate 503, to engage and depress the cam-tongue 701 to depress arm 696 to withdraw its latching corner 695 from stop 692. The prior advance of the carriage to the last denomination of the Old balance zone, has stretched spring 516 and caused carriage stop 520 to recede from its companion punching-and-sensing-head stop 519. Due to release of the arresting stop 692 by the described depression of arm 696 the punching-and-sensing head, urged by spring 516, jumps ahead and is arrested relatively to the carriage by means of said stops 519, 520. In this jump, stop edge 705 and its arm 703 merely override stop 692 and turn it counterclockwise, from the Figure 13 position, incidentally overcoming the comparatively weak stop spring 700. When arm 703 has left stop 692, due to further advance of the carriage and punching-and-sensing head in unison, said stop may become restored by its spring 700 and be ready to be reengaged by arm 696 when the latter becomes restored by its spring 698 consequently to advance of bar 706 beyond cam tongue 701. The release of the arresting stop 692, effected by depression of arm 696, also releases arm 703 and hence releases plates 618, 619 for counterclockwise movement, Figure 5, by spring 625, said movement being limited by stops 627, 628. This retracts the sensing pins 494, 495 from the ledger sheet and restores the condition of preventing the contact fingers 631, 652 from contacting their contact bars 643, 644. It will be understood that the movement of the carriage, through the Old balance zone relatively to the punching and sensing head, the contact bars 643, 644 move, with the carriage, relatively to the contact fingers 631, 652 and that each bar is of sufficient length to be engageable by its finger at any point in said carriage movement for the Old balance column. At the later return of the carriage, following the sensing operation, arm 703 passes over and idly rotates stop 692 clockwise of Figure 13, the stop spring 709 finally restoring said stop to normal position by the time the carriage return is completed.

*Mechanism for reentering the sensed amount in the machine*

Ten electromagnets M, Figures 2, 27, 36, 40, one for each of the numeral type actions from "0–9" to "9–0" inclusive, and a credit-balance electromagnet CM, are supported in a transverse row by means of an angle-bar 709, fixed to the typewriter frame, insulator bars 710, 711, and magnet holding screws 712. Armatures 713, one for each of said magnets M have fulcrum notches fitting a fulcrum edge 714 of angle-bar 709, Figure 2. A strip 715 cooperates with edge 714 to swingably support the armatures 713 and is fixed by clips and screws 716 to angle-bar 709. Levers 717 each associated with a corresponding numeral magnet M are shaped to be fulcrumed as at 718 to turn individually on a transverse rock shaft 719, journaled in brackets 720 for turning independently of said levers 717, and having fixed thereto an operating lever 721. A transverse bar 722 fixed to the typewriter frame includes said brackets 720 and has sockets for compression springs 723 urging the levers 717, 721, counterclockwise individually. A finger 724 fixed to each armature 713 engages the corresponding one of the levers 717, 721. As urged by lever spring 723 each finger 724 normally bears against the under side of bar 722 to place the corresponding armature 713 in normally retracted position from its magnet core. Each lever 717, associated with a numeral magnet M, is operatively connected at 725 to the draw link 54 of the corresponding numeral type action.

The lever 721 is operable by the credit-balance magnet CM and is operatively connected to a draw link 54ª pivoted to a bell crank 50ᵇ fulcrumed on rod 51 and connected by a link 48ª to an operating lever 44ª. A bell crank 45ª connects lever 44ª to a bar 726 that is similar to type bars 43 but has a typeless head 727, Figure 40; the train from draw link 54ª to bar 726 serves as a dummy type action of sufficient driving weight for simultaneously setting all the "9" pins in the register bars 69 of the No. 2 register. An extra linkage 728 for setting the "9" pins 76 is provided. Like the other pin setting linkages 78, linkage 728 comprises cross link 729 connected at its ends to a pin-setting bar 730 by bell-cranks 731 of which only one is shown, Figure 40; a rod 81ª pendent from operating lever 44ª may engage a crank arm 80ª of a rock shaft 79ª connected at 732 to cross link 729. Said pin-setting bar 730 includes a lip 733 for engaging all the "9" pins of the several register bars of the No. 2 register, all of said register bars being in their normal fully retracted positions when all the "9" pins are to be set.

An arm 734 is fixed to rock shaft 719 and is operatively connected to an intermediate lever 735, see also Figure 30, fulcrumed on the framework at 736. Said intermediate lever 735 has a tab 737 for engaging stud 442 of lever 439 which is operative by means of said stud 442 to move the case shift draw link 393 into engagement with the power-driven snatch roll 57.

*Sensing and entering a negative or credit balance in the machine*

When the carriage is at the highest wheel position for the Old balance column, the credit-balance sensing pin 495 may sense and enter the extra or credit balance hole 492, such hole being present in the line of perforations representing the credit-balance. This sensing of the extra hole energizes the credit-balance relay-magnet c' through a circuit as described in the section entitled "Relay mechanism." The stack of contact bars 659 on the carriage will have become engaged with the lugs 672 of contact strips 671 by the carriage having become positioned at the highest wheel position for the Old balance column.

The energized credit balance relay magnet c' attracts its armature 673 to close the corresponding one-pole contact device D. This energizes the credit balance magnet CM through the following circuit, Figures 27, 40: current source S, lead 682 including normally closed switch 684, said closed one-pole contact device D, lead 738 to magnet CM, common bus bar 739 for all the magnets M and CM, mounted on bar 710, and return lead 740 to the current source S. Magnet mounting bar 710 is channeled as at 708, Figure 2, for receiving the leads 738, indicated in Figure 27, from the several magnets M and CM. Said leads 738 are cabled and run to one member of a separable plug connector 742, Figures 16, 17, at relay box 667, and said leads branch from the other member of said connector to the appropriate contact devices D according to Figures 27, 40.

The energized magnet CM attracts its armature 713 to rock shaft 719, Figure 40, to connect the case shift draw link 393, and the draw link 54ª, for the "9" pin setting train, to snatch roll 57. The resulting case-shift operation, Figure 38, lifts bar 445 into detented position to disconnect the "9–0" type bar 43 from its lever 44, and to connect the corresponding draw link 54 to snatch roll 57 for a carriage-spacing operation of said "9–0" lever to bring the carriage and ledger sheet from the highest wheel position to the next position for the Old balance column in the same manner as described in the section "Negative total or credit balance printing." The draw link 54ª, Figure 40, having also been connected to the snatch roll by the energization of the credit balance magnet CM, the lever 44ª will be operated and the attending operation of the extra linkage 728 will set collectively all the "9" pins in the several register bars of the No. 2 register, whereupon said draw link 54ª becomes disengaged from the snatch roll by encountering knock-off 348.

Although said draw link 54ª has thus been disengaged from snatch roll 57, spring return of the "9" pin setting train, extending from said draw link 54ª to pin-setting bar 730, is delayed until deenergization of the magnet CM has occurred. This delay prevents a repeat operation of said train and is provided for by having a shoulder 743 of the forwardly-tending disengaged draw link 54ª opposed by a hook 744 of lever 721 as long as the latter remains operated by magnet CM. When magnet CM is deenergized, hook 744 drops, under the influence of companion spring 723, to release draw link 54ª so that the latter and the "9" pin setting train become spring-returned to normal positions. In the normal positions of the parts, hook 744 is under a land 745 of draw link 54ª so that operation of said lever may raise said draw link into engagement with the snatch roll 57.

Switch 684 is operatively connected to the escapement mechanism, as will be described presently, so that said switch opens to disconnect lead 682 from current source S to deenergize the credit balance relay magnet c' and its companion magnet CM before the carriage and ledger sheet move in the letter-feed step induced by operation of the escapement.

The case-shifting as effected under control of the credit-balance sensing-pin 495 is maintained by means of the case-shift latch-arm 494 after the case-shift draw-link 393 has become disconnected from the snatch roll 57 by encounter with knock-off 348.

Switch 684 is a known article of commerce: it includes, Figures 31, 32, a case 746, an operating pin 747 and contacts 748 one of which is operatively connected to said pin so that an endwise micromovement of said pin in one direction causes said contacts to snap together to close said switch, and so that correspondingly small reverse movement of said pin causes said contacts to snap apart to open said switch. The case is fixed to the machine frame. A resilient strip fixed at one end to case 746 serves as a lever 749 for pressing said pin to close the switch and for releasing said pin to open the switch. Rock shaft 171 of the escapement mechanism has fixed thereto an arm 750. A link-rod 751 connected to arm 750 is threaded into a supporting hole in lever 749 and has a shoulder 752 for driving abutment with said lever. In the normal positions of the parts, Figure 31, pin 747 is pressed by means of arm 750, link-rod 751 and lever 749 to determine that the switch is closed. A small initial part of the counterclockwise movement of arm 750, and which movement attends initiation of operation of the train from shaft 171 to dog rocker 475 for a letter-feed step of the carriage, is sufficient to release pin 747 to cause switch 684 to open, as in Figure 32. Conversely, a small final part of the clockwise or return movement of arm 750 to normal position recloses switch 684. The letter-feed step of the carriage substantially accompanies the return movement of said train so that switch 684 is reclosed substantially at the instant the letter feed step is completed.

By a letter-feed step of the carriage, and of the ledger sheet L, any sensed hole 490, 492 leaves the therein entered sensing pin. Each sensing pin has a conical end 753, Figure 37, of base diameter larger than the ledger sheet hole and which end seats against the edge of the hole it enters. The entered pin does not obstruct the letter feed movement of the ledger sheet since its conical end is merely cammed outwardly by the edge of the hole at said ledger sheet movement. The outward movement of the sensing pin separates the companion finger 631 from its contact bar 643. The circuit having been opened by the prior opening of switch 684 there will be no sparking at the point of separation of the finger and its contact bar. The ledger-sheet-backing foundation plate 599 has, for each sensing pin 494, 495, a spot or hole 754 for clearing the conical end of the sensing pin to permit said end to seat against the edge of the hole, Figure 37.

By the letter-feed step of the carriage and ledger sheet, which follows the sensing of the credit balance hole 492 by its sensing pin 495, the highest-figure place of the perforation column of the sheet is brought opposite the group of five sensing pins 494. If the perforations representing the first significant figure of the balance do not appear at such place, none of said five sensing pins 494 can enter the ledger sheet. In that case they merely bear idly upon the sheet so that further automatic operation of the machine will wait on the typist advancing the carriage by means of the usual space key 755, Figure 1, or the appropriate tabulating key 184 to bring the first - significant - figure - perforation place of the ledger sheet opposite the group of sensing pins 494, the typist noting the amount standing typed in the Balance column. If the amount is of such magnitude that the perforated first significant figure appears at said highest place in the perforation column, no advance of the carriage by intervention of the typist is necessary. In either case, the two perforations 490 representing the first significant figure are entered into by the corresponding two of the sensing pins 494 when the carriage becomes positioned at the place corresponding to the first significant figure.

The two perforations representing the first significant figure of a negative balance may be for any digit from "0" to "8," it being remembered that the nines complement of the true negative balance is represented, and that "0" is the complement of "9" which may be a first significant figure of the true negative balance. When any such two perforations are sensed, the corresponding two of the relay magnets 1'—5' will be energized to close the corresponding two contact devices D. As will be understood from the circuit diagram at Figure 27, and the schedule, Figure 26, the closure of these two contact devices D makes a circuit to select and energize the magnet M for the numeral type action whose lower-case value corresponds to the two holes being sensed.

In Figure 36, for example, the sensing of two perforations representing the digit "5" is illustrated. The platen is represented as being in lower-case position for printing "5" as would be the condition in sensing a positive amount. However, if the amount is negative, as is being presently considered, the platen would be in upper-case position for printing the upper case "4" whose complement "5" is being sensed. The entry of the corresponding sensing pins in said two perforations closes two circuits, each as described in the section entitled "Relay mechanism," to select and energize the corresponding two relay magnets 1' and 4' so that these close their corresponding contact devices D to select and energize the magnet M for the "5-4" type action through the following circuit, Figures 27, 36: From one side of current source S to normally closed micro-switch 684, lead 682 and its branch a to the one-pole contact device D closed by relay magnet 1', lead e to one pole of the 4-pole contact device D closed by relay magnet 4', lead 738 to the "5-4" type action magnet M, and thence by bus bar 739 and lead 740 to the other side of the current source S.

The energized magnet M attracts its armature 713 to operate its lever 717 to lift draw link 54 for the "5-4" type action into engagement with snatch roll 57. The resulting actuation of said "5-4" type-action prints the upper case "4" on the ledger sheet but sets the "5" index pin 76 in the register bar 69 corresponding to the computing wheel of the No. 2 register in which the sensed first significant figure is to be entered. Said register bar 69 is selected for indexing because the carriage is at the position corresponding to the first significant figure place and operates through the column unit 86 to depress the corresponding jack 82 at said place to advance said register bar to indexing position. Just before the type bar 43 reaches the platen to print, draw link 54 encounters the knock-off 348 and thereby becomes disconnected from the snatch roll for spring-return of the type action after the completion of the printing stroke.

At its movement to set position in said register bar, the "5" index pin 76 momentarily deflects the universal pin latching bar 47, Figure 2, to release the previously set "9" pin for immediate restoration by its spring 46.

Operation of the carriage escapement attends the actuation of the "5-4" type action and this letter-spaces the carriage to the next place; consonantly with this letter spacing movement, switch 684 is opened and reclosed, in the same manner as hereinbefore described, with reference to sensing the credit balance hole 492 to deenergize relay magnets 1', 4' and the "5-4" magnet M and to prevent sparking between the contact fingers 631 and contact bars 643.

At said next place of the carriage, another two perforations may be presented to the sensing pins 494 and therefore similar operations, as just described with reference to the "5-4" type-action may proceed. It will be understood, therefore, without repeating the description for each digit of a negative amount, that the operations proceed automatically digit-by-digit, beginning with the first and ending with the last digit of a negative amount as represented by the line of perforations 490.

The operation of any type-action, in response to sensing the perforations for the first significant figure of a negative balance, depresses and thereby restores the bar 445 to reconnect the type bar 43 and bell crank 45 of the "9-0" type action to the companion operating lever 44. This is consonant with the conditions that any one of all the numeral type actions is subject to use for typing in upper case and indexing a lower-case value pin 76 after the first significant figure has been typed and indexed.

In the letter-feed step of the carriage which attends the sensing, typing and indexing of the last digit of the negative amount, the Old balance column unit 86 operates the cycle trip lever 133. The resulting cycle of the general operator cross bar 137 operates the register bars 69 for the No. 2 register to enter additively in the latter the amount represented by the set pins 76 in said register bars. The cycle also operates by means of the cam 434 and follower lever 435 to trip the case-shift-sustaining latch arm 434 so that the platen frame, ledger sheet, and sensing head drop back to lower-case position.

It may be noted here that the sensing pin mechanism may function irrespective of whether the machine is in lower or upper case condition and that the upper case condition obtains when sensing a negative balance, to enable the type bars to print the true negative balance in the Old balance column by means of the upper case types 444ª.

The perforation field of the ledger sheet, in the present instance, runs up to eight places to represent negative amounts and positive amounts up to 999999 99

As previously stated, only the significant figures of an amount are punched on the ledger sheet. But in the case of a negative amount, if the number of digits punched is less than eight, the machine operates, nevertheless, to enter the insignificant "9's" in the corresponding register bars because the "9" pins are set in all the nine register bars for the No. 2 register as determined by the credit balance hole 492 and are caused to be restored in those significant figure register bars in which any pin from "0" to "8" becomes set. If, for example, the line of perforations for a negative balance on the ledger sheet represents 5903 62 which is the nines complement of the true negative balance 4096 37 the No. 2 register, comprising nine wheels, will become operated additively from its clear condition, under control of the credit balance hole 492 and the perforations representing 5903 62, to stand at 9995903 62 to accord with the standing of the register which obtained when the negative balance previously was read out therefrom and typed and punched in the Balance column.

*Sensing and entering a positive balance*

A ledger sheet having been inserted in the machine, the carriage may be advanced from its fully returned position to the place, for the Old balance column, corresponding to the first or highest order wheel of the nine wheels of the No. 2 register. If the line of perforations about to be sensed represents a positive balance, it will not include a credit balance hole 492 and, therefore, the hereinbefore described functions determined by such hole will not occur upon advancing the carriage to said place for the highest order wheel.

The typist, observing the magnitude of the typed positive amount in the Balance column, then operates the space key or the appropriate tabulating key to advance the carriage, with the ledger sheet, to the place corresponding to the first significant figure of the positive balance. Alternatively, since the distinctive character of the type impressions, as made by the lower case types 444, indicates that an amount is positive, the typist may observe this and accordingly advance the carriage directly from its fully returned position to the first significant figure place by operation of the appropriate tabulating key or the space key.

The sensing and attendant selection and energization of a type-action magnet M to effect actuation of a corresponding type-action proceeds digit-by-digit to index the positive balance in the appropriate register bars for the No. 2 register. Since the balance is positive, the type actions operate in lower case and there is no preparatory setting of the "9" pins in all the register bars of said register. In the letter-feed step which attends the sensing and indexing of the last digit of the positive balance, the Old balance column unit 86 operates the cycle trip lever 133 and in the ensuing cycle, the indexed register bars are actuated to enter the positive balance additively in the clear No. 2 register. If, for example, the line of perforations represents a positive balance of 5806 36 the nine wheels of the No. 2 register will stand at the end of said cycle at 0005306 36 to accord with the standing of the register which obtained when the positive balance was previously read out therefrom and typed and punched in the Balance column.

Debit and credit entries

Following the entries of the Old balance in the clear No. 2 register and which Old balance may be either positive or negative as has been shown, the carriage advances for typing in the Date, Description, and Order No. columns. Following this, an entry is typed in the debit or credit column with attendant advance of the carriage and concomitantly such debit or credit entry is indexed in the register bars of the No. 2 register. The carriage carries a column unit 86 for the debit column and another column unit 86 for the credit column. The credit column unit may have a subtraction tappet 111ᵃ for depressing cam plate 111 for automatically determining subtractive rotation of the wheels to subtract the credit from the old balance when the machine is cycled. Each debit or credit column unit 86 has a cycling tooth 132 to operate the cycle trip lever 133 in the letter-feed step which attends the entry of the last digit of the debit or credit.

Reading out and punching the balance

Following the cycling of the machine for the debit or credit, the total key 178 is operated, for advancing the carriage to the place in the Balance column corresponding to the highest order wheel of the nine wheels of the No. 2 register. It results that the new balance is automatically read out, indexed in the register bars and punched on the ledger sheet, and may be either positive or negative. The machine is finally cycled to clear the indexed new balance from the No. 2 register and to print the star after the new balance typed on the ledger sheet, all as hereinbefore described.

Punctuation spacing in punching and sensing

At the Balance zone, the carriage reaches a punctuation place by the letter-feed step which attends the reading of the computing pinion and punching operation for units-of-dollars and at such punctuation place, the column unit 86 will have depressed the punctuation jack 281 to connect the carriage spacer draw link 162 to the snatch roll 57. The resulting further letter-feed step of the carriage brings the latter to the tens-of-cents place where the corresponding computing pinion is read and typing and punching of a digit are effected. Therefore, the place on the ledger sheet, where the tens-of-cents digit is punched, is separated from the place, where a units-of-dollars digit may be punched, by a blank punctuation space at which no punching is effected.

In sensing the punched amount while the carriage traverses the Old balance zone, the letter-feed step which follows the sensing of the punched units-of-dollars digit brings the carriage to the place where the blank punctuation space in the line of perforations 490 registers with the group of sensing pins 494. However, by reaching such place, the carriage will have depressed, through the Old balance column unit 86, the punctuation jack 281, and it results immediately that the carriage is further letter spaced automatically to bring the perforations for the tens-of-cents digit opposite the group of sensing pins.

Punching and sensing lock-out

It will be remembered that when the carriage and punching and sensing head H have been advanced to the place in the Old balance zone corresponding to the highest order computing pinion, the stop-edge 705 of arm 703 of the head has just reached the stop 692 and arm 703 has reacted with its cam-edge 704 on said stop 692 and thereby has become shifted, together with plate 619, to release the sensing pins 494, 495 and fingers 621, 652 to permit these parts to function. Similarly, when the carriage and the punching and sensing head have advanced to the place in the Balance zone corresponding to the highest computing pinion, the stop edge 546 of the head has just reached stop 548 and the tongues 533 of the punching levers 527 have become placed in the range of the striker plates 541, 542 of the type bars. Either of these two conditions, relative to the Old balance and Balance columns, may be negatived and the sensing or punching functions silenced by shifting the head rightwardly on the carriage. The shift determines that the cam-edge 704 and stop-edge 705 do not reach stop 692 and this prevents release of the sensing pins and hence silences sensing during the traverse by the carriage of the Old balance zone, or that the punch lever tongues 533 do not reach the range of the type bar striker plates 541, 542 and thus the punching function is prevented during the traverse by the carriage of the Balance zone.

For gaging the punching-and-sensing-head-disabling shift and holding the shift as long as desired, the following means are provided, Figures 3, 4, 5, 6, 7 and 11. A latch plate 757 overlies and is pivoted to plate 582 on supporting bar 501 by a stud 758. A spring 759 is anchored to a stud 760 in bar 501 and is attached to plate 757 at 761 so that the edge of a clearance hole 762 of plate 757 normally abuts stud 760 to position said plate 757 with its latching nose 763 behind and clear of a latching-edge 764 on the punching-and-sensing head. Said edge 764 may be on a plate 765 secured, with stop plate 547, at 766 to foundation plate 509, Fig. 11. For shifting and locking out the head, the latter is moved manually to the right by means of its finger piece 767, on plate 765, to bring edge 764 past the latching nose 763 whereupon plate 757 is turned forwardly by means of its finger piece 768 to bring a latching corner 769 thereof into interlock with edge 764, as in Figure 3, to sustain the shift. For releasing the head H from the lock-out device, the head is moved rightward slightly by means of the finger piece 767 to release the latching corner 769 whereupon spring 759 restores the latch plate 757 counterclockwise until stopped by stud 760.

With the head H in locked-out position, the bar 706 may nevertheless function to depress the arm 696 to release the reading stop 692 so that the latter may be passed by arm 703 in advancing the carriage and the locked-out head to the Balance zone.

The locking-out of the punching-and-sensing head H is useful for posting an amount as in the Balance column without punching or for making an entry as for the Old balance column independently of a line of perforations.

A throat piece 771, Figures 9, 19, is secured to the back of die plate 510. A chute 772 is fitted as an extension to said throat piece 771 and extends through a clearance opening 773 in plates

503, 506 for directing the paper scrap from the punches 491, 493, to a receptacle 714 removably attached to plate 503. A duct 775 extends from the back of block 584 to direct the paper scrap from the sheet-locating-hole punch 587 to an inlet 776 of said receptacle 774.

*Protective casing for punching and sensing mechanism*

A casing 777, Figures 1, 24, 25, comprising a front wall 778, top wall 779 and a right-hand side wall 780 is attached to the platen frame 59ᵃ. Top wall 779 slopes downwardly at 782 to its rear wing 783 at which the casing is detachably connected by a snap fastener 784 to right-hand base plate 501ᵃ of cross bar 501. A snap fastener 785 attaches the casing at its top wall 779 to the top of stud 758. The top wall 779 and side wall 780 have feet 786, 787 resting, respectively, on bar 501 and side member 497 of platen frame 59ᵃ for further support. A casing 788 comprising front wall 789, top wall 790 and left-hand side wall 791 is removably attached to the punching and sensing head H. The top and front walls of the two casings 777, 788 are in telescopic relation as represented at 792 to permit lateral movement of head H relatively to the platen frame. A snap fastener 793 secures casing 788 at its front wall to a stud 794 fixed to plate 523 of the head. Side wall 791 has a notched tab 795 cooperative with screw 614, and top wall 790 has a hole for a shouldered dowel 796 at the top of the lever pivot 604, for additional support for the casing 788. Casing 777 has openings 797 for the finger pieces 767, 768 of the described latching devices for locking out the head H.

The operations of the machine embodying the invention will be understood in detail from the foregoing description. The invention and its described illustrated embodiment and operations provide, among others, the following features. Negative balances as well as positive balances are dealt with in automatically recording on and subsequently automatically reading or picking up the positive or negative balances from the ledger sheet for reentry in the machine preparatory to deriving a further new balance. A printing of the true negative balance is effected upon the ledger sheet. In respect to picking up an old negative balance or an old positive balance from the ledger sheet, for reentry into the cleared register, such reentry restores the register to the same balance-registering condition as obtained before the register was cleared at the previous recording of the balance as a new balance on the ledger sheet. Thus, if the register previously showed a negative balance, including one or more insignificant nines, as a new balance, the same showing, including the insignificant nines, is reentered in the cleared register in conjunction with automatically reading the balance on the ledger sheet as an old balance, it being noted that only the significant figures are represented on the sheet. It will be seen that the described balancing operations may be carried out by means of the described single totalizer, that is, a totalizer having a single set of wheels 68 as distinguished from a double totalizer having two complemental interconnected sets of wheels. The codal representations or perforations of the balance are entered in an individual column of the ledger sheet. The recording of a new balance on the ledger sheet in the form of codal representations and the subsequent picking up and reentering of such new balance are accomplished digit-by-digit, that is, by means of typewriter mechanism including types printing at a common printing point and a cooperative carriage. The punching and sensing devices are novel and are adapted to cooperate efficiently with other features of the machine including the typewriting and computing mechanisms.

Variations may be resorted to within the scope of the invention and portions of the improvements may be used without others.

What is claimed is:

1. In a business machine; the combination with a set of computing devices of different denominational orders, indexable successively in the respective denominational orders; of means, controlled by a record in the machine on which only significant figures of the complement of a true negative amount are sensably recorded, to index said figures for the computing devices of corresponding orders; the record also including a sensable designation signifying that the amount recorded is the complement of the true negative amount; and means controlled by said sensable designation, to effect indexing of an insignificant figure complement for each computing device that is not indexable for a significant figure.

2. A business machine including, in combination, a typewriter having numeral type actuating devices and a letter-feedable carriage, a totalizer mechanism, means for translating operation of the type actuating devices and said carriage into entry of a positive total or the complement of a true negative total in said totalizer mechanism, said complement comprising a significant-figure portion and one or more insignificant "9's," means operable for automatically translating a total in the totalizer mechanism into automatic operation of said type actuating devices and carriage, means operable in coordination with said latter operation of said type actuating devices and carriage for producing sensable codal representations of the positive total, or of only the significant figure portion and only one insignificant "9" of the negative total on a work sheet in said typewriter, means to sense said representations, and means operable in coordination with said sensing means, type actuating devices and carriage to effect reentry of the positive total, or of the complemental negative total, including all insignificant "9's," into said totalizer mechanism.

3. A combined typewriting and computing machine, having, in combination, selectively operable digit type actuating devices and a step-by-step feedable carriage for recording an amount digit-by-digit on a work sheet, a register operable to accumulate positive totals and the complements of true negative totals in accordance with the operation of said type actuating devices and carriage, mechanism operable partly under control of said register and partly under control of said carriage to translate a positive total or a complemental negative total digit-by-digit into corresponding selective operations of said type actuating devices, a punching mechanism operable by said type actuating devices, when the latter are operated under control of said register and carriage, to punch codal representations of only the significant digits of the positive total or of the complement of the true negative total on said work sheet, an extra punching device, and means operable under control of said register and carriage to operate said extra punching device, only when said register contains the complement of a true negative total, to punch a negative characteristic in addition to the codal representations of the significant digits of the complement of the negative total.

4. A bookkeeping machine having, in combination, digit-types, a letter-feedable carriage, a register containing a positive total or the complement of a true negative total, selectively operable marking devices, means operable under control of said register and carriage to select and operate said marking devices to produce, digit-by-digit, codal representations of the positive total or of the complement of a true negative total on a ledger sheet in the machine, means subsequently cooperating with said carriage to sense said codal representations digit-by-digit, means operable under control of the sensing means to effect re-entry into the register of the positive total or the complement of a true negative total, and means, acting in coordination with the operation of said sensing means and said re-entry-effecting means, to select and operate the types automatically to type the positive total or the true negative total as a balance a least once on the ledger sheet.

5. A balance-pick-up machine having, in combination, a set of denominational-order numeral wheels operable subtractively to register the complement of a negative total including possibly one or more insignificant "9's"; marking devices operable selectively to produce codal representations of digits on a work sheet in the machine; mechanism cooperative with said wheels to effect automatic selection and operation of said marking devices to produce codal representations of only the significant figures of a complement and only one additional representation corresponding to an insignificant "9" irrespectively of whether the wheels register one or more insignificant "9's"; means to sense the representations on the work sheet; and means operable in coordination with operation of the sensing means to effect additive reentry of the complement in the numeral wheels, said last-named means including means responsive to the sensing of said one additional representation to determine inclusion of reentry in the numeral wheels of the requisite one or more insignificant "9's."

6. A business machine having, in combination, a typewriter having a set of selectively operable numeral-value recording actions; a totalizer which may contain the complement of a true negative total, manifested by the registery of "9" in the highest totalizer order; a marking device to make a sensable negative characteristic on a work sheet in the typewriter; means operable under control of the highest totalizer order to operate said marking device; means operable under control of the totalizer orders containing significant figures to operate said recording actions; a set of indexable computing devices of related denominational orders to enter amounts in the totalizer; a device to index a "9" in the computing devices of all orders in the set, preparatory to reentering a complemental negative total in the totalizer; means to sense said characteristic on the work sheet in the typewriter; and means responsive to said sensing of the characteristic to operate said "9" indexing device.

7. A combined typewriting and computing machine, comprising, in combination, selectively operable digit type actuating devices and a step by step feedable carriage for recording an amount digit by digit on a work sheet; a register for receiving a positive total or the complement of a negative total, the latter including possibly one or more insignicant "9's"; mechanism operable under control of said register and carriage to translate a positive total or a complemental negative total into corresponding selective operation of said type actuating devices; means, operable under control of said translating mechanism, to produce sensable codal representations of the digits of the positive total, or to produce a sensable negative characteristic, and sensable codal representations of the significant figures of the complement of the true negative total, on the work sheet; means to sense said representations and to sense whether said negative characteristic is present; means, operable under control of said sensing means, to cause operation of said type actuating devices according to the positive total sensed, if no negative character is present; or to cause operation of said type actuating devices according to the complement of the negative total sensed, if the negative characteristic is present; and means operable according to such operation of said type-actuating devices to enter the positive total or the complement of the negative total, including the insignificant "9's," in the register.

8. A combined typewriting and computing machine, comprising in combination, numeral type actuating devices and a letter-feedable carriage; a totalizer mechanism operable to accumulate a positive total or the complement of a negative total, said complement including a significant-figure portion and one or more insignificant "9's"; means operable for automatically translating a total in the totalizer mechanism into automatic operation of the said type actuating devices and carriage; means, operable in coordination with the last said operation, to produce sensable codal representations of the positive total, or of only the significant-figure portion of the complement of the negative total and a negative characteristic, on a work sheet in the machine; means to sense said representations and to sense whether said negative characteristic is present; said totalizer mechanism including a register and a set of indexable denominational-order devices for entering amounts in the register; and means operable in coordination with said sensing means and carriage to index the positive total in said devices, if no negative characteristic is present or, if the negative characteristic is present, to index the complemental negative total, including all insignificant "9's" in said devices.

9. A business machine, having, in combination, a typewriter having power-actuated operating means and a case-shift mechanism; a totalizer which may contain the complement of a true negative total, said complement being manifested by the registry of an insignificant "9" in one or more totalizer orders higher than the order in which the first significant figure of the complement is registered; a marking device for making a single negative characteristic on a work sheet in the typewriter; means operable under control of the highest totalizer order, in which the insignificant "9" is registered, to operate said case-shift mechanism and to operate said marking device to make said negative characteristic; a set of indexable computing devices of related denominational orders to enter amounts in the totalizer; means operable by said power-actuated means, to index "9's" in the computing devices of all orders; means to sense said negative characteristic; and means operable under control of said sensing means to effect operation of said case-shift mechanism and said "9's" indexing means, preparatory to typing the true negative total on the work sheet and entering the complement thereof in the totalizer.

10. A business machine, having, in combination, selectively operable numeral type actuating devices; complemental cases of numeral types actuatable by said devices; a case-shift mechanism; a carriage for letter-feeding a work sheet relatively to said types; means cooperable with the actuating devices and carriage to produce sensable codal representations of the digits of a positive balance, or cooperable with the actuating devices, case-shift mechanism and carriage to produce a sensable negative characteristic and sensable codal representation of the significant digits of the complement of a true negative balance on the work sheet while the sheet is letter-feedable relatively to the types; means to sense said representations and to sense whether said characteristic is present while the sheet is letter-feedable relatively to the types; and means cooperable with said sensing means to effect automatic operation of the actuating devices and carriage according to the positive balance, without operation of the case-shift mechanism if said characteristic is absent, to type the positive balance by one type case, or according to the significant digits of the complement of the negative balance, with operation of the case-shift mechanism if said negative characteristic is present, to type the true negative balance by the other, complemental case type.

11. In a combined typewriting and computing machine, the combination with pairs of complemental digit types, an actuator for each pair normally operative to print with one of the pair of types, a shift mechanism operable to determine that each actuator may print with the other of its pair of types, a step-by-step feedable carriage cooperable with said actuators, and register mechanism operable to contain a positive total or the complement of a true negative total, of marking devices selectively operable for producing codal representations of the total on a work sheet in said machine, and mechanism operable partly under control of said register mechanism and partly under control of said carriage to select and actuate said actuators to print the positive or the true negative total on said work sheet and simultaneously to actuate the marking devices to produce the codal representations of the positive total or of the complement of the negative total on said work sheet; said last-named mechanism including means controlled by said register mechanism to actuate said shift mechanism automatically if the register mechanism contains the complement of a negative total, whereby the complement will be codally recorded but the true negative total will be typed.

12. In a combined typewriting and computing machine, the combination with pairs of upper and lower case digit types, an actuator for each pair of types and normally operative to print with one of its pair of types, a step-by-step feedable carriage cooperable with said actuators, register mechanism operable to contain a positive total or the complement of a true negative total, marking devices selectively operable for producing codal representations of the positive total or of the complement of the true negative total on a work sheet in said machine, mechanism operable partly under control of said register mechanism and partly under control of said carriage to select and actuate said actuators to print the total on said work sheet and concurrently to actuate the marking devices to produce the codal representations of the total as contained in said register on said work sheet, a shift mechanism operable under control of said register mechanism and carriage if the register mechanism contains the complement of a negative total to determine operation of the actuators and the upper case types to print the true negative total, and means, effective as a result of operation of the shift mechanism, to determine operation of the marking devices according to the complement contained in the register mechanism.

13. The combination of a typewriter having numeral type actions and a letter-feedable carriage, and adapted for typing positive amounts and conditionable for typing negative amounts complementally; an add-subtract register in which a positive total or a negative total is accumulated according to operation of the typewriter on a ledger record, the negative total being complemental and manifested by the registry of one or more insignificant "9's"; means cooperative with the type actions for entering amounts in the register; register-reading means adapted to read and distinguish, by the registry of said insignificant "9's," a positive total and a negative total; means operable by the register-reading means, when the registered total is negative, to condition the typewriter for typing a true negative total complemental of the registered negative total; punching mechanism cooperative with the type actions under control of the reading means, to punch on the record codal representations of only the significant figures of the registered total; a device to punch a negative characteristic; means operable upon conditioning the typewriter for typing a true negative total, to operate said punching device; and means, including analyzing mechanism, to subsequently operate the amount-entering means under control of the representations and characteristic to enter the positive total, or the negative total including all insignificant "9's," in the register.

14. A business machine including, in combination, a typewriter having numeral type actuating devices and a letter-feedable carriage, and adapted for typing positive amounts and conditionable for typing negative amounts complementally, in combination, a totalizer mechanism for accumulating a positive total or the complement of a negative total, said complement including a significant-figure portion and one or more insignificant "9's"; means operable for automatically translating a total in the totalizer mechanism into automatic operation of the said type actuating devices and carriage; means, operable in coordination with the last said operation, to produce sensable codal representations of the positive total, or of only the significant-figure portion of the complement of a negative total and a negative characteristic, on a work sheet in the typewriter; means to sense said representations and to sense whether said negative characteristic is present; mechanism to condition the typewriter for typing negative amounts complementally; means, operable under control of said sensing means, to cause operation of said type actuating devices according to the positive total sensed, if no negative characteristic is present; or, if the negative characteristic is present, to cause operation of said conditioning mechanism, and operation of said type actuating devices according to the complement of the negative total sensed, to type the true negative total; and means operable according to such operation of said type actuating devices to enter the positive total or the complement of the negative total, including the insignificant "9's," in the totalizer mechanism.

15. A combined typewriting and computing machine, comprising, in combination, selectively operable digit type actuating devices and a step by step feedable carriage for recording an amount digit by digit on a work sheet; a register for receiving a positive total or the complement of a negative total, the latter including possibly one or more insignificant "9's"; mechanism operable under control of said register and carriage to translate a positive total or a complemental negative total into corresponding selective operation of said type actuating devices; means, operable under control of said translating mechanism, to produce sensable codal representations of the digits of the positive total, or to produce a sensable negative characteristic, and sensable codal representations of the significant figures of the complement of the true negative total, on the work sheet; means to sense said representations and to sense whether said negative characteristic is present; means, operable under control of said sensing means, to cause operation of said type actuating devices according to the positive total sensed, if no negative characteristic is present; or to cause operation of said type actuating devices according to the complement of the negative total sensed if the negative characteristic is present; a set of indexable denominational-order computing devices for entering amounts in the register; means, operable by said sensing means in response to sensing the negative characteristic, to index "9's" in all orders of the computing devices; and means, operable according to said operations of said type actuating devices, to index the significant digits of the total in the computing devices, the last said means including a device for each order to release the previously indexed "9" upon indexing another digit.

16. A combined typewriting and computing machine, comprising, in combination, selectively operable digit type actuating devices and a step by step feedable carriage for recording an amount digit by digit on a work sheet; a register for receiving a positive total or the complement of a negative total, said complement including a significant-figure portion and possibly one or more insignificant "9's"; mechanism operable under control of said register and carriage to translate a positive total or a complemental negative total into corresponding selective operation of said type actuating devices; means, operable under control of said translating mechanism, to produce sensable codal representations of the digits of the positive total, or to produce a sensable negative characteristic, and sensable codal representations of the significant figures of the complement of the true negative total, on the work sheet; means to sense said representations and to sense whether said negative characteristic is present; a set of indexable denominational-order computing devices to enter amounts in the register; means to index "9's" in all orders of the computing devices; means to index significant digits of amounts in the computing devices, including a device for each order to release the previously indexed "9" upon indexing another digit; and means, under control of said sensing means, to cause operation of said type actuating devices and said significant-digit indexing means according to the positive total sensed, if no negative characteristic is present; or, if the negative characteristic is present, to cause operation of said type actuating devices according to the complement of the negative total sensed, and cause operation of said "9's" indexing means and operation of said significant digit indexing means according to the complemental negative total sensed.

RICHARD W. PITMAN.